United States Patent
Reshef et al.

(10) Patent No.: US 11,696,226 B2
(45) Date of Patent: Jul. 4, 2023

(54) RADIO COMMUNICATION DEVICES AND METHODS FOR PERFORMING RADIO COMMUNICATION

(71) Applicant: Intel Corporation, Santa Clara, CA (US)

(72) Inventors: Ehud Reshef, Kiryat Tiv'on (IL); Ofir Degani, Haifa (IL); Roya Doostnejad, Los Altos, CA (US); Avishay Friedman, Petach Tikva (IL); Nevo Idan, Zichron Ya'akov (IL); Eytan Mann, Modi'in (IL); Ashoke Ravi, Portland, OR (US); Gadi Shor, Tel Aviv (IL); Shahar Gross, Ness Ziona (IL); Ofir Klein, Tel Aviv (IL); Chen Kojokaro, Yokneam Illit (IL)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 17/126,124

(22) Filed: Dec. 18, 2020

(65) Prior Publication Data

US 2022/0201600 A1  Jun. 23, 2022

(51) Int. Cl.
*H04W 48/18* (2009.01)
*H04W 88/06* (2009.01)
(Continued)

(52) U.S. Cl.
CPC .......... *H04W 48/18* (2013.01); *H04B 1/0003* (2013.01); *H04B 7/0413* (2013.01);
(Continued)

(58) Field of Classification Search
CPC .. H04B 7/0602; H04B 7/0608; H04B 7/0802; H04B 7/0404; H04B 1/0003;
(Continued)

(56) References Cited

U.S. PATENT DOCUMENTS 9,319,965 B2   4/2016  Zhu et al.
10,419,092 B2  9/2019  Srinivasan
(Continued)

OTHER PUBLICATIONS

Liu et al. "Design and Implementation of the Physical Layer Control System Based on TD-LTE Baseband Chip", 2015, IEEE Xplore, 5 pages, (Year: 2015).*
International Search Report issued for the corresponding international application No. PCT/US2021/051849, dated Dec. 30, 2021, 5 pages (for informational purposes only).

*Primary Examiner* — Quoc Thai N Vu
(74) *Attorney, Agent, or Firm* — Viering, Jentschura & Partner MBB

(57) ABSTRACT

In various aspects, a radio communication device is described including a housing, a plurality of radiohead circuits attached to the housing, baseband circuitry connected to the plurality of radiohead circuits via a digital interface; and one or more processors configured to select one or more radiohead circuits of the plurality of radiohead circuits for communication with another radio communication device to fulfill one or more predefined selection criteria with respect to a quality of a communication with the other radio communication device using the one or more selected radiohead circuits and to control the baseband circuitry to perform communication with the other radio communication device using the one or more selected radiohead circuits.

18 Claims, 27 Drawing Sheets

(51) Int. Cl.
  *H04B 7/06* (2006.01)
  *H04W 72/02* (2009.01)
  *H04B 7/0413* (2017.01)
  *H04B 1/00* (2006.01)

(52) U.S. Cl.
  CPC .......... *H04B 7/0639* (2013.01); *H04W 72/02* (2013.01); *H04W 88/06* (2013.01)

(58) Field of Classification Search
  CPC .. H04B 7/0413; H04B 7/0639; H04B 7/0626; H04B 7/082; H04L 5/1423; H04W 48/18; H04W 72/02; H04W 88/06; H04W 88/085
  See application file for complete search history.

(56) References Cited

U.S. PATENT DOCUMENTS

| | | | |
|---|---|---|---|
| 2013/0170574 A1 | 7/2013 | Fleming et al. | |
| 2017/0288295 A1* | 10/2017 | Sultenfuss | H01Q 21/00 |
| 2018/0310255 A1 | 10/2018 | Simonsson et al. | |
| 2018/0330117 A1* | 11/2018 | Hu | H04B 7/0802 |
| 2020/0052741 A1* | 2/2020 | Kim | H04W 52/365 |
| 2020/0343963 A1 | 10/2020 | Gharavi et al. | |
| 2021/0135712 A1* | 5/2021 | Hong | H04B 7/0404 |

* cited by examiner

FIG 12
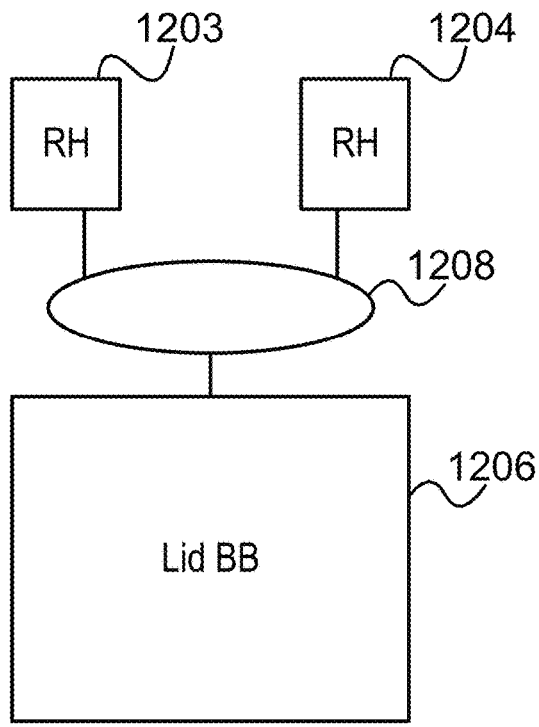
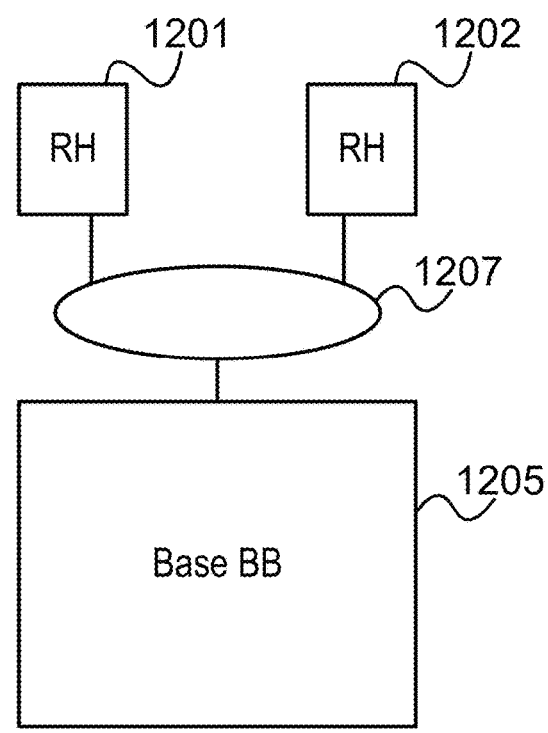

RADIO COMMUNICATION DEVICES AND METHODS FOR PERFORMING RADIO COMMUNICATION

TECHNICAL FIELD

The present disclosure relates to radio communication devices and methods for performing radio communication.

BACKGROUND

Various aspects of this disclosure generally may relate to the field of wireless communications.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various aspects of the disclosure are described with reference to the following drawings, in which:

FIG. 12 shows a first example of a radiohead allocation for the radio communication apparatus of FIG. 11.

DESCRIPTION

The following detailed description refers to the accompanying drawings that show, by way of illustration, exemplary details and aspects in which aspects of the present disclosure may be practiced.

General Framework

As demand for wireless data traffic increases, wireless communication devices may require more wireless transceivers (e.g., multiple input multiple output (MIMO) technology, distributed input/distributed output (DIDO) networks, and/or multi-radio systems) to support wider bandwidths (BW), e.g., a BW of 320 MHz or more, and/or higher-order modulations schemes, e.g., a modulation schemes of up to 4k Quadrature Amplitude Modulation (QAM), or more. As demand for more efficient wireless communication devices (e.g., smaller size, less power consumption, higher performance, less material, lower costs), wireless communication devices may require greater integration while avoiding interference caused by the greater integration.

However, conventional implementations of radio frequency circuitry, hereafter referred to as radiohead, antenna and conventional cable connectivity schemes offer limited integration abilities due to cable losses, interference, thermal issues, and power consumption limitations. For example, in current wireless communication devices, such as those devices compliant with WiFi, Bluetooth (BT), GSM, CDMA, UMTS, LTE, or 5G communication standards, the radiohead is separate and remote from the antenna.

Figure 1A:
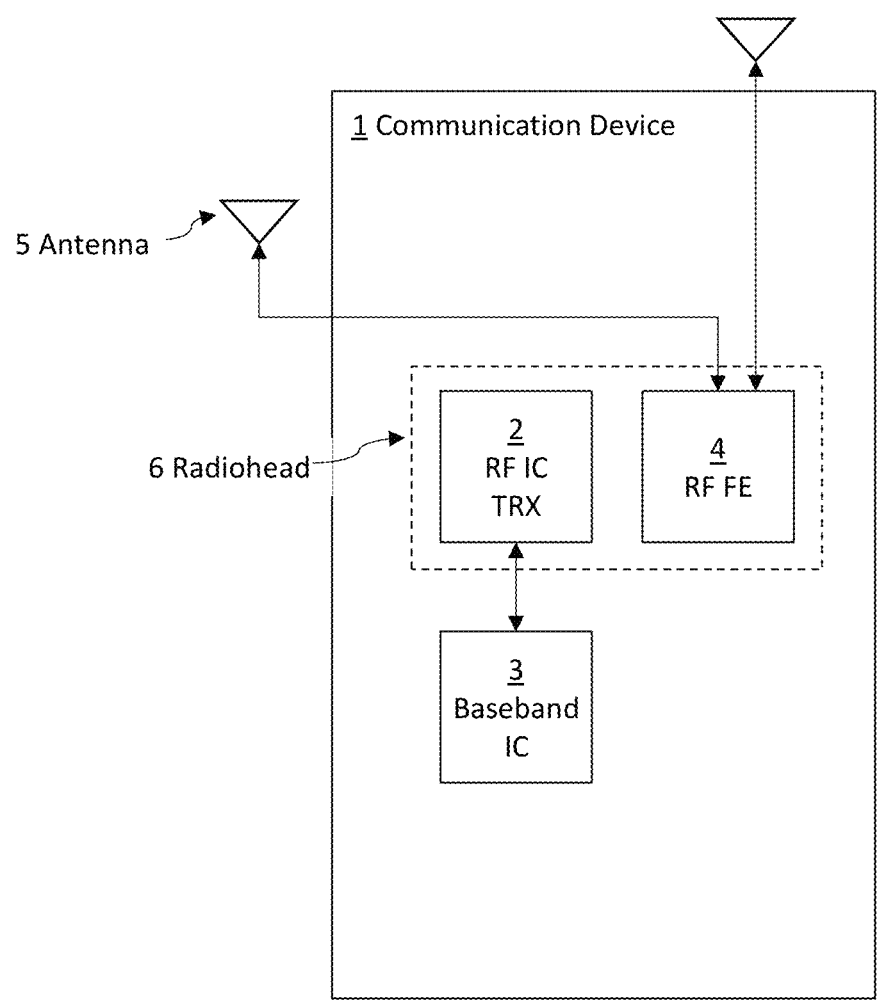
FIG. 1A exemplarily shows a block diagram of a wireless communication device including a radiohead system.

FIG. 1A shows a block diagram of a wireless communication device including a conventional radiohead system. Referring to FIG. 1A, the wireless communication device 1 includes a baseband integrated circuit 3 for baseband signal processing, a centralized radiohead 6 for radio frequency signal processing, and one or more discrete antennas 5. The radiohead 6 and antennas 5 are separate modules that are connected using a specialized radio frequency (RF) cable, e.g., coax cable, as a feed line to communicate RF electrical signals between the radiohead and the antennas. Note that in some cases the baseband integrated circuit and the rf transceiver (2) can be implemented as a single chip. Typically, as high-performance mini coax cables are costly components, only a single mini coax cable to each antenna is used due to cost and space constraints. Moreover, the RF electrical signals still suffer impedance mismatches and accumulated insertion losses even on a high-performance specialized RF cable depending on the cable length.

In general, a radiohead may be considered as the radio equipment or RF circuitry for providing an air interface for wireless communication. A radiohead includes a wireless transceiver for transmitting and receiving RF signals. For transmission, the radiohead may include a converter to convert a digital signal to an RF analog signal and an amplifier to amplify the RF analog signal to a desired power level for radiating the RF signal via an antenna. For reception, the radiohead may include an amplifier to amplify an RF analog signal received from an antenna and a converter to convert the RF analog signal to a digital signal. A radiohead may be considered as an (integrated) RF transceiver combined with a front-end module (FEM) part that is related to a specific antenna, and includes the least amount of signal processing. A FEM, in general, can include circuitry between a transceiver's (e.g., receiver's) antenna input up to and including the mixer stage. In other words, the FEM may be provided in the Tx path as well as in the Rx path or in both the Tx path and the Rx path.

For example, the radiohead 6 may include an RF integrated circuit (IC) 2 including one or more RF transceivers (TRX) and a common RF front end (FE) 4. The RF IC 2 may receive one or more data and control signals and operate to receive a communication signal from the baseband IC and generate an RF electrical signal from the communication signal for radio transmission from the device 1 or receive an RF electrical signal and generate a communication signal from the RF electrical signal for providing to the baseband IC. The RF FE 4 may convert an RF electrical signal into a format for transmission via the antenna(s) 5 and/or convert a signal received from the antenna(s) 5 into an RF electrical signal for the RF IC.

As the number of supported frequency bands, with potentially different antenna elements in a communication device increases, a radiohead may include more co-located RF transceivers. However, the use of co-located RF transceivers and RF transceiver chains based on a conventional centralized radiohead and antennas may present technical inefficiencies, disadvantages and/or technical problems and pose limitations on overall system performance and capabilities that are difficult to overcome.

For example, co-located RF transceivers can cause cross interference problems which may introduce design or physical constraints limiting integration. These size or physical constraints also reduce scalability potential, e.g., increase in transceiver chain footprint which limits the overall radiohead performance and increases cost.

For another example, using a conventional RF coax cable to connect antennas to a radiohead may result in a cable loss, e.g., in excess of 2 dB at 60 cm. The cable size and cable loss may limit system performance and/or antenna placement, and/or may increase system cost. Moreover, the cable loss may limit smart antenna applications, for example, Voltage Standing Wave Ratio (VSWR) correction and/or the like. Accordingly, various technical limitations including cross interference, power consumption limitations, thermal limitations, fanout, and/or RF circuit complexity need to be overcome to efficiently to realize the integration of co-located RF transceiver chains.

Further, as the radiohead and antennas are provided in different packages and may be positioned or disposed rather far away from each other, packaging and connection parasitics may have deleterious effects on the electrical designs of integrated circuits for radio frequencies. As a result, additional processing is needed to mitigate the signal degradations, thereby further increasing costs.

Further, certain combinations of radioheads and antennas may be incompatible or difficult to combine. For example, RF components and antenna components may interfere with each other.

Accordingly, advanced digital Complementary Metal-Oxide-Semiconductor (CMOS) processes or different circuit layout design and arrangement may be used to facilitate increasing numbers of RF transceiver chains.

The present disclosure relates to a radiohead for a distributed radiohead (or radio) system (DRS), where the radiohead RF circuit is co-located with an antenna. Ideally, a radiohead unit including an RF transceiver and RF FE module will be located or placed with the antenna/module or in close proximity to the antenna. For example, the radiohead RF circuitry and antenna circuitry may be coupled to each other within a common enclosure (and may together form the radiohead circuitry). For another example, the antenna may be integrated with the silicon into a compact radiohead package. That is, the radiohead RF circuitry and antenna circuitry may be formed on separate silicon dies/boards that are positioned or disposed near each other. The radiohead RF circuitry and antenna circuitry may be coupled to each other within a common module or system package.

In a distributed radiohead arrangement according to various aspects of the present disclosure, the transceiver chain may be divided into a time-domain processing physical (TD PHY) portion and a frequency-domain processing physical (FD PHY) portion. According to various embodiments, the TD PHY portion includes a TD RF PHY portion and a TD baseband PHY portion and the FD PHY portion includes a FD baseband portion. According to various embodiments, the FD PHY portion is the same as the FD baseband PHY portion.

The TD PHY portion may be co-located with one or more antennas. The TD PHY portion and the one or more antennas may be integrated. The TD PHY portion and the FD PHY portion may be separate and remotely located. The TD PHY portion and the FD PHY portion may be connected to each other through a digital interface, e.g., a Serial Time-Encoded Protocol (STEP) interface (developed by Intel Corporation), to communicate digitized baseband signals. The TD-FD interface may be an optical or electrical signal interface.

The TD PHY portion may contain the radiohead RF circuitry, the analog-to-digital/digital-to-analog (AD/DA) converters, the up/down converters, and line conditioning or impedance matching circuitry. The TD PHY portion includes an optical/electrical interface circuitry. The TD PHY portion may also have circuitry for operation and management processing capabilities.

The TD PHY portion may include a transmitter chain that is configured to convert a digital baseband RF signal to an RF electrical signal and amplify the RF electrical signal to the desired power level for radiation. The TD PHY portion may include a receiver chain that is configured to receive the desired band of an induced RF electrical signal from an antenna and amplify the RF electrical signal and convert it into a digital baseband RF signal.

Figure 6:
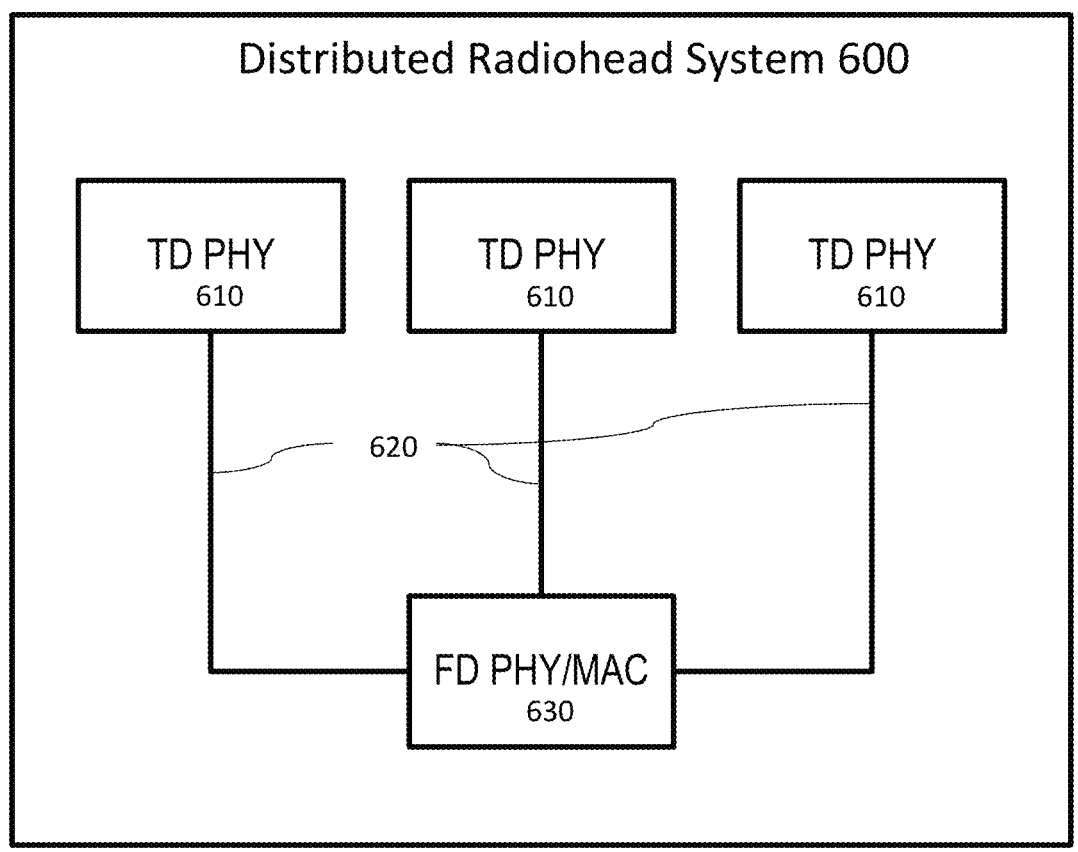
FIG. 6 exemplarily shows a block diagram of a distributed radiohead system (or distributed radio system) for wireless communication in accordance with various aspects of the present disclosure.

FIG. 6 shows a distributed radiohead system (or distributed radio system) 600 for wireless communication in accordance with various aspects of the present disclosure. Referring to FIG. 6, the distributed radiohead system 600 may include two main aspects or functionalities, represented as TD PHY 610 and FD baseband PHY/MAC (media access control) 630. The FD baseband PHY/MAC 630 includes FD baseband PHY functionalities as well as MAC functionalities.

The first main functional aspect of the distributed radiohead system 600 is provided by the TD PHY 610. The TD PHY 610 functionalities include transmitting, receiving, filtering, and amplifying RF signals. Each TD PHY 610 may be integrated, co-located, or in the proximity of a respective antenna or antenna structure. The TD PHY 610 functionalities are performed in the time domain. The TD PHY 610 may further include frequency locking means to accurately or precisely generate analog signals at a desired frequency. In addition, the TD PHY 610 can perform analog-to-digital and digital-to-analog conversions and up/down conversions or direct digital to RF modulation and/or demodulation. Up/down conversion includes shifting the frequency of a signal between from (e.g. digital) baseband (low frequencies) to RF (high frequencies) or vice versa. The TD PHY 610 can transform a digital signal into an analog signal or produce a digital signal from an analog signal. As such, the TD PHY 610 can include a digital interface.

The distributed radiohead system 600 may include a plurality of TD PHYs 610. Each TD PHY 610 may operate in a same frequency band or different frequency bands. Each TD PHY 610 may be integrated with an antenna and independently arranged. The individual nature of each TD PHY 610 can allow for easy modular regulatory certification approval.

The second main functional aspect of the distributed radiohead system 600 is provided by the FD baseband PHY/MAC 630. The FD baseband PHY/MAC 630 is responsible for controlling the flow of signals to/from the radio transmission medium and provide radio controls to regulate how the physical radio transmission medium is shared. The provided radio controls can include modulation/demodulation and encoding/decoding of signals. The signal processing performed by the FD baseband PHY/MAC 630 can be done in the frequency domain. For example, the FD baseband PHY/MAC 630 can perform frequency domain processing based on a combination of two or more receive signals from two or more TD PHYs 610 as well generate two or more transmit signals for two or more TD PHYs 610.

In the distributed radiohead system 600, the FD baseband PHY/MAC 630 is typically physically separated from the TD PHYs 610 or is located on a platform physically separate from the TD PHYs 610. The digital signals between the TD PHY 610 and the FD baseband PHY/MAC 630 can be transmitted by means of a digital interface or digital links 620.

In some devices, there may be multiple TD PHYs and FD baseband PHYs. A respective TD PHY may be connected to a respective FD PHY. Alternatively, one or more TD PHYs may be connected to a respective FD PHY.

In some devices, implementing wireless protocols that are defined in the time domain, the FD PHY portion may implement the require signal processing portions in the time domain.

A distributed radiohead system may be implemented for various wireless communication systems, including WiFi, Bluetooth, and cellular communication systems.

Figure 1B:
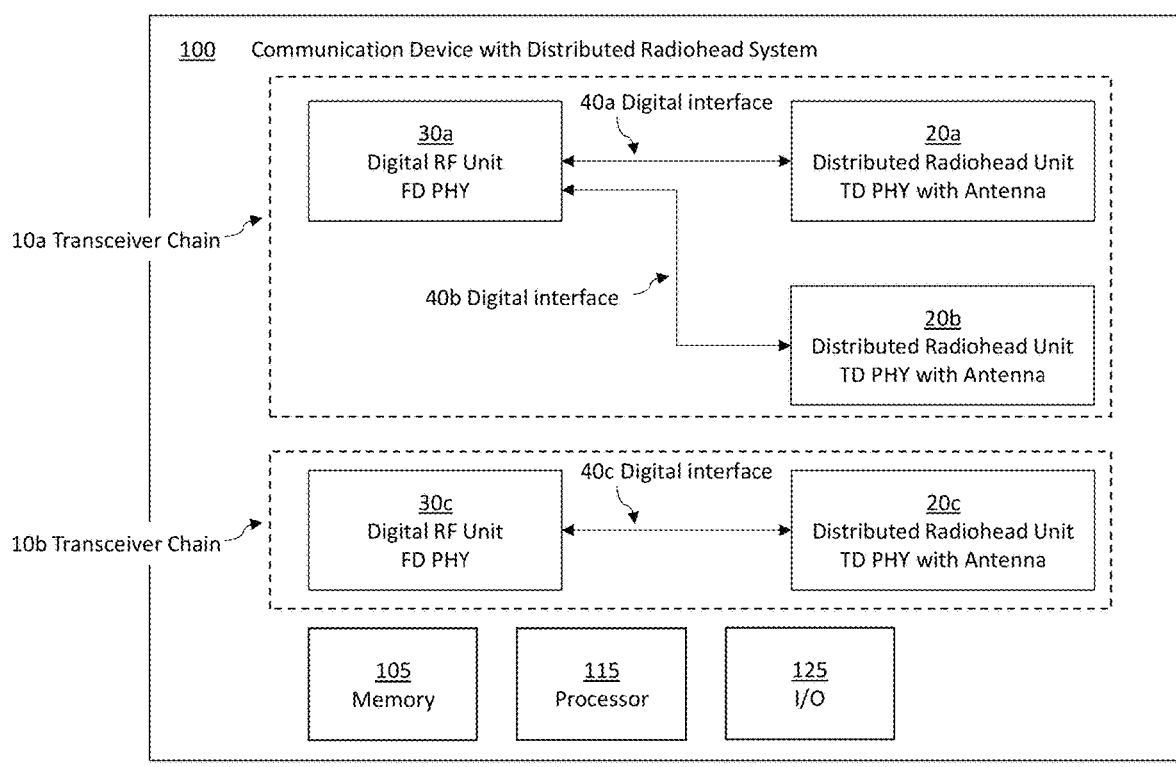
FIG. 1B exemplarily shows a block diagram of a wireless communication device including a distributed radiohead system in accordance with various aspects of the present disclosure.

FIG. 1B illustrates a block diagram of wireless communication device 100 including a distributed radiohead system in accordance with various aspects of the disclosure. Device 100 may be capable of communicating content, data, information and/or signals via a wireless medium or air interface. A wireless medium or air interface may include, for example, a radio channel, a cellular channel, a Global Navigation Satellite System (GNSS) channel, an RF channel, a WiFi channel, an IR channel, and the like.

Referring to FIG. 1B, device 100 may include two transceiver chains 10a, 10b. Each transceiver chain 10 may include a digital signal processing unit (e.g. a digital RF circuit) 30 coupled to one or more distributed radiohead circuitries 20. For example, a first transceiver chain 10a may include a first digital signal processing unit (e.g. a first digital RF circuit) 30a including an FD baseband PHY portion of the first transceiver chain 10a and two distributed radiohead circuitries 20a, 20b each including a TD PHY portion of the first transceiver chain 10a. Digital signal processing unit 30a is coupled to distributed radiohead circuitries 20a, 20b via digital interfaces 40a, 40b, respectively. A second transceiver chain 10b may include a second digital signal processing unit (e.g. a second digital RF circuit) 30c coupled to distributed radiohead circuitry 20c via digital interface 40c. The digital signal processing units 30 and the distributed radiohead circuitries 20 may be separately and remotely located. Each distributed radiohead unit (e.g. a distributed radiohead circuitry) 20 is co-located with one or more antennas.

Distributed radiohead circuitry 20 may be a multiband radiohead configured for concurrent and/or simultaneous operation(s) over one or a plurality of wireless communication frequency bands. For example, distributed radiohead circuitry 20 may be configured to communicate over a first frequency band, e.g., the 2.4 GHZ band, and to communicate over a second frequency band, e.g., the 5 GHZ and/or 6-7 GHz bands. In various aspects, distributed radiohead circuitry 20 may be configured to communicate over a mmWave frequency band and/or 60 GHz frequency band as a first frequency band and/or a second frequency band, respectively.

The antenna co-located with the distributed radiohead circuitry 20 may include any type of antennas or phased array antennas suitable for transmitting and/or receiving wireless communication signals, blocks, frames, transmission streams, packets, messages and/or data. For example, the antenna may include any suitable configuration, structure and/or arrangement of one or more antenna elements, components, units, assemblies and/or arrays. In some examples, the antenna may implement transmit and receive functionalities using common, separate, or integrated transmit and receive antenna elements.

Distributed radiohead circuitry 20 may be a standalone unit in accordance with various aspects of the present disclosure. For example, distributed radiohead circuitry may be pre-certified by a regulatory authority, as a stand-alone unit, even before being included or implemented as part of device 100. The distributed radiohead circuitry 20 may be an RF integrated circuit (IC) chip with an integrated antenna. In some examples, the RF IC may include an RF transceiver chain, a PHY TD processor, and a digital interface. A modular design of the distributed radiohead circuitry provides design flexibility. For example, distributed radiohead circuitries with different characteristics may be easily incorporated or interchanged. For another example, multiple distributed radiohead circuitries 20 may be easily disposed at different positions of a device 100 to provide improved antenna coverage.

Referring to FIG. 1B, digital signal processing units 30a, 30c may be configured to individually process each digital baseband signal. Alternatively, digital signal processing units 30a, 30c may be configured to collectively process the digital baseband signals over the plurality of distributed radiohead circuitries 20a, 20b, 20c.

Digital signal processing unit 30 may include a message processor configured to generate, process and/or access one or more messages for communication by device 100. In one example, the message processor may include at least one first component configured to generate a message, for example, in the form of a frame, field, information element and/or protocol data unit, for example, a MAC Protocol Data Unit (MPDU); and/or at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message.

In some examples, digital signal processing unit 30 may be a may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic. For example, digital signal processing unit 30 may be implemented as or included in a System-on-Chip (SoC) package.

As shown in the example of FIG. 1B, the DRS arrangement of communication device 100 can support the connection of multiple radioheads (e.g., distributed radiohead unit 20) to a single modem (e.g., digital signal processing unit 30) and can include dynamic selection of the active radioheads. The capability may be valuable, for example, to support high order MIMO (Multiple Input Multiple Output) systems, by adding more radioheads as needed and connecting the radioheads to a modem, which can create a distributed radio system rather than prevalent collocated radio system which is less scalable. This capability may also be valuable, for example, for "transformer" and/or "detachable" form-factors, where at a first system configuration it may be better to have antennas at a first location, and at a second system configuration, e.g., different from the first system configuration, it may be better to have the antennas at a different location.

A distributed radiohead system arrangement as shown in FIG. 1B may provide improved KPIs, for example, lower noise figure (NF), e.g., improved RX sensitivity, higher Tx power out, reduced power consumption, e.g., due to close proximity of antenna and RF, which may reduce the loss of the feed line from antenna to active components.

For example, to reduce cross talk and interference, each distributed radiohead circuitry may be formed on a different die. This also results in reduced thermal density. The arrangement also facilitates the integration of "smart" antenna applications due to the proximity of the RF circuit and the antenna.

Two or more devices 100 may be configured to communicate with each other through a wireless medium. For example, device 100 may include, operate as, and/or perform the functionality of one or more WLAN STAs, including access point (AP) STAs or non-AP STAs. A WLAN STA may include a logical entity that is a singly addressable instance of a medium access control (MAC) and physical layer (PHY) interface to the wireless medium (WM). The STA may perform any other additional or alternative functionality. Alternatively, device 100 may include, operate as, and/or perform the functionality of a multi antenna Bluetooth station.

In some examples, device 100 may include a distributed radiohead system configured to operate in a 2.4 GHz frequency band, and/or one or more other wireless communication frequency bands, for example, a 5 GHz frequency band, a 6-7 GHz frequency band, a millimeterWave (mmWave) frequency band, e.g., a 60 GHz frequency band, a Sub-1 GHz (S1G) band, and/or any other frequency band.

In some examples, a distributed radiohead circuitry may provide a highly flexible and/or scalable solution. In some examples, device 100 may support using a same distributed radiohead circuitry for or as part of different configurations, e.g. 1×1, 2×2, 3×3 configurations, and the like. A distributed radiohead circuitry may correspond to an antenna element of a group or array of antenna elements configured to facilitate beamforming in accordance with a particular phase and amplitude taper (or other distribution). In some examples, device 100 may support and/or integrate multi-standard distributed radiohead circuitries, which may be implemented to support multiple communication standards, e.g. LTE, Wi-Fi, and the like. In another example, device 100 may support use of a same distributed radiohead circuitry 20 for multiple applications, e.g., ranging from cellphone, laptop, AP, IOT and/or the like. In another example, device 100 may support flexible transceiver and/or antenna location, for example, digital interface 40 may be a cable extending several meters in length with low power/performance impact, which may be applicable to large systems, e.g., industrial robots and the like.

Referring again to FIG. 1B, device 100 may include, for example, one or more processors 115, an input/output interface 125, and memory 105. Device 100 may optionally include other suitable hardware components and/or software components. In some examples, some or all of the components of device 100 may be enclosed in a common housing or packaging, and may be interconnected or operably associated using one or more wired or wireless links. In other aspects, components of device 102 may be distributed among multiple or separate devices.

In some examples, processor(s) 115 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor(s) 115 executes instructions, for example, of an Operating System (OS) of device 100 and/or of one or more suitable applications.

In some examples, memory 105 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable storage units including, for example, a hard disk drive, a floppy disk drive, a Solid State Drive (SSD), a Compact Disk (CD) drive, a CD-ROM drive, a DVD drive, or other suitable removable or non-removable storage units. Memory 105, for example, may store instructions for operating device 100 and/or data processed by device 100.

Figure 2:
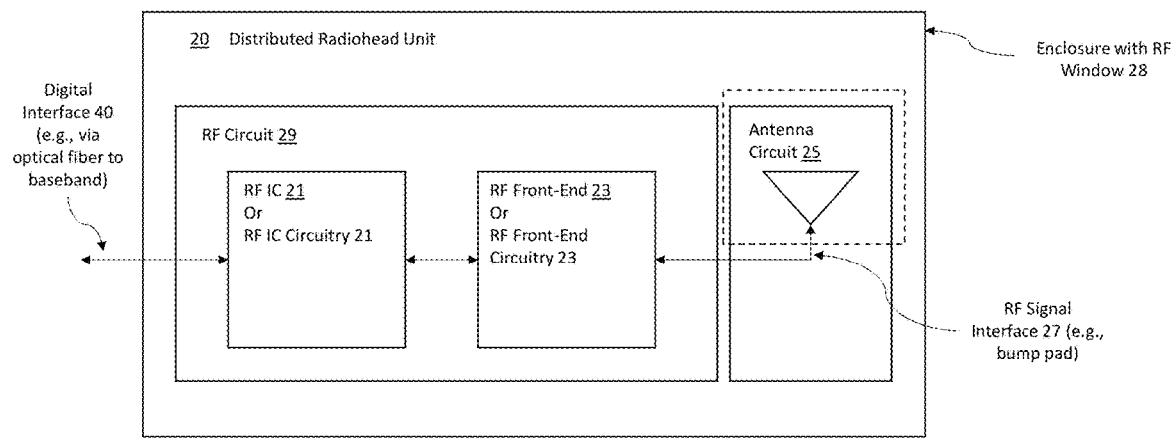
FIG. 2 exemplarily shows a block diagram of a distributed radiohead circuitry of a distributed radiohead system in accordance with various aspects of the present disclosure.

FIG. 2 illustrates a block diagram of a distributed radiohead circuitry 20 in accordance with various aspects of the disclosure. The distributed radiohead circuitry 20 includes an RF circuit 29 and antenna circuit 25 that are co-located. By co-locating the RF circuit 29 and antenna circuit 25, a specialized RF cable is not needed. Referring to FIG. 2, the RF circuit 29 and antenna circuit 25 may be connected via an RF electrical signal interface 27 at a silicon die or circuit board level. The various RF electrical interfaces 27 that will be described herein will provide reduced manufacturing costs, improved communication performance, and compact design.

Further, the RF electrical signal interfaces 27 as described herein also facilities a modular antenna circuit design. For example, the RF circuit 29 may be formed on one silicon die or circuit board and the antenna circuit 25 may be formed on another silicon die or circuit board. As the RF electrical interface 27 may be predefined, a custom antenna circuit or an antenna circuit from another vendor may be easily incorporated or interchanged into the distributed radiohead circuitry 20.

In some examples, the RF circuit 29 and antenna circuit 25 may be further integrated into a single enclosure or package. This may further provide improved performance by reducing interference between the RF circuit 29 and the antenna circuit 25.

Referring to FIG. 2, RF circuit 29 may include an RF integrated circuit (IC) or RF IC circuitry 21 and a RF front-end (FE) or RF FE circuitry 23. RF IC circuitry 21 may include an RF transceiver having one or more RF transmission chains. The RF FE circuitry 23 may include band pass filters, amplifiers, matching network.

For example, the RF FE circuitry 23 may include, for a transmit path, a digital-to-analog converter (DAC) configured to receive a digital baseband signal including data to be transmitted and configured to generate an analog baseband signal. Further, the RF FE circuitry 23 may include a mixer connected to the analog dot digital converter configured to receive the analog baseband signal which is configured to mix (up-convert) the baseband signal with a carrier signal of a carrier radio frequency provided by an oscillator of the RF FE circuitry. The output of the mixer is connected to the antenna. For a receive path, the RF FE circuitry 23 may include a mixer which is supplied with a radio signal received via an antenna and is configured to mix (down-convert) the radio signal to a baseband frequency by mixing with a carrier radio frequency provided by an oscillator of the RF FE circuitry. The output of the mixer is supplied to a bandpass filter which is configured to generate an analog baseband signal. The RF FE circuitry 23 may further include an analog-to-digital converter (ADC) configured to generate a digital baseband signal from the analog baseband signal. The digital baseband signal may be further processed by baseband circuitry. It should be noted that some of these components, like the mixers the DAC and the ADC, may also be part of the RF IC circuitry 21.

In both the transmit chain and the receive chain, the RF FE circuitry 23 may include an amplifier, e.g. arranged before the mixer (in the receive chain) or after the mixer (in the transmit chain) as well matching components (e.g. between amplifier and antenna connection) configured to match, for the transmit path, the antenna input impedance with the amplifier output impedance, and, for the receive path, the antenna output impedance with the amplifier input impedance.

Further components, like tuning components configured to tune the RF FE circuitry 23 to a certain frequency band, or filter components configured to filter out frequencies which do not belong to the frequency band or carriers to be used, may be arranged in the transmit chain and the receive chain (e.g. between power amplifier and antenna connection). The examples described in context of the RF FE circuitry 23 are applicable to any circuit providing front end functionality herein.

In some examples, the RF IC 21 may be implemented on a separate die as a System-in-a-Package (SIP) mounted on a radiohead PCB (not shown) and RF FE circuitry 23 and circuitry for a digital interface 40 may also be mounted on the same radiohead PCB module. An antenna circuit 25 may be provided on a separate antenna PCB (not shown). The radiohead PCB and antenna PCB may each include circuitry for the RF electrical interface 27 for coupling to each other.

The example distributed radiohead circuitry 20 is provided for ease of explanation, and may include additional, less, or alternate components as those shown in FIG. 2.

Figure 3:
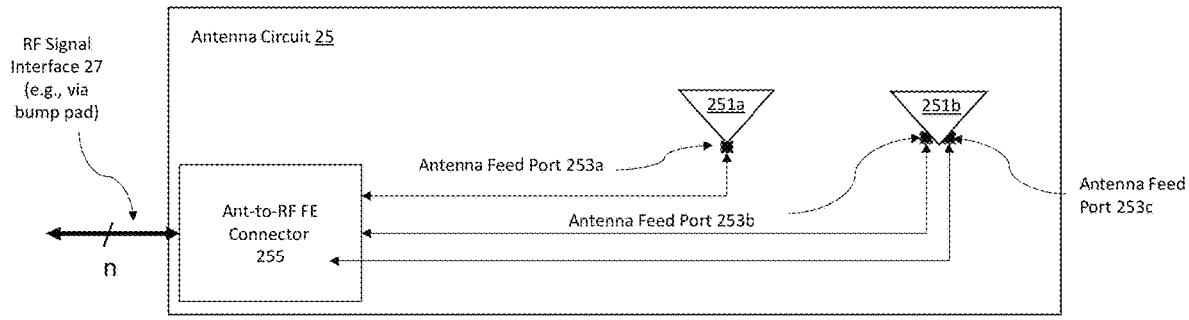
FIG. 3 exemplarily shows a block diagram of an antenna circuit of a distributed radiohead circuitry in accordance with various aspects of the present disclosure.

FIG. 3 illustrates a block diagram of antenna circuit 25 in accordance with various aspects of the present disclosure. An antenna circuit 25 may include one or more antennas 251. An antenna may include one or more feed ports 253. For example, referring to FIG. 3, antenna circuit 25 may include two antennas 251*a* and 251*b*, where a first antenna 251*a* includes a single antenna feed port 253*a* and a second antenna includes two antenna feed ports 253*b* and 253*c*. Each of the antenna feed ports may be associated with a different frequency band. Each of the antenna feed ports may be electrically connected to an antenna-to-RF FE connector 255 for the RF signal interface 27. The RF signal interface 27 may provide a plurality of separate electrical signal lines, each corresponding to a respective one of the antenna feed ports allowing signals of different frequency bands to be communicated to RF circuit 25 without using combiners and splitters typical of conventional radioheads which have only one coaxial cable connection to the antenna. The connector 255 also provides design flexibility by facilitating connections to various antenna designs (i.e., modular antenna circuits).

Figure 4:
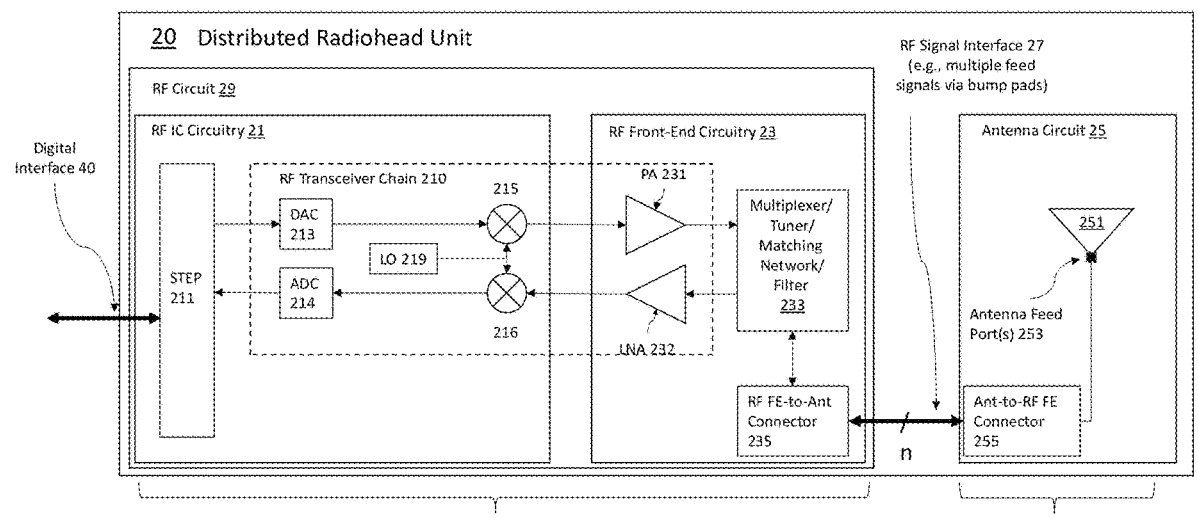
FIG. 4 exemplarily shows a more detailed block diagram of the distributed radiohead circuitry of FIG. 2 in accordance with various aspects of the present disclosure.

FIG. 4 illustrates a more detailed block diagram of the distributed radiohead circuitry of FIG. 2 in accordance with various aspects of the present disclosure. Referring to FIG. 4, RF circuit 29 may include one or more RF transceiver chains 210 configured to perform time-domain processing of the RF electrical signals. Each RF transceiver chain 210 may include a transmit chain and a receive chain. A transmit chain may be configured to convert a digitized baseband signal for RF transmission. A transmit chain may include a digital-to-analog converter (DAC) 213, a mixer 215 for up-converting, and a power amplifier (PA) 231, and a passive element circuit 233 such as a multiplexer, tuner, matching network, and/or filter. A receive chain may be configured to convert received RF energy into a digitized baseband signal. A receive chain may include a passive element circuit 233, a low noise amplifier (LNA) 232, a mixer 216 for down-converting, an analog-to-digital converter (ADC) 214. The RF transceiver chain 210 may include a local oscillator (LO) 219 configured to distribute timing signals to one or more radio chains, e.g., a transmit chain and/or a receive chain. This example is not limiting. The RF circuit 29 may include more or less components. For example, the RF circuit 29 may also include a low pass filter (LPF) on the transmit chain and adjusted gain control (AGC) on the receive chain. The RF circuit 29 may also include a STEP interface 211. The STEP interface 211 is a digital interface configured to communicate digital baseband signal to a digital signal processing unit configured to perform frequency-domain processing of the digital baseband signal. A physical link of the STEP interface 211 may be electrical or optical.

In the example RF FE circuitry 23, as shown, one or more antenna feed signals (e.g., n>=1) may be communicated from/to RF FE circuitry 23 at connector 235 to/from antenna circuit 25. The RF FE circuitry 23 may include a passive element 233 such as for example multiplexer or matching network for adjusting the line impedance of each respective antenna feed signal transmitted and/or received. The RF FE circuitry 23 may also include PA and LNA amplifiers for each respective antenna feed signal.

Referring again to FIG. 4, RF circuit 23 may receive an RF Rx signal via antenna circuit 25. The RF circuit 29 may include or be a PHY TD processor implemented as or include an RF IC circuit 21 and an RF FE circuit 23. The RF circuit 29 may generate a digital PHY TD Rx signal (e.g., a digital baseband signal) based on the RF Rx signal. The STEP interface 211 may communicate the digital PHY TD Rx signal from the distributed radiohead circuitry 20 to digital signal processing unit 30 via digital interface 40. Reciprocally, the distributed radiohead circuitry 20 may receive a digital PHY TD Tx signal from digital signal processing unit 30 via digital interface 40. RF circuit 29 may generate an RF Tx signal based on the digital PHY TD Tx signal.

Figure 5:
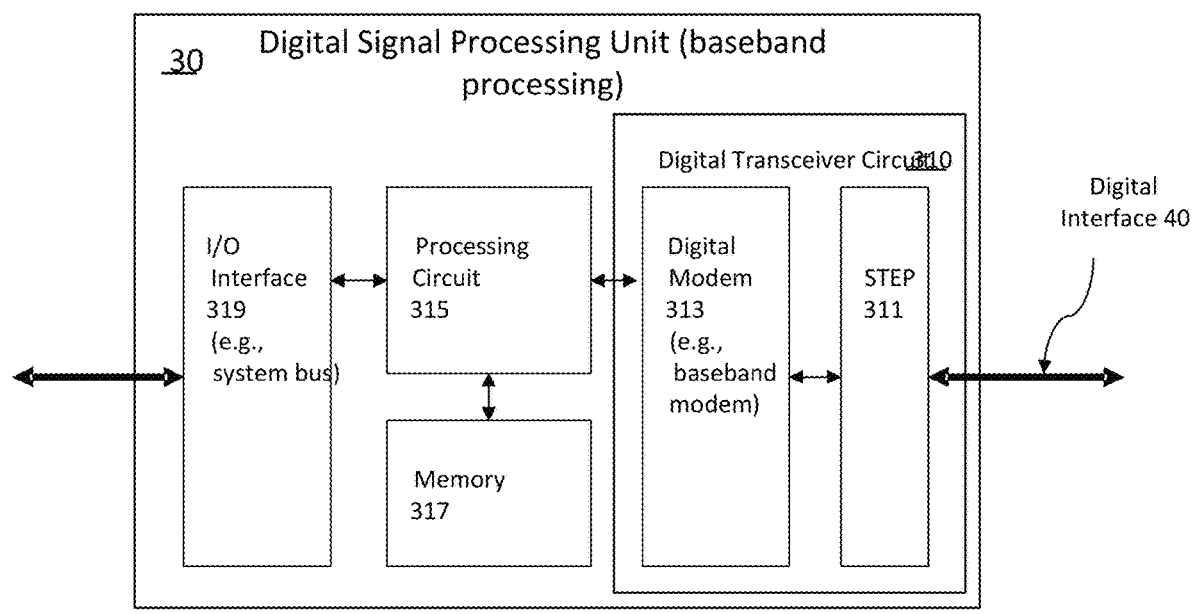
FIG. 5 exemplarily shows a block diagram of a digital RF circuit of a distributed radiohead system in accordance with various aspects of the present disclosure.

FIG. 5 is a block diagram of a digital signal processing unit (e.g. digital RF circuit) 30 in accordance with various aspects of the present disclosure. As shown in FIG. 5, a digital signal processing unit 30 may include a digital transceiver circuit 310 including a digital baseband signal interface 311 (e.g., a STEP interface) and digital baseband modem 313. A digital signal processing unit 30 may also include a processing circuit 315 (e.g., one or more processors), a memory 317, and an input/output interface 319 (e.g., a system bus). A digital signal processing unit 30 may be connected to one or more distributed radiohead circuitries 20 depending on processing capabilities. In accordance with various aspects, a digital signal processing unit 30 may be coupled to a distributed radiohead circuitry 20 via digital interface 40 or any suitable type of communication link that facilitates digital communications between these components. For example, a digital interface 40 may be implemented using an optical fiber cable. As another example, the digital interface 40 may be implemented using a flexible cable, e.g. a flat cable, (FFC), flexible printed circuit (FPC) cable, etc. Alternatively, the digital interface 40 may be implemented as any suitable type of wired or wireless interconnection, such as cabling, for example, configured to carry bidirectional communication of digital baseband signal data in accordance with one or more suitable communication protocols.

For instance, the aspects as described throughout this section are not limited to the particular distributed radiohead system, units, or layouts as shown in FIG. 1 to FIG. 5. In other words, the device 100 including a distributed radiohead system as shown in FIG. 2 may have various configurations, with different or alternative components being coupled to or associated with individual dies or chips. To provide an illustrative example, the antenna circuit 25 may include additional components depending upon the particular mode of operation and/or design, including, for example, multiple or arrays of radiating elements or multiple feed ports. For another example, the antenna may be a phased array including one or more phase shifters formed in the silicon.

Moreover, in the last few years, the use of wireless mobile devices has increased rapidly, with high demands on wireless connection performance. High performance wireless connections generally require high power transmissions which may be harmful to human bodies. As a result, government regulations require a reduction of output power levels in the presence of a human body.

The regulations for human exposure to electromagnetic radiation have become a limiting factor in the performance of wireless communication. The effect of reduced power levels may lead to an interrupted connection. In order to prevent unnecessary reduction of power levels, an accurate detection of a human body is critical.

The limitations are explored through the use of specific examples where sensors are triggered falsely by non-human objects, hence limiting the output power of the device when that is not required. Capacitive sensing techniques are proposed to distinguish between human and non-human sensor activation.

Further design criteria for the sensor location, sensor performance and software detection algorithms are discussed. The examples include most common triggers, such as mobile device covers, glass and metal. The ability of the sensor to adapt to the environment is a key aspect in accurate sensing when in proximity to human and non-human objects.

According to various embodiments, a radiohead may be understood as a (distributed) radiohead unit. This means that radiohead includes an antenna circuit and an RF circuit for communication via the antenna, as for example described with reference to FIG. 2.

A modem, e.g. a digital signal processing unit (e.g. as shown in FIG. 5) may perform data processing across multiple antennas (e.g. provided by one or more radiohead circuits), for example for spatial multiplexing or maximum ratio combining (this applies to both the transmitter and the receiver in a communication).

According to various embodiments, a radio communication device, e.g. a movable device capable of radio communication such as a convertible, a transformer, or a robot, may have a plurality of radioheads, e.g. attached to different parts of its housing.

Figure 7:
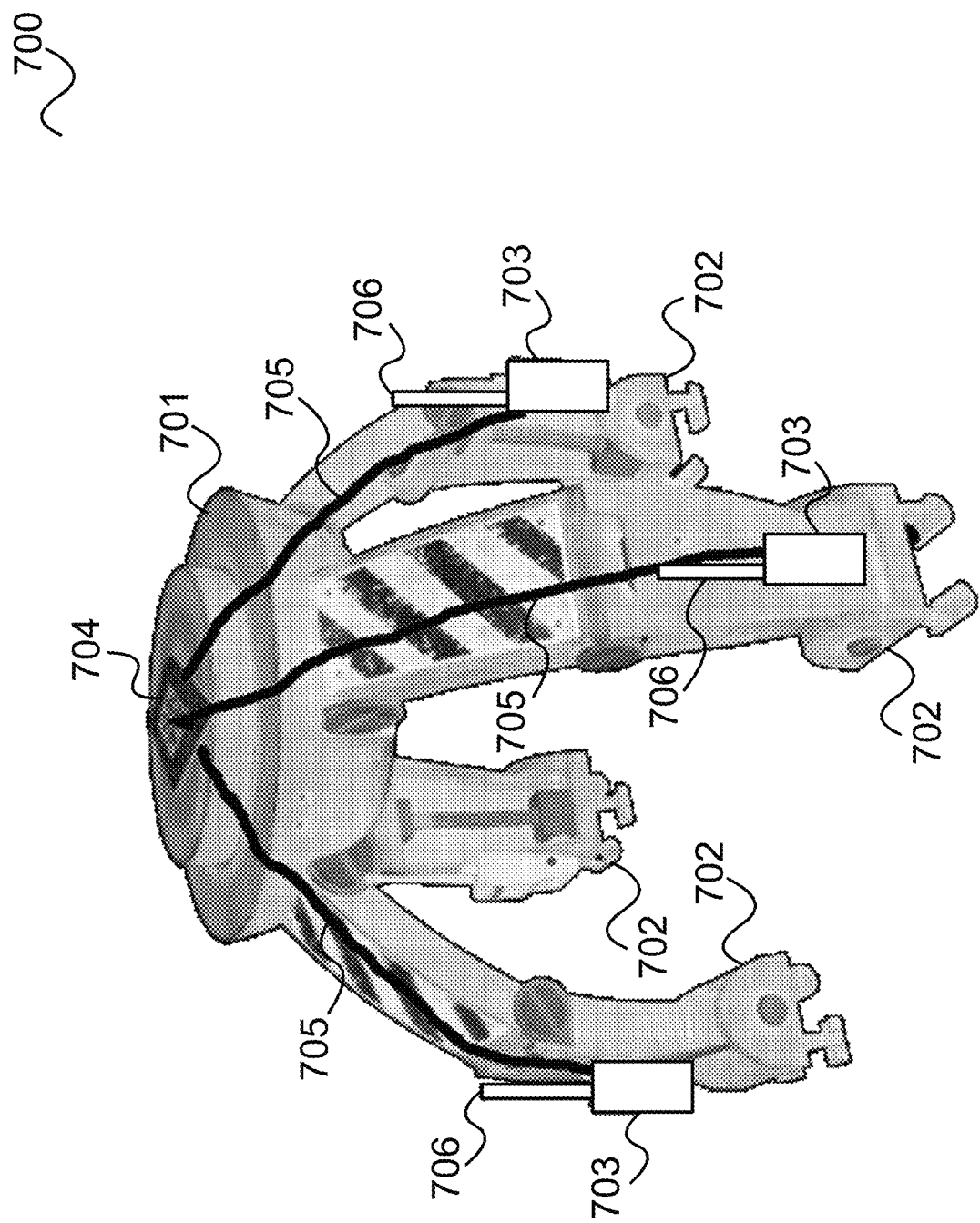
FIG. 7 shows a radio communication device according to an embodiment.

FIG. 7 shows a radio communication device 700 according to an embodiment.

In this example, the radio communication device 700 is a robot which has parts which are movable with respect to each other, in this case a torso 701 and four legs 702.

On each leg, a radiohead 703 is placed. On the torso, a digital signal processing unit 704 (e.g. as shown in FIG. 5) is placed. The digital signal processing unit 704 is connected to the radioheads 703 via communication connections 705. The communication connections 705 may be wired connections as illustrated in FIG. 7 but may also be wireless connections.

The communication connections 705 implement a digital communication interface between the digital signal processing unit 704 and each of the radioheads 703. For example, digital baseband signals are exchanged between the radioheads 703 and the digital signal processing unit 704 via the communication connections 705.

Each radiohead 703 may include (or be co-located) with at least one respective radio antenna 706 and supports radio communication via the respective at least one radio antenna 706. The radioheads 703 are fixed to the housing of the radio communication device, i.e. the legs 702 in this case. The radioheads 703 may have different radio capabilities. For example, they may differ in the number of antennas 706 they include or can use, the frequency bands they support, the number of frequency bands they support, etc.

The digital signal processing unit 704 may include one or more processors which decide which radioheads 703 to use for a communication with another radio communication device. For example, the digital signal processing unit 704 performs communication with the other radio communication device for an application processor of the radio communication device (which may or may not be part of the same chip as the digital signal processing unit 704). In the example of a robot, the digital signal processing unit 704 may for example perform communication for a controller of the robot, e.g. to exchange information with other robots or with stationary communication devices in the robot's vicinity, e.g. to receive control commands or to report measurement data.

Figure 8:
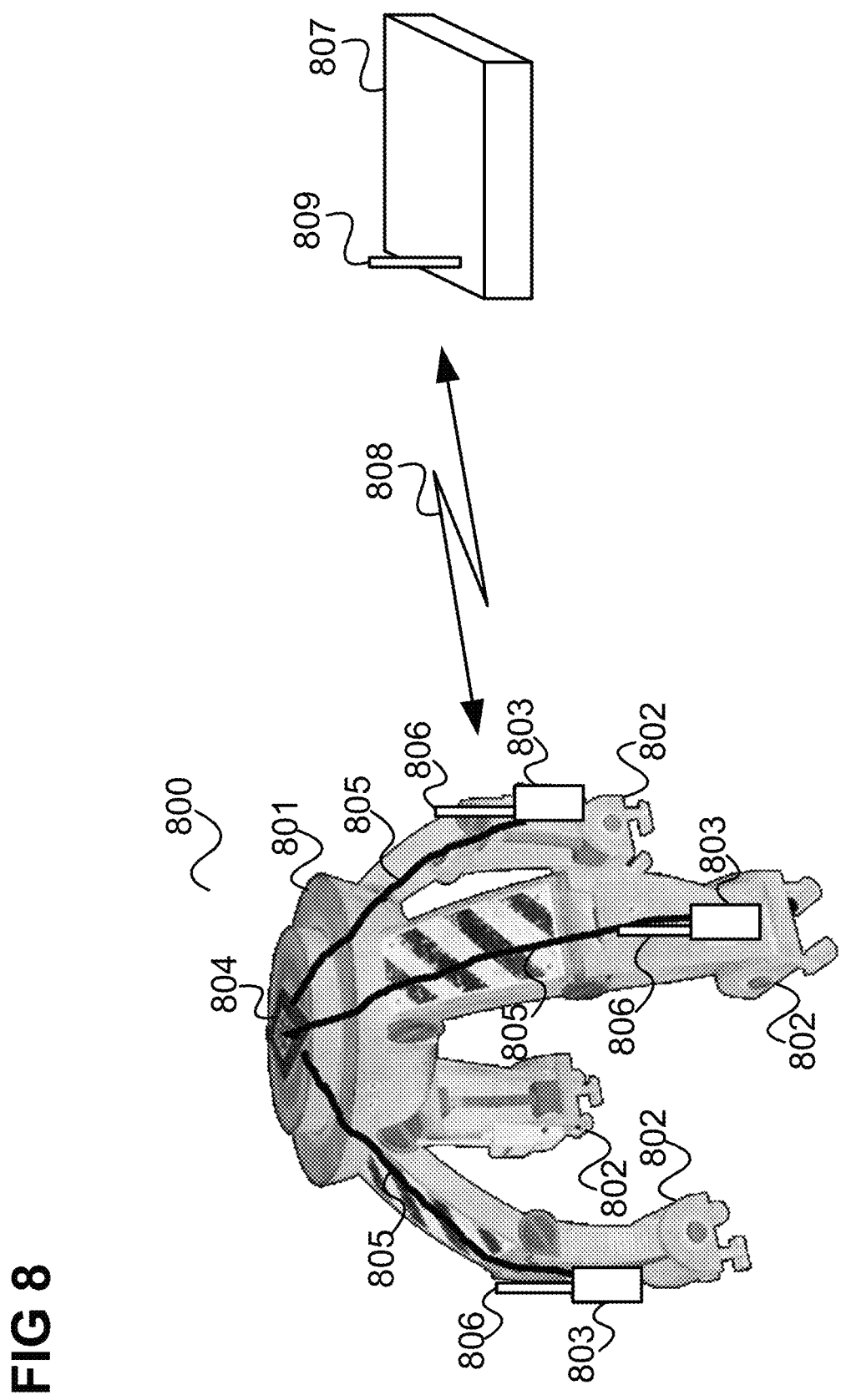
FIG. 8 illustrates a communication of a radio communication device with another radio communication device.

FIG. 8 illustrates a communication of a radio communication device 800 with another radio communication device 807.

The radio communication device 800 for example corresponds to the radio communication device 700. The other radio communication device 802 is in this case illustrated as a stationary radio communication device but may also be itself movable, e.g. may be another robot (or another convertible). As described with reference to FIG. 7, the radio communication device 800 includes a torso 801 with a digital signal processing unit 804 and legs 802, each with a radiohead 803 which is connected to the digital signal processing unit 804 via a respective communication connection 805. Each radiohead 803 includes or is connected to at least one respective antenna 806.

The digital signal processing unit 804 provides communication, e.g. for an application processor or a controller of the radio communication device 800. For sending data, the digital signal processing unit 804 digitally transmits data to be sent to the other radio communication device 807 to one or more of the radioheads 803 via the respective communication connections 805. The one or more radioheads 803 forward these data by radio communication to the other radio communication device 807. For receiving data, one or more radioheads 803 (instructed, by the digital signal processing unit 804, to receive radio signals) receive radio signals from the other radio communication device 807, convert them to digital baseband signals and transmit the digital baseband signals via the respective communication connections 805 to the digital signal processing unit 804.

For sending radio signals to the other radio communication device 807 and receiving radio signals to the other radio communication device 807, a radiohead 803 uses a radio link 808 via its one or more antennas 806 and one or more antennas 809 of the other radio communication device 807.

The fact that the radio communication device 800 includes multiple radioheads 803 provides the radio communication device 800 with redundancy. For example, one or more of the radioheads 803 may be obstructed (e.g. by the radio communication device 800 itself, e.g. by its torso 801 or one of its legs 802) such that the radiohead cannot exchange radio signals with the other radio communication device 807 at reasonable quality. The digital signal processing unit 804 may therefore select one or more of the radioheads 803 which it uses for radio communication with the other radio communication device 807. For example, one or more processors of the digital signal processing unit 804 may select, based on one or more selection criteria, which one or more radioheads base circuitry of the digital signal processing unit 804 should use for communication with the other radio communication device 807.

The one or more selection criteria may take into account the communication quality that is achievable with the various radioheads 803. For example, each radiohead 803 may measure its radio link quality to the other radio communication device 807. This measurement may for example be a signal-to-noise ratio (SNR) or an RSSI (received signal strength indicator).

When the digital signal processing unit 804 decides to use more than one of the radioheads for communication with the other radio communication device 807, it may use each radiohead to receive a respective one (or possible more than one) spatial stream(s). The digital signal processing unit 804 may use the multiple spatial streams for spatial diversity or MIMO (multiple input-multiple output) communication.

Accordingly, the selection criteria may also include whether multiple spatial streams should be used, e.g. whether MIMO communication should be used, etc.

The selection criteria may also depend on the radiohead hardware. For example, as mentioned above, the radioheads 803 may have different capabilities (depending, for example, on their hardware). Accordingly, the selection criteria may also take into account the various capabilities of the radioheads 803. For example, the digital signal processing unit 804 may only select radioheads which are capable to communicate in a certain frequency band. The digital signal processing unit 804 may also select a plurality of radiohead units to mix radio communication technologies, e.g. to ensure a sufficient communication quality, e.g. a radiohead supporting WiFi and a radiohead supporting BT or a radiohead supporting WiFi and BT and a radiohead supporting usage of a cellular mobile communication system (e.g. LTE or 5G). In particular, the digital signal processing unit 804 may select one or more radioheads 803 per use case of the radio communication device 800.

The selection and corresponding switching between radioheads 803 may be performed during a communication, i.e. such that a communication link between the radio communication device 800 and the other radio communication device 807 can be kept when the configuration changes, e.g. when one or more radioheads 803 get obstructed. For each configuration (i.e. positional relationship of radioheads 803 and other radio communication device 807, including possible obstacles) the digital signal processing unit 804 may select which radioheads 803 should be used for communication (e.g. which provide the best antenna placement for the current configuration). The digital signal processing unit 804 may also decide how many radioheads 803 to select, e.g. by weighing the power consumption against the achievable communication quality.

In the example of a robot, the radioheads are located on the legs 802. In other examples, the radioheads may be located on any parts (e.g. platform modules) of a radio communication platform, e.g. on the keyboard part or the lid of a laptop computer, different sides of a vehicle, etc.

It should be noted that the digital signal processing unit 804 may also select radio heads for sensing and scanning in this manner (i.e. not necessarily for data exchange of useful data with another radio communication device), e.g. scanning for base station broadcast signals, GPS signals, etc. So, the approaches described herein may be applied to any per-radio head capability.

Figure 9:
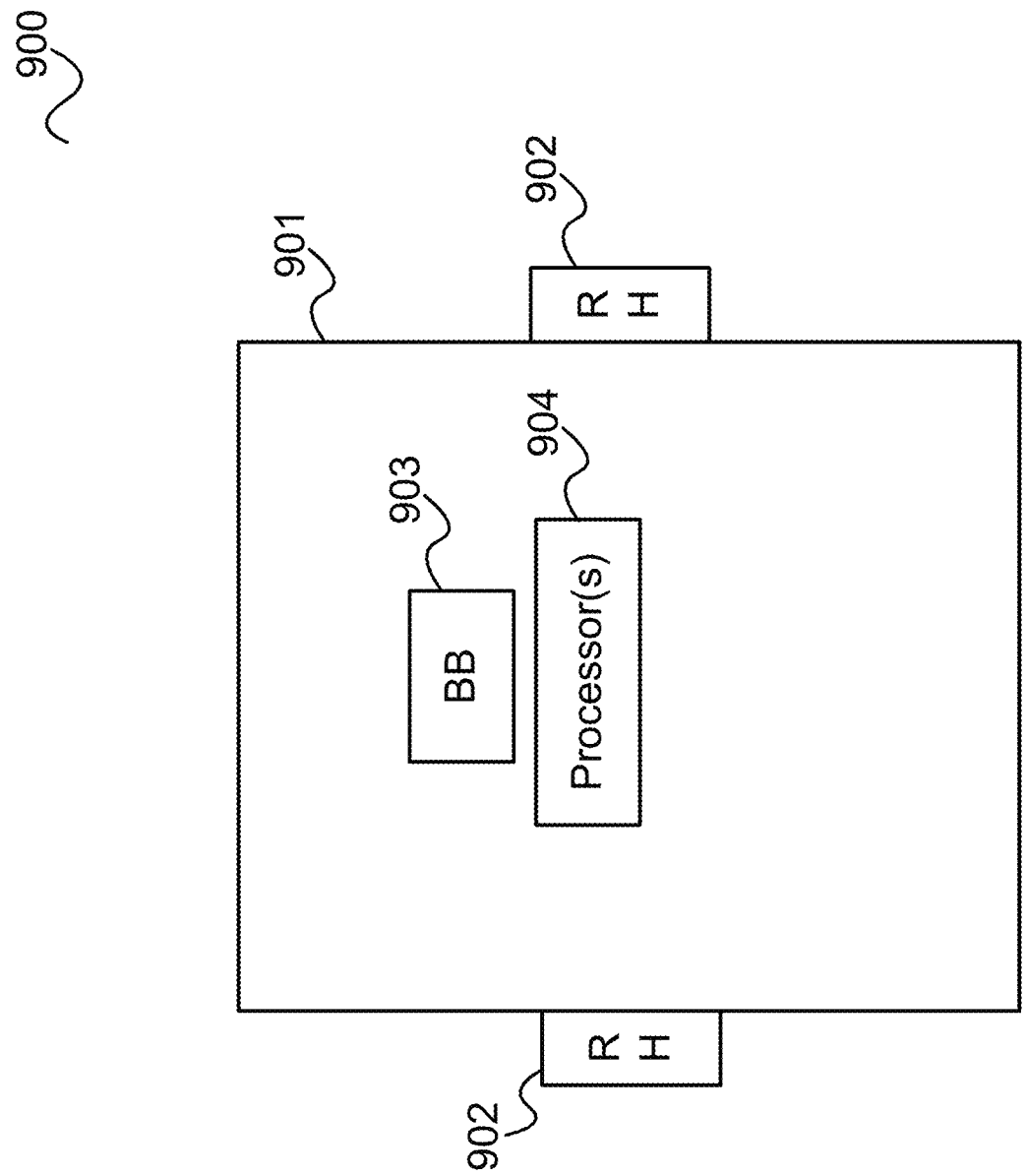
FIG. 9 shows a radio communication device.

In summary, according to various embodiments, a radio communication device is provided as illustrated in FIG. 9.

FIG. 9 shows a radio communication device 900.

The radio communication device 900 includes a housing 901 and a plurality of radiohead circuits 902 attached to the housing 901.

The radio communication device 900 further includes baseband circuitry 903 connected to the radiohead circuits 902 via a digital interface.

Further, the radio communication device 900 includes one or more processors (e.g. a CPU or a microcontroller etc.) 904. The one or more processors 904 are configured to select one or more radiohead circuits of the plurality of radiohead circuits 902 for communication with another radio communication device to fulfil one or more predefined selection criteria with respect to a quality of a communication with the other radio communication device using the one or more selected radiohead circuits and to control the baseband circuitry 903 to perform communication with the other radio communication device using the selected at least one radiohead circuit.

According to various embodiments, in other words, a radio communication device has multiple radioheads and selects one or more radioheads for communication with another radio communication device (which may include reception, transmission or both). The radio communication device selects the one or more radioheads to achieve a high quality of a communication with the other radio communication device. It may however trade-off the quality of the communication with other factors, such as power consumption.

For example, the one or more selection criteria include one or more of the following criteria:
- the quality of a radio link to the other radio communication device that can be provided by a radiohead selected should be above a predetermined threshold;
- the quality of a radio link to the other radio communication device that can be provided by one or more radioheads selected should be above the quality of a radio link that can be provided by the non-selected radioheads;
- the quality of a radio link to the other radio communication device that can be provided by the one or more radioheads is at maximum given the number of radioheads that can be selected;
- a radiohead selected should provide a certain capability (e.g. communication in a certain frequency band);
- a number of radioheads of a predetermined number (e.g. for MIMO communication) should be selected.

It should be noted that "predefined" as well as "predetermined" may mean that, in this case a selection criterion, may be determined or defined according to a preceding decision. For example, the baseband circuit may, before selecting the radioheads, decide about the selection criterion (or selection criteria). The element or information that is predefined or predetermined (in this case a selection criterion) may also be stored in a memory, for example of or connected to the baseband circuitry in the present example. This means that the baseband circuit may be configured to take the selection criterion into account. A controlling entity may also communicate the element or information that is predefined or predetermined. For example, a control entity (e.g. a controlling computer) may communicate the selection criterion (or criteria) to be applied to the baseband circuitry and may thus configure the baseband circuitry. An operator may set the information or element to predefine or predetermine it, e.g. in accordance to a use case.

Figure 10:
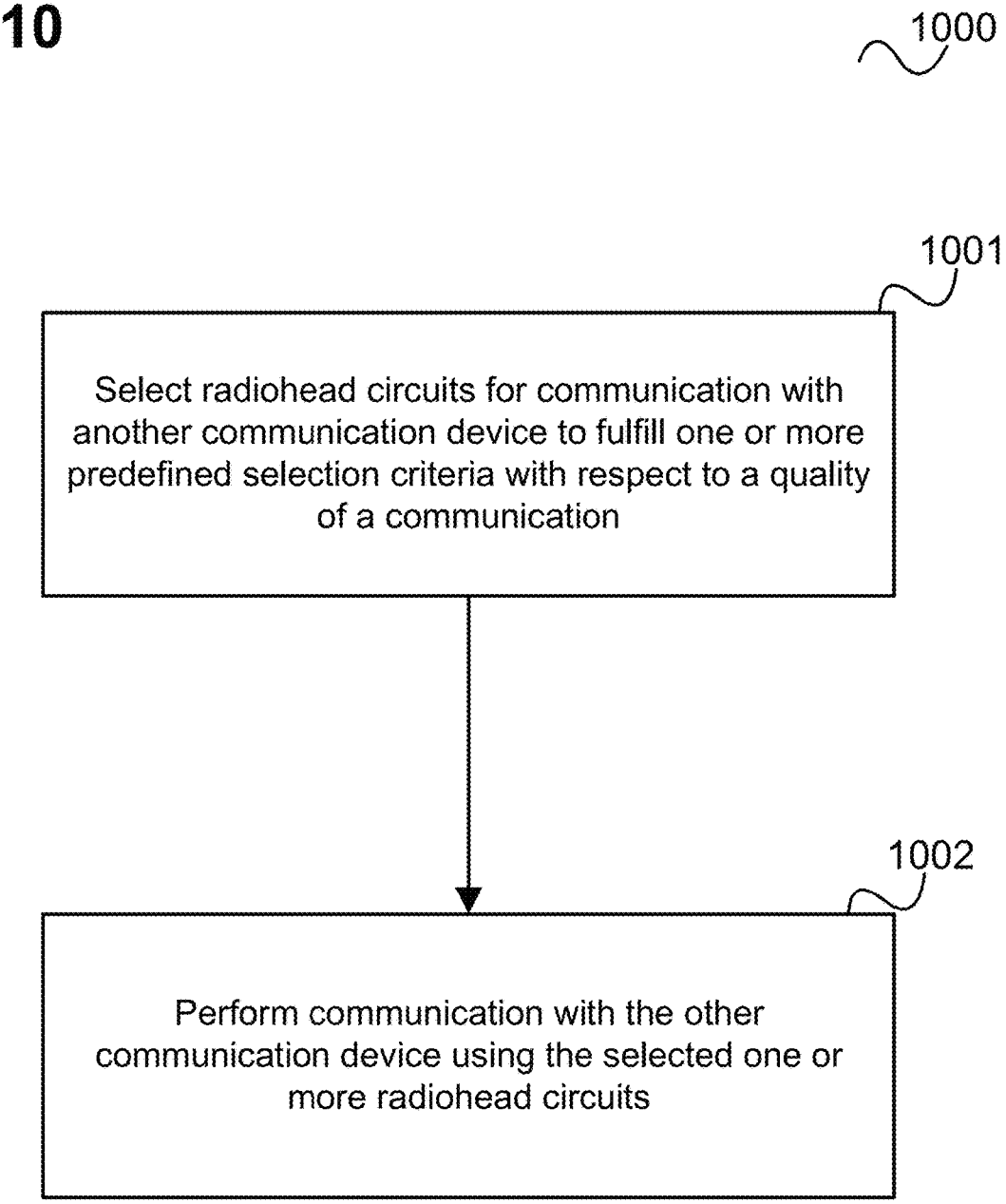
FIG. 10 shows a flow diagram illustrating a method for performing radio communication, carried out by a radio communication device.

The radio communication device for example performs a method as illustrated in FIG. 10.

FIG. 10 shows a flow diagram illustrating a method for performing radio communication, carried out by a radio communication device.

In 1001, the radio communication device selects one or more radiohead circuits of a plurality of radiohead circuits, which are attached to a housing of the radio communication device, for communication with another radio communication device to fulfil one or more predefined selection criteria with respect to a quality of a communication with the other radio communication device using the one or more selected radiohead circuits.

In 1002, the radio communication device controls baseband circuitry to perform communication with the other radio communication device using the one or more selected radiohead circuits.

According to various embodiments, multiple radio communication devices may be configured to be connected together to from a radio communication apparatus. This means that the radio communication devices may form modular components of the radio communication apparatus and one of the radio communication devices may connected to one or more other radio communication devices. An example is a (computing) platform, such as a laptop, transformer or convertible, which consists of multiple modular parts, e.g. a computer having a base part (including the keyboard) and a lid part (including the screen). The communication devices may each have one or more radioheads (i.e. radiohead circuits). This can also be seen that the apparatus (which has the communication devices as detachable modular components) has a plurality of radioheads attached to different ones of its modular components (in particular to different parts of its housing).

Figure 11:
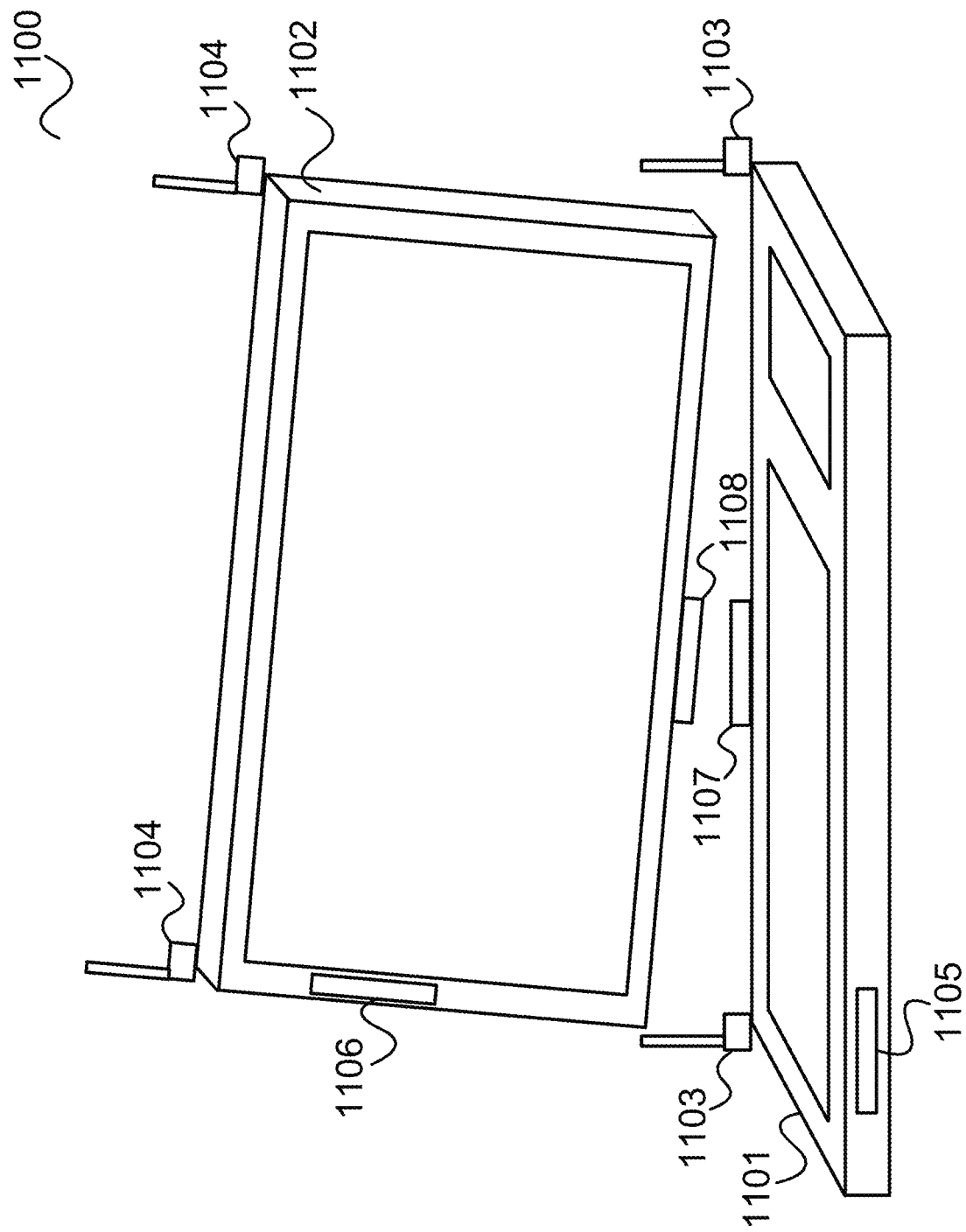
FIG. 11 shows a radio communication apparatus according to an embodiment.

FIG. 11 shows a radio communication apparatus 1100 according to an embodiment.

In this example, the radio communication apparatus 1100 is a convertible which has a first part 1101 and a second part 1102 which are detachable from each other, in this case a base part 1101 (including a keyboard) and a lid part (including a screen) 1102. It should be noted that the radio communication apparatus 1100 may have more than two modular parts (or components) in this manner and that two parts are only used as an example for simplicity.

Each part 1101, 1102 is by its own a radio communication device. In the present example, each part 1101, 1102 has a plurality of radioheads 1003, 1004.

Further, each part 1101, 1102 has a digital signal processing unit 1005, 1006 (e.g. as shown in FIG. 5). The first digital signal processing unit 1005 is for example a base (or platform) controller or base controller and the second digital signal processing unit 1006 is for example a lid controller.

The digital signal processing unit 1005 of the first part 1101 is connected to the radioheads 1103 of the first part 1101 via communication connections (e.g. of a first communication fabric). The communication connections may be wired connections but may also be wireless connections. The communication connections implement a digital communication interface between the digital signal processing unit 1005 of the first part 1101 and each of the radioheads 1103 of the first part 1101.

The digital signal processing unit 1006 of the second part 1102 is connected to the radioheads 1104 of the second part 1102 via communication connections (e.g. of a second communication fabric). The communication connections may be wired connections but may also be wireless connections. The communication connections implement a digital communication interface between the digital signal processing unit 1006 of the second part 1102 and each of the radioheads 1104 of the second part 1102.

Furthermore, the first part 1103 and the second part 1104 include corresponding digital interface circuits 1107, 1108 (e.g. implemented by a socket on one part and a corresponding plug on the other part). When the two parts 1103, 1104 are attached to each other, the digital interface circuits 1107, 1108 form a digital interface which allow the digital signal processing unit 1005 of the first part 1101 to be connected (for digital communication) with the radioheads 1104 of the second part 1102 and the digital signal processing unit 1006 of the second part 1102 to be connected (for digital communication) with the radioheads 1103 of the first part 1101.

The digital signal processing units 1006, 1007 may thus operate as hubs for the radioheads 1103, 1104.

Via a digital connection between a digital signal processing unit 1105, 1106 and a radiohead 1103, 1104, digital baseband signals may be exchanged between the radiohead 1103, 1104 and the digital signal processing unit 1105, 1105.

This means that when the first part 1103 and the second part 1104 are connected (e.g. attached) to each other, the first part 1101 may use the radioheads 1104 of the second part 1102 for wireless communication with another radio communication device and the second part 1102 may use the radioheads 1103 of the first part 1101 for wireless communication with another radio communication device.

Each radiohead 1103, 1104 may include (or be co-located) with at least one respective radio antenna and supports radio communication via the respective at least one radio antenna. The radioheads 1103, 1104 are for example fixed to the respective part 1101, 1102. The radioheads 1103, 1104 may have different radio capabilities. For example, they may differ in the number of antennas 1106 they include or can use, the frequency bands they support, the number of frequency bands they support, etc.

Each digital signal processing unit 1105, 1106 may include one or more processors which decide which radioheads 1103, 1104 to use for a communication with another radio communication device. For example, a digital signal processing unit 1105, 1106 performs communication with the other radio communication device for an application processor of the respective part 1101, 1102 (which may or may not be part of the same chip as the respective digital signal processing unit 1105, 1106). In the example of a computer, a digital signal processing unit 1105, 1106 may for example perform communication for a CPU of the computer, e.g. to exchange information with a base station or an access point, for example for Internet access. Each digital signal processing unit 1105, 1106 may be capable of doing this such that, for example, each part 1101, 1102 may on its own (when the parts 1101, 1102 are detached, i.e. operate independently from each other) connect to the Internet.

When the parts 1101, 1102 are connected to each other by the digital interface circuits 1107, 1108, each part 1101, 1102 (i.e. the digital signal processing unit 1105, 1106) may, as explained above, also use one or more radioheads of the other part. This means that the digital signal processing unit 1105, 1106 are not limited to a single setting (which may in particular correspond to a fixed allocation of antennas) but may flexibly use the radioheads 1103, 1104 and their antennas, e.g. support dynamic allocation of radioheads (and their antennas) and a corresponding (communication) operation mode according to the available resources (e.g. from the available radioheads). The operation mode may for example be a multi-antenna communication using a certain number of antennas when a digital signal processing unit 1105, 1106 has allocated the number of antennas to a communication.

A digital signal processing unit 1105, 1106 may for example determine which resources (i.e. radioheads) are currently available for it. This may in particular include determining whether the part 1101, 1102 which includes the digital signal processing unit 1105, 1106 is connected to the other part 1101, 1102. It may also include determining which radioheads (in particular those of the other part) are currently not in use. For example, the available radioheads for a digital signal processing unit are those radioheads which are located on the same part as the digital signal processing unit which are not in use (i.e. already allocated) and those radioheads which are located on parts connected to the part on which the digital signal processing unit is located which are not in use (i.e. already allocated). It should be noted that "in use" may be per frequency band (or channel).

The digital signal processing unit 1105, 1106 may then (e.g. dynamically) select a set of radioheads from the available radioheads and use them for communication with another communication device. The digital signal processing unit 1105, 1106 may select the set of radioheads to fulfil one or more predefined selection criteria with respect to a quality of a communication with the other radio communication device. For example, it may select the set of radioheads to have the best set of antennas. The "best" may be in the sense that the set of radioheads gives the best communication quality among the various possible selections. However, the respective digital signal processing unit 1105, 1106 may take other factors into account like apply a trade-off logic to balance range, throughput and power consumption.

The digital signal processing unit 1105, 1106 may also select the set of radioheads with the aim to reduce interference between the selected radioheads. For example, it may select the radioheads to enable multiple same-band asynchronous channels by selecting the radioheads to the sufficiently spaced part or isolated from each other.

In the following, various exemplary allocations of radioheads 1103, 1104 to the digital signal processing units are described with respect to FIGS. 12 to 14.

FIG. 12 shows a first example of a radiohead allocation for the radio communication apparatus of FIG. 11.

It is assumed that there are four radioheads 1201 to 1204 and two digital signal processing units 1205, 1206. For example, radioheads 1201, 1202 correspond to radioheads 1103 and radioheads 1203, 1204 correspond to radioheads 1104 and digital signal processing unit 1205 corresponds to the (base) digital signal processing unit 1105 and digital signal processing unit 1206 corresponds to the (lid) digital signal processing unit 1106.

In this example, the first part 1101 and the second part 1102 are assumed to be detached.

Therefore, each digital signal processing units 1205, 1206 uses two of the radioheads 1201 to 1204. Specifically the first radiohead 1201 and the second radiohead 1202 exchange data with the first digital signal processing unit 1205 via communication connections, e.g. a first communication fabric 1207 for a communication (e.g. with a second radio communication apparatus) and the third radiohead 1203 and the fourth radiohead 1204 exchange data with the second digital signal processing unit 1206 via communication connections, e.g. a second communication fabric 1208 for a communication (e.g. with a third radio communication apparatus).

For example, the digital signal processing units 1205, 1206 each perform 2×2 MIMO communication using the respective pair of radioheads allocated to them.

Figure 13:
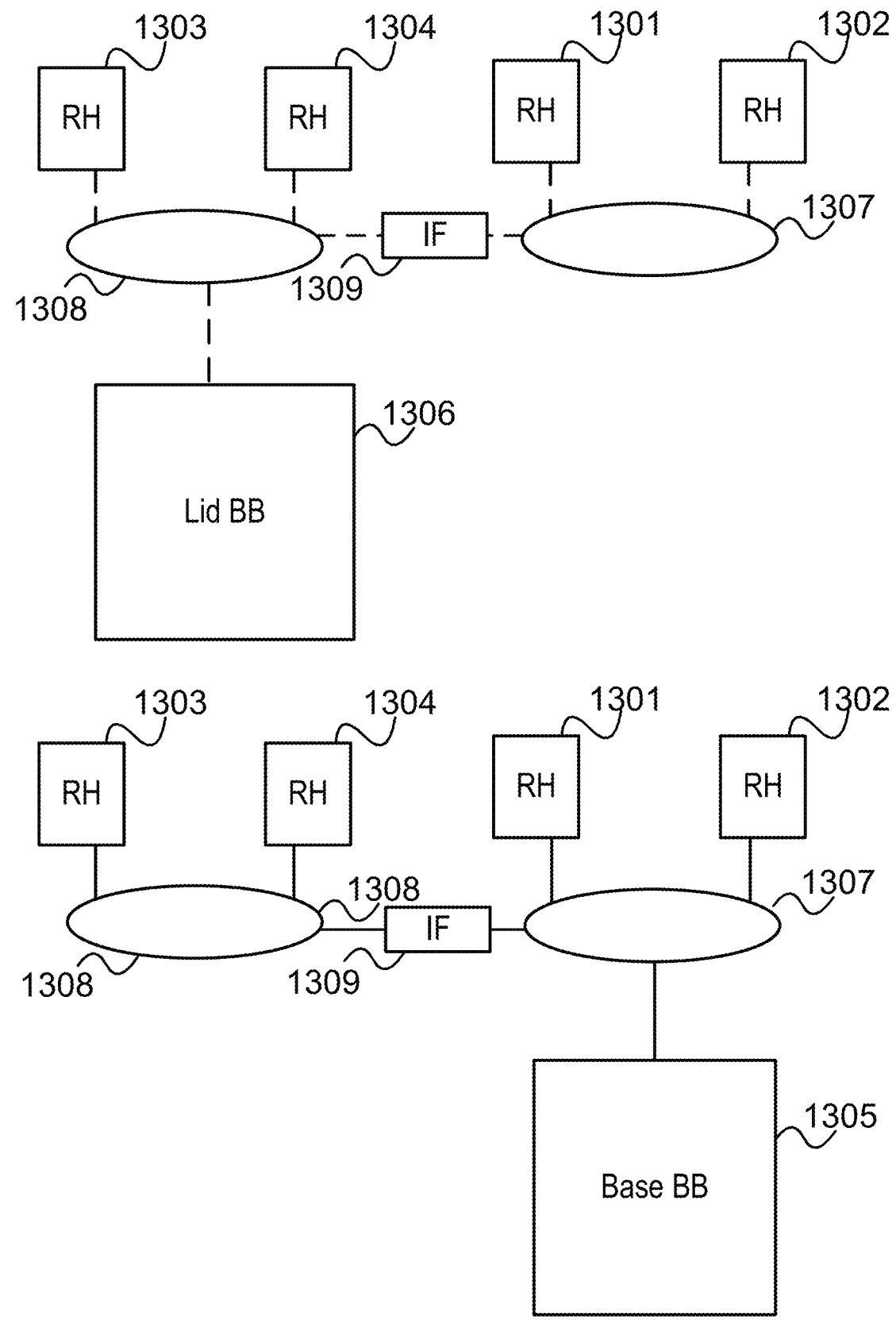
FIG. 13 shows a second of a radiohead allocation for the radio communication apparatus of FIG. 11.

FIG. 13 shows a second of a radiohead allocation for the radio communication apparatus of FIG. 11.

As in FIG. 12, it is assumed that there are four radioheads 1301 to 1304 and two digital signal processing units 1305, 1306. For example, radioheads 1301, 1302 correspond to radioheads 1103 and radioheads 1303, 1304 correspond to radioheads 1104 and digital signal processing unit 1305 corresponds to the (base) digital signal processing unit 1105 and digital signal processing unit 1306 corresponds to the (lid) digital signal processing unit 1106.

In this example, the first part 1101 and the second part 1102 are assumed to be attached. Accordingly, the four radioheads 1301 to 1304 are each connected to both digital signal processing units 1305, 1306 via communication connections, e.g. communication fabrics 1307, 1308 and a digital interface 1309 between the two parts.

In the present example of FIG. 13, it is assumed that all radioheads 1301 to 1304 are allocated to the first digital signal processing unit 1305 which uses the radioheads 1301 to 1304 for example for 4×4 MIMO communication. The second digital processing unit 1306 does not use any one of the radioheads 1301 to 1305. Because of this, the connections are shown as dashed lines (as not being used for data traffic). Analogously, all radioheads 1301 to 1304 may be allocated to the second digital processing unit 1306. It is also possible that the radioheads 1301 to 1304 are distributed to the digital processing units 1305, 1306 as in the example of FIG. 12, i.e. there is no cross-usage of radioheads over the different parts.

It is also possible that the radioheads 1301 to 1304 support independent communication over multiple frequency bands at the same time. In that case, a radiohead may be allocated to both digital processing units 1305, 1306. An example for such a scenario is given in FIG. 14.

Figure 14:
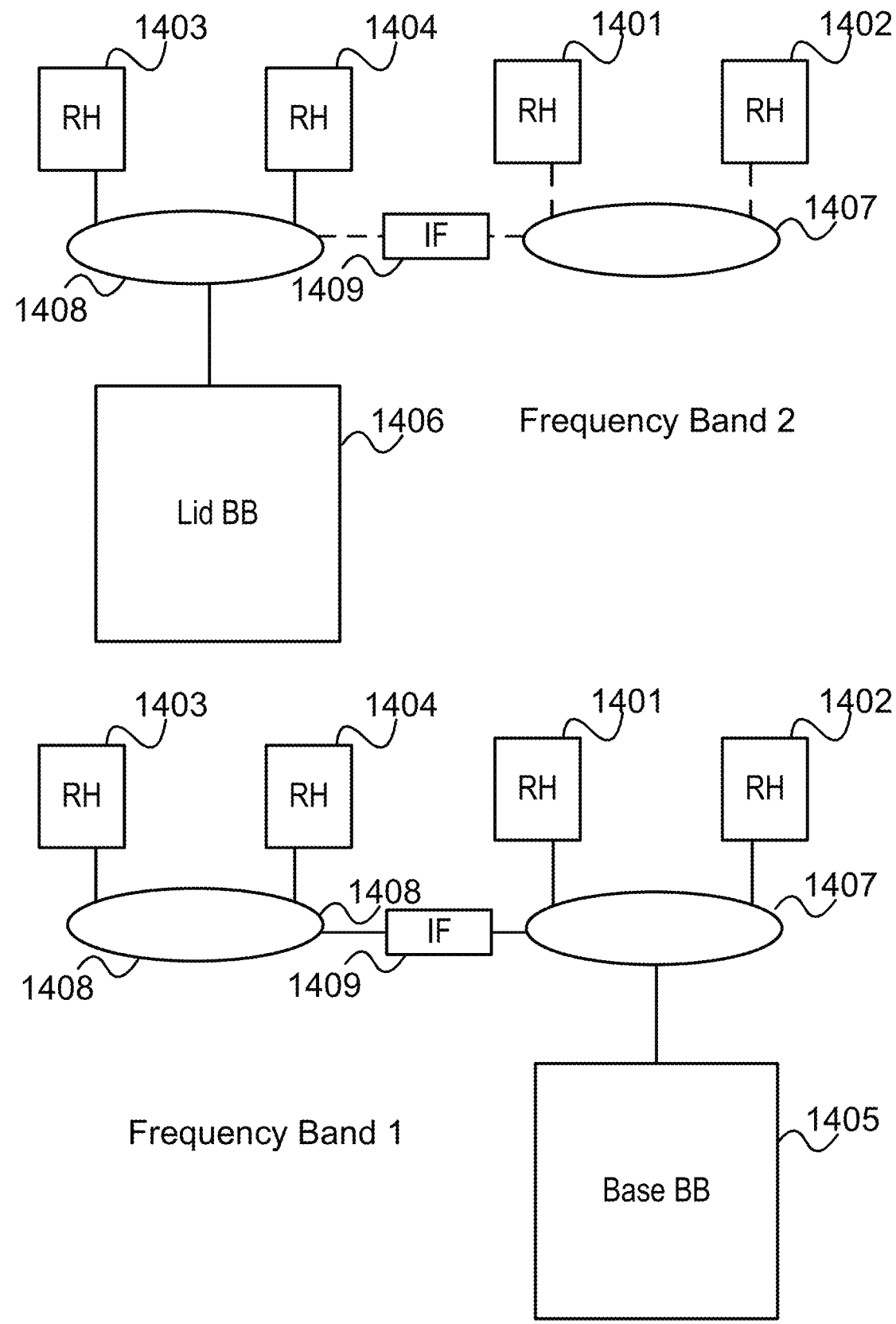
FIG. 14 shows a first second of a radiohead allocation for the radio communication apparatus of FIG. 11.

FIG. 14 shows a first second of a radiohead allocation for the radio communication apparatus of FIG. 11.

As in FIG. 12, it is assumed that there are four radioheads 1401 to 1404 and two digital signal processing units 1405, 1406. For example, radioheads 1401, 1402 correspond to radioheads 1103 and radioheads 1403, 1404 correspond to radioheads 1104 and digital signal processing unit 1405 corresponds to the (base) digital signal processing unit 1105 and digital signal processing unit 1406 corresponds to the (lid) digital signal processing unit 1106.

In this example, the first part 1101 and the second part 1102 are assumed to be attached. Accordingly, the four radioheads 1401 to 1404 are each connected to both digital signal processing units 1405, 1406 via communication connections, e.g. communication fabrics 1407, 1408 and a digital interface 1409 between the two parts.

In the present example of FIG. 14, it is assumed that the radioheads 1401 to 1404 each support communication over two frequency bands. Therefore, a radiohead 1401 to 1404 may be allocated to both digital signal processing units 1405, 1406. In the shown example, all radioheads 1401 to 1404 are allocated to the first digital signal processing unit 1305 which uses the radioheads 1301 to 1304 for example for 4×4 MIMO communication (in a first frequency band) and the radioheads 1403, 1404 of the second part 1102 are allocated to the second digital signal processing unit 1405 which uses the radioheads 1403, 1404 for example for 2×2 MIMO communication (in a second frequency band). It should be noted that while the second digital signal processing unit 1405 might also use all four radioheads 1401 to 1404 (in the second frequency band) it may have decided against it, e.g. because the increase in throughput would, for the present use, not justify the increased power consumption of using four radioheads.

Figure 15:
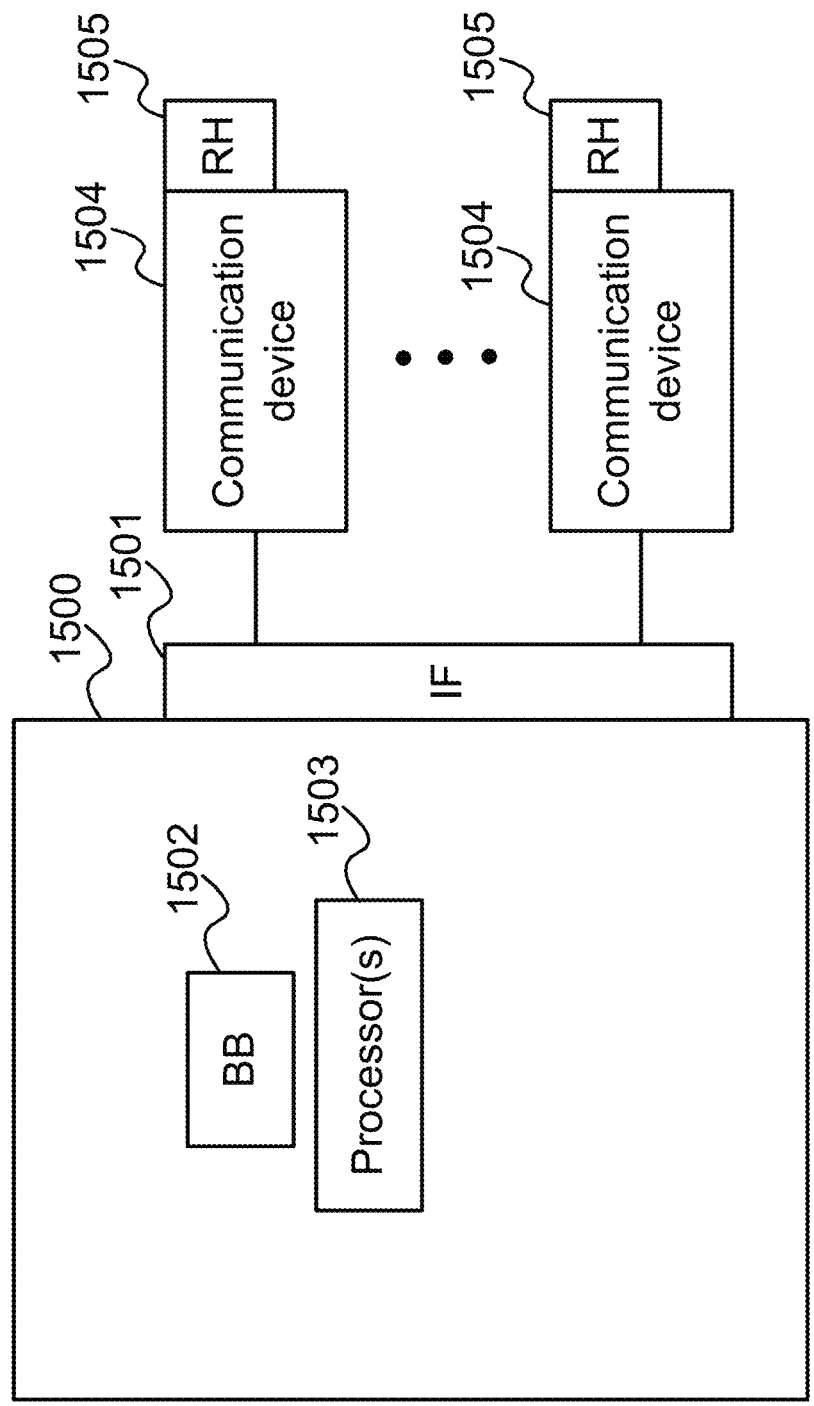
FIG. 15 shows a radio communication device according to an embodiment.

In summary, according to various embodiments, a radio communication device is provided as illustrated in FIG. 15.

FIG. 15 shows a radio communication device 1500 according to an embodiment.

The radio communication device 1500 includes a digital interface circuit 1501 configured to provide a digital interface between the radio communication device 1500 and the one or more other radio communication devices 1504.

The radio communication device 1500 further includes baseband circuitry 1502.

Further, the radio communication device 1500 includes one or more processors (e.g. a CPU or a microcontroller etc.) 1503 configured to check whether the radio communication device is connected to the one or more other ratio communication devices 1504, to select one or more radiohead circuits 1505 of the one or more other radio communication devices 1504 if the one or more other radio communication devices 1504 are connected to the radio communication device 1500 via the digital interface and to control the baseband circuitry 1502 to perform communication using the one or more selected radiohead circuits 1505.

According to various embodiment, in other words, a communication device may use radioheads of one or more other communication devices connected to it. The communication device and the other communication devices may, when they are connected (which they may for example be when they are physically attached to each other, e.g. by means of a joint or a locking mechanism of some sort), form a communication apparatus (or arrangement).

The other radio communication devices may have (at least together) multiple radioheads and the radio communication device may select one or more radioheads for communication with a further radio communication device or apparatus (which may include reception, transmission or both). The radio communication device may select the one or more radioheads to achieve a high quality of a communication with the further radio communication device or apparatus. It may however trade-off the quality of the communication with other factors, such as power consumption.

Each of the one or more radio communication devices may have some or all the features of the radio communication device.

Figure 16:
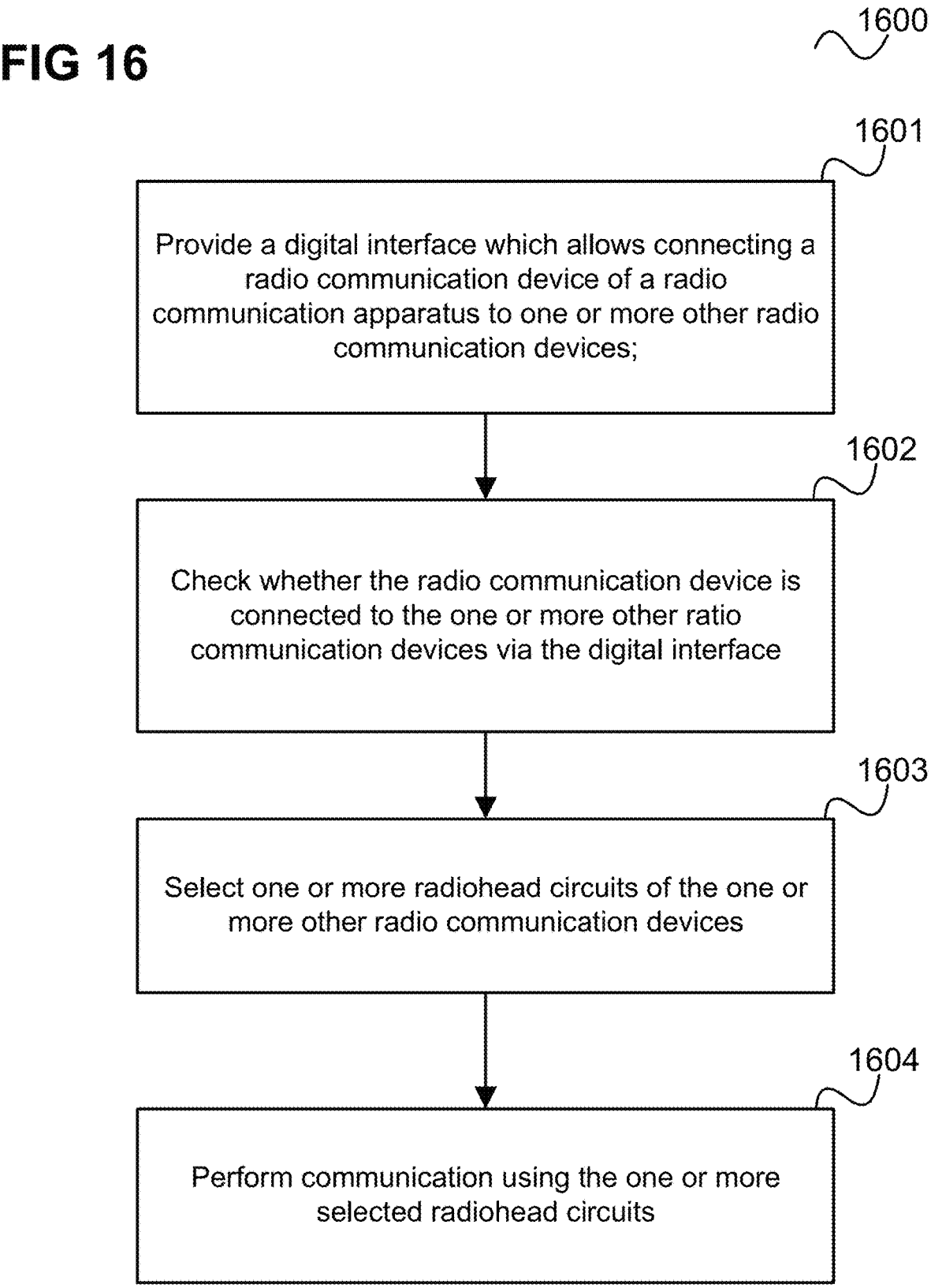
FIG. 16 shows a flow diagram illustrating a method for performing radio communication, for example performed by a radio communication device.

The radio communication device for example performs a method as illustrated in FIG. 16.

FIG. 16 shows a flow diagram 1600 illustrating a method for performing radio communication, for example performed by a radio communication device.

In 1601, the radio communication device provides a digital interface which allows connecting a radio communication device of a radio communication apparatus to one or more other radio communication devices.

In 1602, the radio communication device checks whether the radio communication device is connected to the one or more other ratio communication devices via the digital interface.

In 1603, the radio communication device selects one or more radiohead circuits of the one or more other radio communication devices if the one or more other radio communication devices are connected to the radio communication device via the digital interface.

In 1604, the radio communication device performs communication using the one or more selected radiohead circuits.

According to various embodiments, a radio communication device may have more antennas, e.g. attached to different parts of its housing, than supported by its baseband circuitry.

Figure 17:
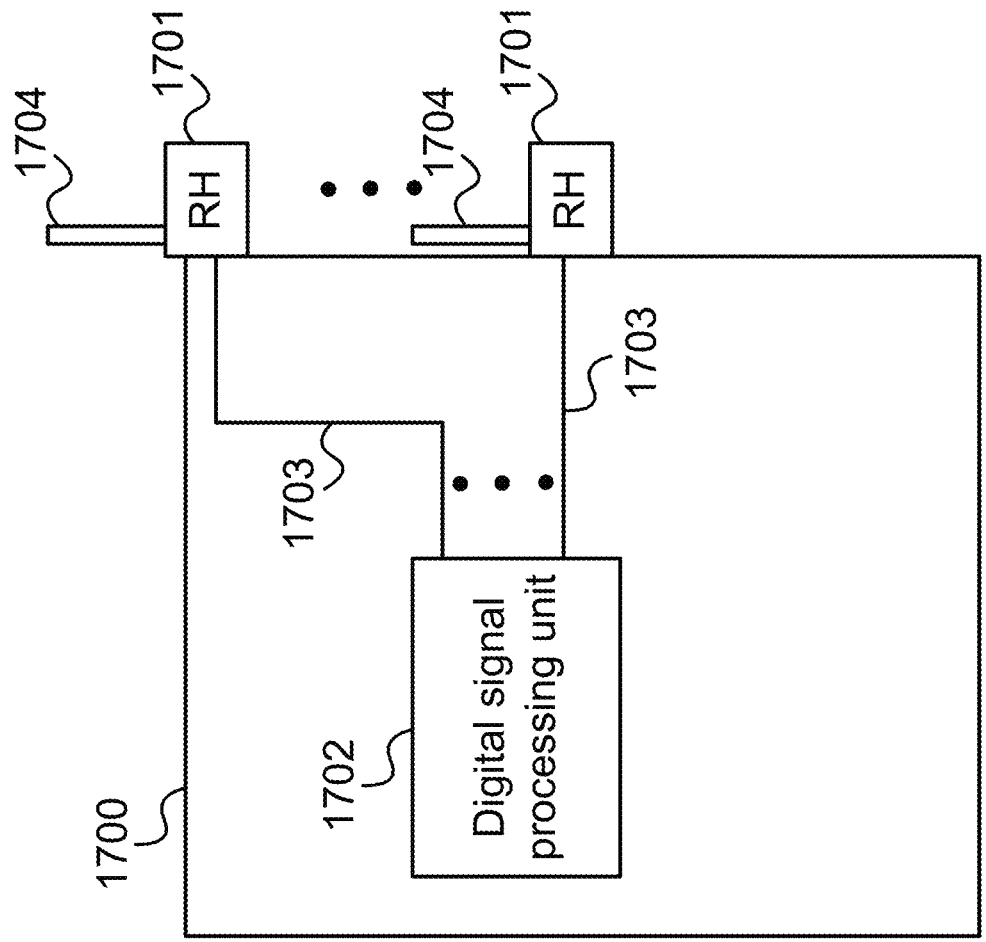
FIG. 17 shows a radio communication device according to an embodiment.

FIG. 17 shows a radio communication device 1700 according to an embodiment.

The radio communication device includes a plurality of radioheads 1701 and a digital signal processing unit 1702 (e.g. as shown in FIG. 5). The digital signal processing unit 1702 is connected to the radioheads 1701 via communication connections 1703. The communication connections 1703 may be wired connections as illustrated in FIG. 17 but may also be wireless connections.

The communication connections 1703 implement a digital communication interface between the digital signal processing unit 1702 and each of the radioheads 1701. For example, digital baseband signals are exchanged between the radioheads 1701 and the digital signal processing unit 1702 via the communication connections 1703.

Each radiohead 1701 may include at least one respective radio antenna 1704 and supports radio communication via the respective at least one radio antenna 1704. For this, each radiohead 1701 may have a RF receiver chain and/or a transmitter chain or a transceiver chain including both a receiver and a transmitter chain for each antenna 1704.

The radioheads 1701 are for example fixed to the housing of the radio communication device 1700. The radioheads 1701 may have different radio capabilities. For example, they may differ in the number of antennas 1704 they include or can use, the frequency bands they support, the number of frequency bands they support, etc.

The radioheads 1701 provide RF chains and, for example, TD (time domain) processing capabilities. The digital signal processing unit 1702 provides FD (frequency domain) processing capabilities and MAC processing capabilities.

According to various embodiments, the radio communication device 1700 has more antennas 1704 than FD processing and/or MAC processing capabilities. This means that the number of spatial streams that the radio communication device 1700, i.e. the digital signal processing unit 1702, can handle (concurrently) is lower than the number of antennas 1704 and the number of RF receiver/transmitter/transceiver chains provided (in total) by the radiohead circuits 1701. Thus, for example, the number of spatial streams that the digital processing unit 1702 can handle is lower than the number of spatial streams for which the radiohead circuits 1701 may handle data, e.g. lower than the number of spatial streams for which the radiohead circuits 1701 for which the radiohead circuits 1701 can receive radio reception data and generate digital reception data.

According to various embodiments, when more (analog or digital) reception data can be provided by the radiohead circuits 1701 than can be handled by the digital signal processing unit 1700, the radio communication device 1700 performs a combination of reception data and/or a selection from among the reception data. This combination and/or selection may be a combination of and/or selection among digital reception data provided by the radiohead circuits but may also be at least partially done in analog domain (e.g. at least partially already in the radioheads). Further, the radio communication device 1700 may perform the combination/selection both in frequency domain and in time domain.

This allows for example benefiting from a multiplicity of RF chains and TD processing in the radioheads 1701 by processing the incoming data (i.e. the reception data) with different options based on processing capabilities.

Figure 18:
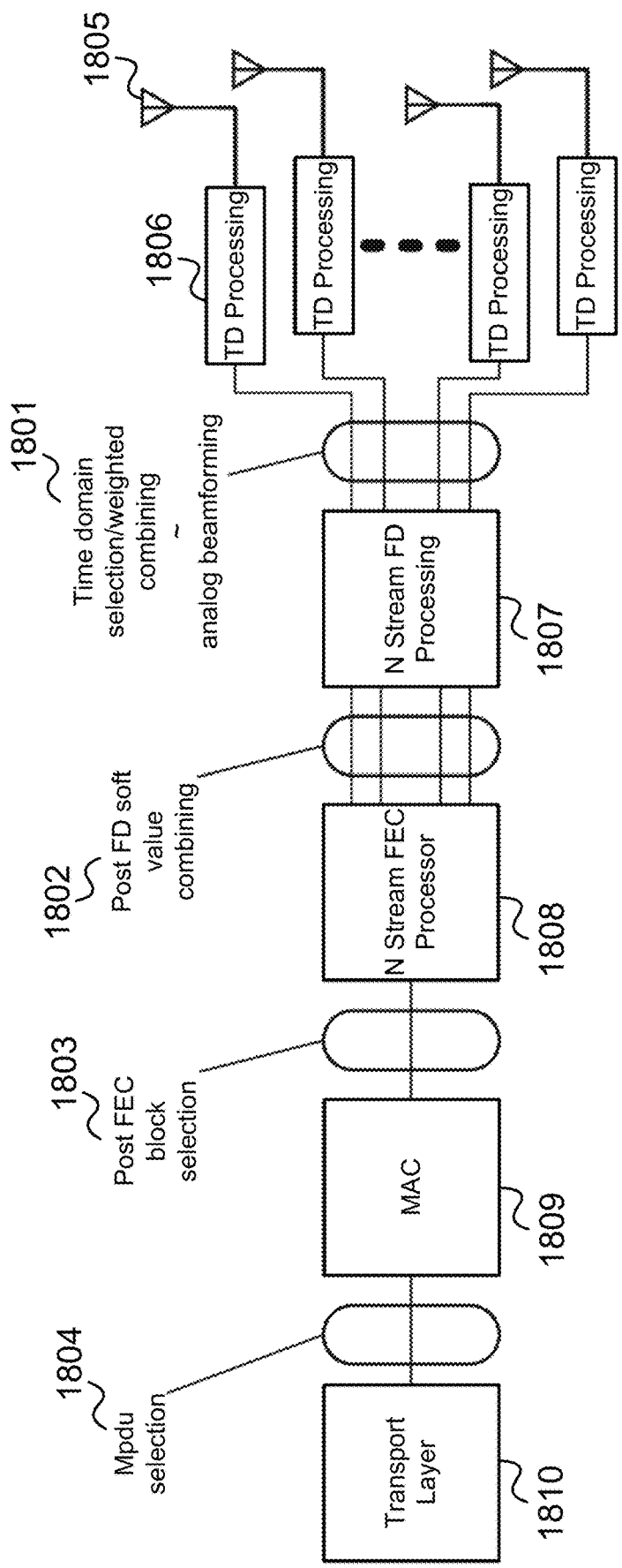
FIG. 18 illustrates multiple options for the combination of reception data and for the selection among reception data according to various embodiments.

FIG. 18 illustrates multiple options 1801 to 1804 for the combination of reception data and for the selection among reception data according to various embodiments.

The radio communication device 1700 may apply the various options 1801 to 1804 at various stages of the reception processing. The reception processing involved in this example includes the reception of radio signals at antennas 1805, TD processing 1806 (e.g. performed by radioheads 1701), FD processing 1807 of the number N of spatial data streams supported by the baseband circuitry (e.g. implemented by digital signal processing unit 1702, for example by an optimal N×M receiver), forward error correction 1808 of the number of spatial streams supported by the base circuitry, MAC processing 1809 which results in MAC Protocol Data Units (MPDUs) and transport layer processing 1810.

Exemplary combination/selection options 1801 to 1804 may include one or more of the following (and may be used individually or in combination by the radio communication device according to various embodiments).

Before the FD domain, the radio communication device 1700 may perform Pre-FD combining/selection 1801. This may for example include RSSI (Received Signal Strength Indicator) or SNR (signal-to-noise ratio) based switched diversity selection. For example, the radioheads 1701 may generate PPDU (Physical Protocol Data Unit) specific RSSI/SNR estimates and a selection unit (e.g. implemented by the digital signal processing unit 1702) may select those PPDUs having the highest RSSI/SNR estimates for processing by the baseband circuitry.

Pre-FD combining/selection 1801 may also include SNR based TD Maximum Ratio Combining. Like the selection of PDDUs, this may be done based on PPDU specific SNR estimates.

After FD processing 1807, the radio communication device 1700 may perform post FD soft value combining 1802. This is applicable if the radio communication device includes multiple baseband processors (or baseband modules) which each supports a partial number of spatial streams. The post FD soft value combining 1802 may then combine (e.g. add) the soft values output by different ones of the baseband processors.

After FEC 1808, the radio communication device 1700 may perform a selection of FEC blocks 1803 (e.g. Low-density parity-check code (LDPC)). For example, the radio communication device 1700 may select LDPC blocks and forward the LDPC blocks to the MAC layer which have passed a parity check. The radio communication device 1700 discards the LDPC blocks which have not passed the parity check.

After MAC processing 1809, the radio communication device 1700 may perform a selection of MPDUs 1804. For example, the radio communication device 1700 may select MPDUs and pass the MPDUs to the transport layer which have passed a cyclic redundancy check. The radio communication device 1700 may discard the MPDUs which have not passed the redundancy check.

Figure 19:
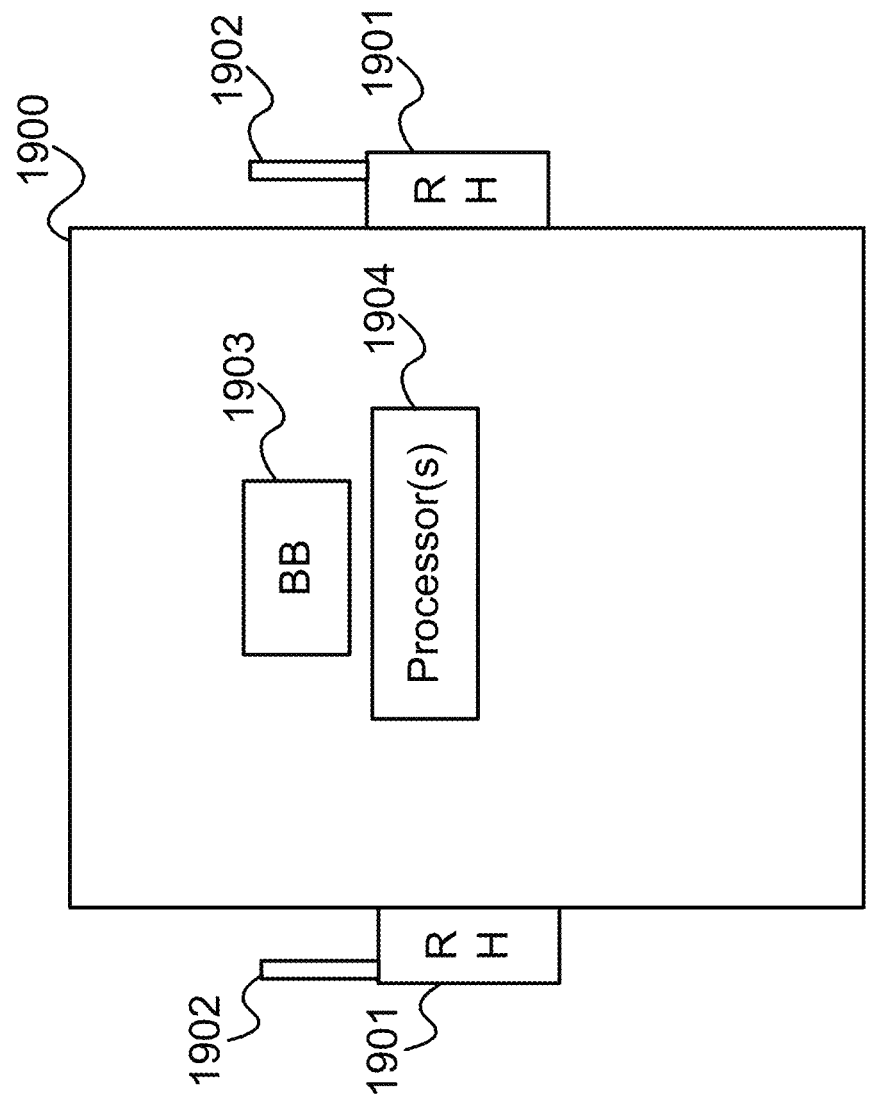
FIG. 19 shows a radio communication device according to an embodiment.

In summary, according to various embodiments, a radio communication device is provided as illustrated in FIG. 19.

FIG. 19 shows a radio communication device 1900 according to an embodiment.

The radio communication device 1900 includes a plurality of radiohead circuits 1901, wherein each radiohead circuit has at least one antenna 1902 and is configured to generate reception data from a radio signal received via the at least one antenna 1902.

The radio communication device 1900 further includes baseband circuitry 1903 configured to support a number of spatial streams that is lower than the number of antennas 1902 of the plurality of radiohead circuits 1901.

Further, the radio communication device 1900 includes one or more processors 1904 configured to process the reception data in accordance with the number of spatial streams supported by the baseband circuitry 1903 by at least one of combining reception data generated from radio signals received via different antennas 1902 or selecting a part of the reception data generated from radio signals received via one antenna 1902 over a part of the reception data generated from radio signals received via another antenna 1902 based on a reception data quality criterion.

According to various embodiments, in other words, when the amount of data received via a communication connection exceeds the capabilities of the radio communication device (in terms of the number of spatial streams for which data is received), the radio communication device reduced the amount of data (at a certain stage of its processing) while increasing the quality of the data. This may happen by combining data (e.g. according to maximum ratio combining) or selecting data which provides, for example, the best reception quality.

According to various embodiments, the number of antennas refers to the total number of antennas, i.e. the number of antennas when the antennas of all radiohead circuits of the plurality of radiohead circuits are counted, i.e. added together.

The approach of FIG. 19 allows maximizing the communication connection robustness given specific mode/processing capabilities which can vary with platform configuration (e.g. with detachable platforms).

It should be noted that spatial streams means independent spatial streams, i.e. spatial streams which may carry different data. For example, the spatial streams may be used for spatial multiplexing (in particular spatial multiplexing of data from different sources or to be sent to different receivers).

Figure 20:
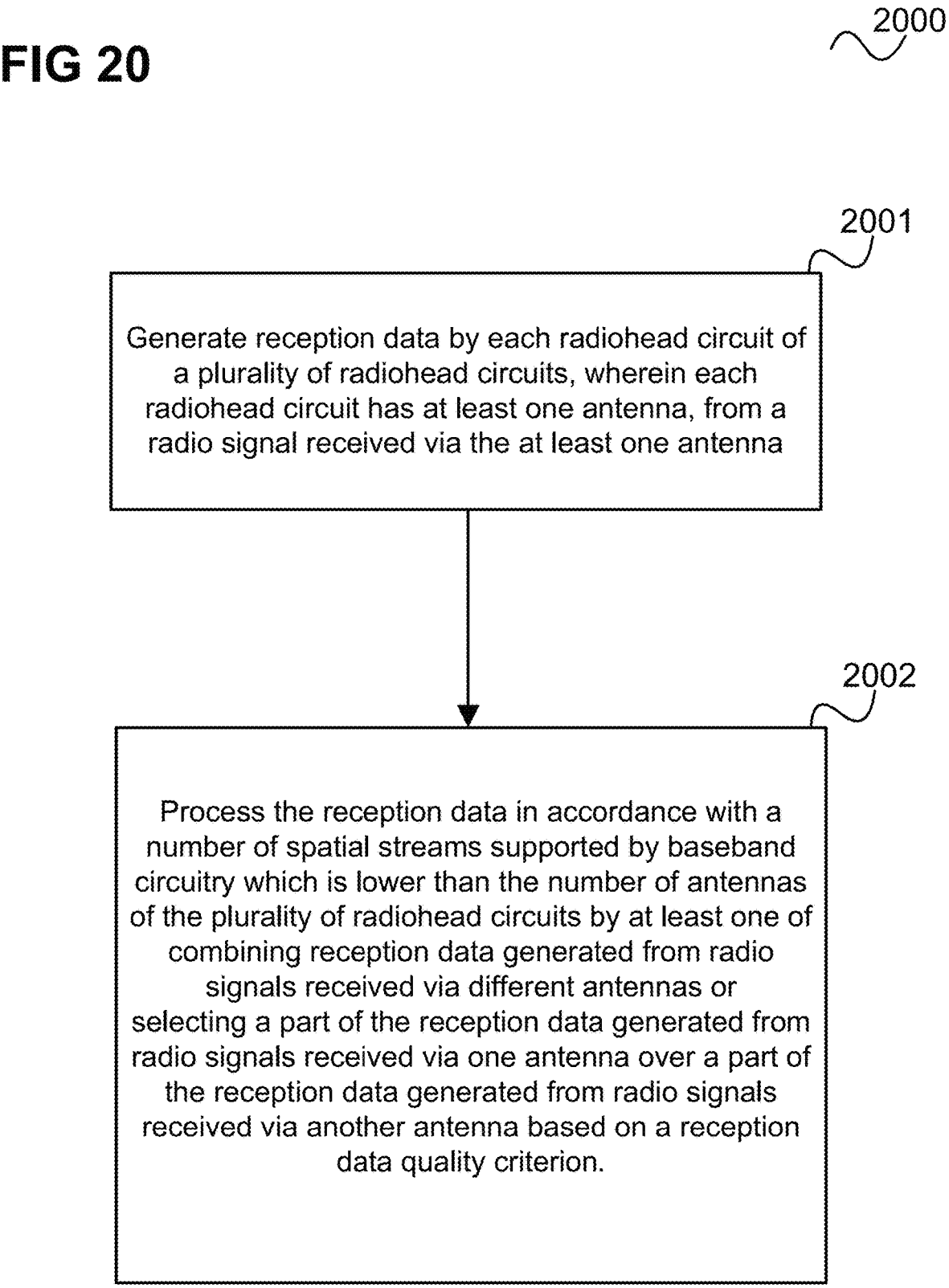
FIG. 20 shows a flow diagram illustrating a method for receiving data according to an embodiment, for example performed by a radio communication device.

According to various embodiments, a method is performed as illustrated in FIG. 20.

FIG. 20 shows a flow diagram 2000 illustrating a method for receiving data according to an embodiment, for example performed by a radio communication device.

In 2001, each radiohead circuit of a plurality of radiohead circuits, wherein each radiohead circuit has at least one antenna, generates reception data from a radio signal received via the at least one antenna;

In 2002, the radio communication device processes the reception data in accordance with a number of spatial streams supported by baseband circuitry which is lower than the number of antennas of the plurality of radiohead circuits by at least one of combining reception data generated from radio signals received via different antennas or selecting a part of the reception data generated from radio signals received via one antenna over a part of the reception data generated from radio signals received via another antenna based on a reception data quality criterion.

According to various embodiments, a radio communication device may have, for example because of having multiple radioheads, a plurality of antennas and may use beamforming. However, the number of antennas may be higher than the number of spatial streams supported by the radio communication device's baseband circuitry or at least higher than the number of spatial streams supported by a single baseband module of the radio communication device (in case the baseband circuitry is formed by multiple baseband modules).

Figure 21:
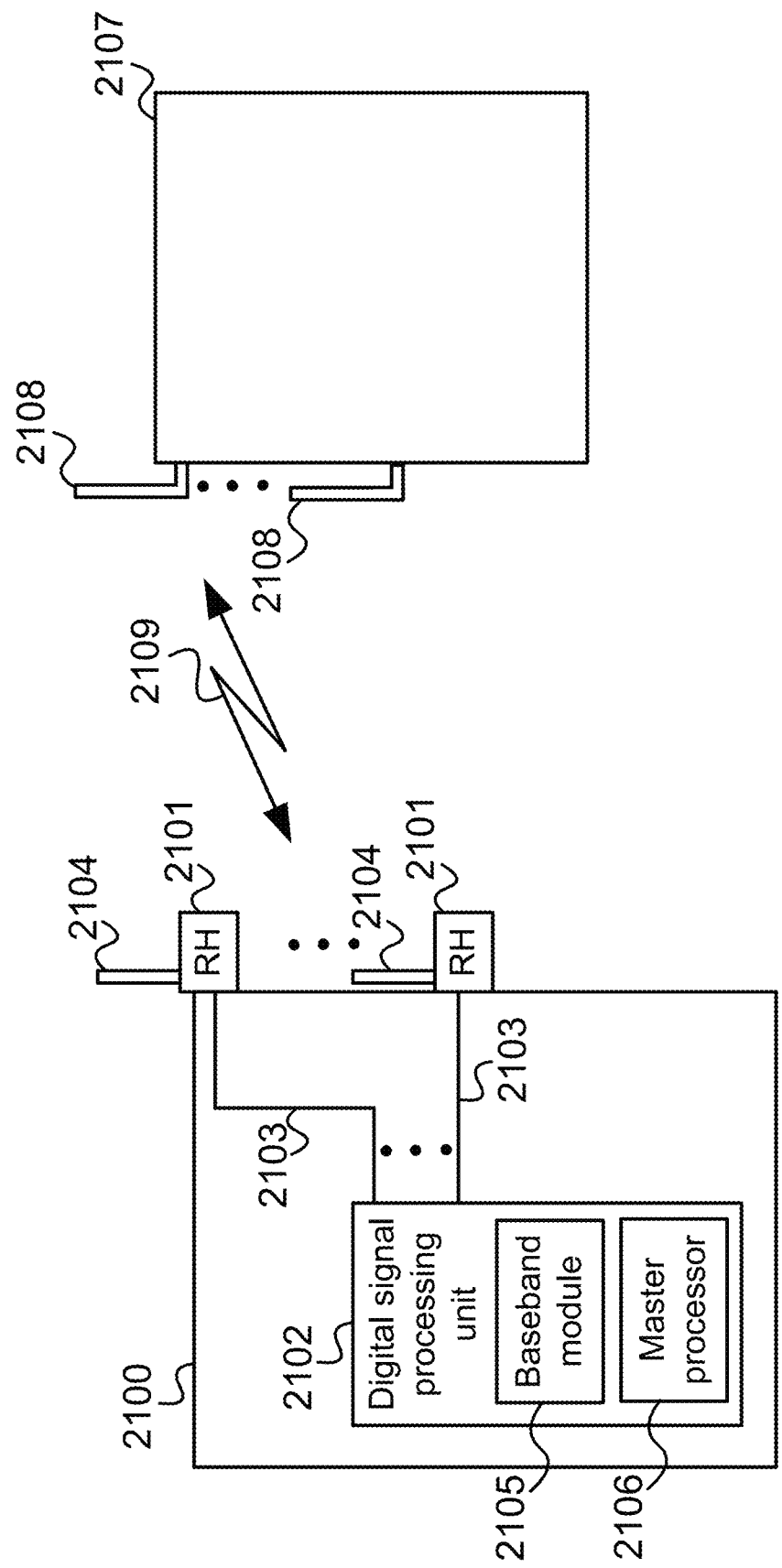
FIG. 21 shows a radio communication device according to an embodiment.

FIG. 21 shows a radio communication device 2100 according to an embodiment.

The radio communication device includes a plurality of radioheads 2101 and a digital signal processing unit 2102 (e.g. as shown in FIG. 5). The digital signal processing unit 2102 is connected to the radioheads 2101 via communication connections 2103. The communication connections 2103 may be wired connections as illustrated in FIG. 21 but may also be wireless connections.

The communication connections 2103 implement a digital communication interface between the digital signal processing unit 2102 and each of the radioheads 2101. For example, digital baseband signals are exchanged between the radioheads 2101 and the digital signal processing unit 2102 via the communication connections 2103.

Each radiohead 2101 may include (or be co-located) with at least one respective radio antenna 2104 and supports radio communication via the respective at least one radio antenna 2104. For this, each radiohead 2101 may have a RF receiver chain and/or a transmitter chain or a transceiver chain including both a receiver and a transmitter chain for each antenna 2104.

The radioheads 2101 are for example fixed to the housing of the radio communication device 2100. The radioheads 2101 may have different radio capabilities. For example, they may differ in the number of antennas 2104 they include or can use, the frequency bands they support, the number of frequency bands they support, etc.

The radioheads 2101 provide RF chains and, for example, TD (time domain) processing capabilities. The digital signal processing unit 2102 provides FD (frequency domain) processing capabilities and MAC processing capabilities.

The digital signal processing unit 2102 includes at least one baseband module 2105 which performs baseband processing. Further, the digital signal processing unit 2102 may include a master processor 2106, for example in the case that it includes multiple baseband modules 2105 which may then be controlled by the master processor 2106.

According to various embodiments, the radio communication device 2100 includes a plurality of antennas 2104. For example, the radio communication device 2100 includes a plurality of radioheads 2101 and each one has at least one antenna 2104. For communication between the radio communication device 2100 and another radio communication device, e.g. an access point 2107, which itself includes a plurality of antennas 2108, beamforming may then be used for communication over a radio channel 2109 between the radio communication device 2100 and the access point 2107. According to various embodiments, the radio communication device 2100 and the access point 2107 use digital beamforming.

According to various embodiments, the access point 2107 uses Explicit Beamforming (BF) feedback provided by the radio communication device 2100 for calculation of beamforming weights for the digital beamforming.

Figure 22:
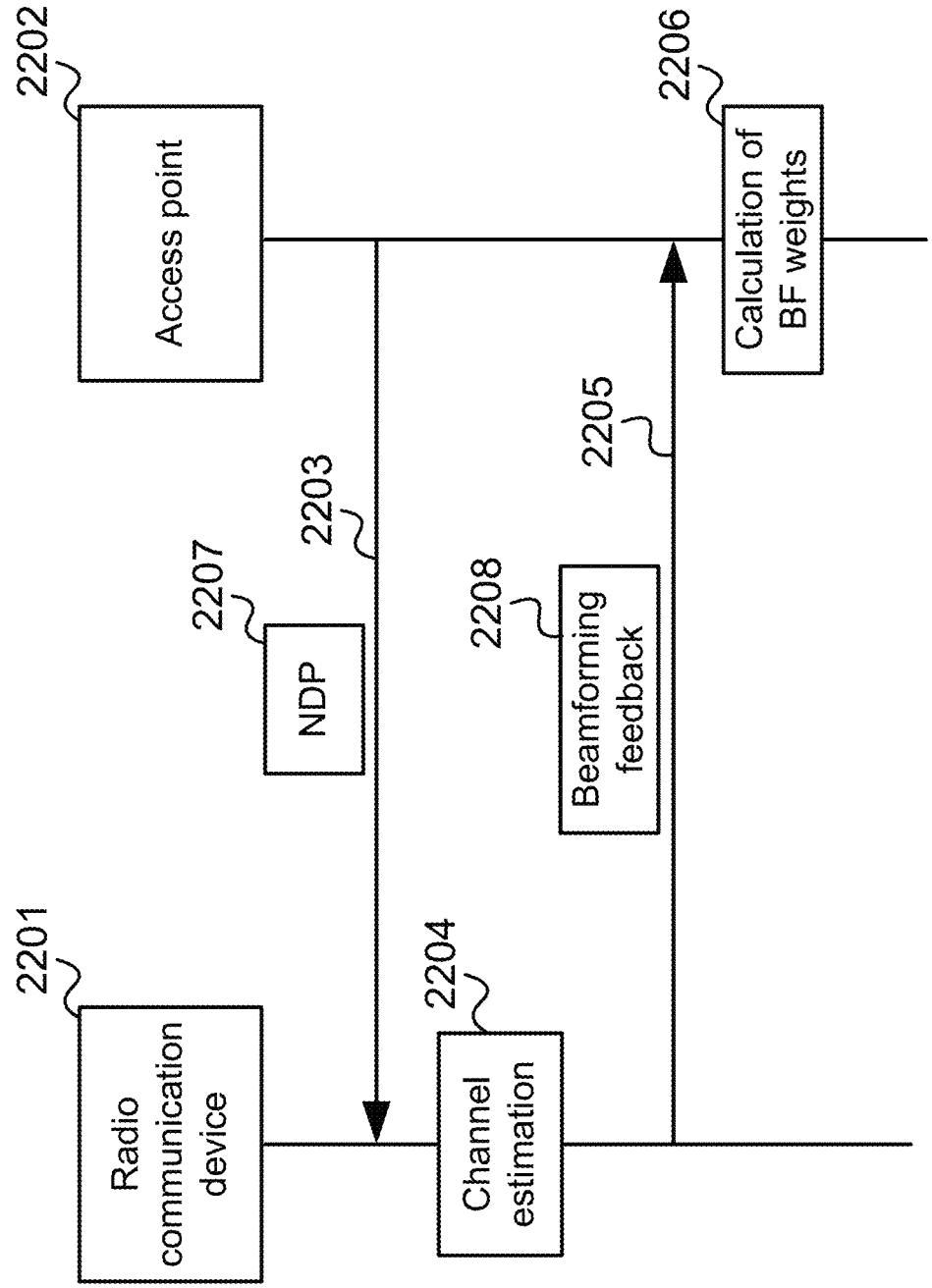
FIG. 22 shows a flow diagram illustrating a message flow for determination of beamforming weights.

FIG. 22 shows a flow diagram 2200 illustrating a message flow for determination of beamforming weights.

A radio communication device 2200, e.g. corresponding to radio communication device 2100, and an access point (or in general another radio communication device) 2202, e.g. corresponding to the access point 2107, are involved in the flow.

In 2203, the access point 2202 transmits an NDP (Null Data Packet) 2207 to the radio communication device 2200. This may be preceded by an NDP Announcement (NDPA) but is not shown here.

In 2204, the radio communication device 2200 (e.g. the digital signal processing unit 2102) measures the channel, i.e. determines channel information (also referred to as channel state information (CSI)) of the radio channel 2109. For this, the radio communication device 2200 typically performs full channel sounding, i.e. the radio communication device 2200 determines the full channel matrix of the radio channel 2109, i.e. measures the full MIMO channel. This means that the channel matrix includes the channel response between each pair of a radio communication device antenna 2104 and an access point antenna 2108.

Even if only a single spatial stream is to be used for communication, the radio communication device 2201 typically measures the full MIMO channel. In 2205, the radio communication device 2101 sends a beamforming feedback report 2208 including beamforming feedback information to the access point in 2205. The beamforming feedback report 2208 may for example include the compressed channel matrix and the radio communication device 2201 for example transmits this with a VHT-CB (Very High Throughput-Compressed Beamforming) frame.

In 2206, the access point 2202 calculates the beamforming weights from the beamforming feedback information. In case of a single spatial stream, the beamforming weights for example correspond to an eigenvector of the largest eigenvalue (or singular value) of the channel matrix.

However, if the number of antennas 2104 is higher than the number of spatial streams supported by the radio communication device 2100 (e.g. the digital signal processing unit 2102), the dimension of the MIMO channel and thus the dimension of the channel matrix is larger than the dimension of the channel information the radio communication device 2100 can or should include into the beamforming feedback report 2208. For example, according to WiFi protocol, the radio communication device 2100 may only send beamforming feedback including a channel matrix whose number of rows (or columns depending on which ones correspond to the radio communication device's antennas; herein it is assumed that this is the number of rows) does not exceed the number of spatial streams supported by the radio communication device 2100.

This issue becomes even more relevant and challenging to address in case of having multiple baseband modules 2105, 2106 since each baseband module supports even less spatial streams than the radio communication device 2100 in total and thus may only send beamforming feedback information of even smaller dimension (i.e. smaller dimension than the total number of spatial streams supported by the radio communication device 2100).

According to various embodiments, the radio communication device uses the extra antennas 2104 (i.e. the antennas exceeding the number of supported spatial streams) distributed in the respective platform (e.g. of the radio communication device 2100) for providing combining gain to the improve the radio link budget. It should be noted that combining cannot be applied for channel sounding.

For example, the AP 2107 pulls a BF feedback report 2208 from the radio communication device 2100, e.g. by sending the NDP 2207 (or by a Beamforming Report Poll). In the case of one baseband module 2105 (i.e. in the case where the radio communication device's spatial capability is the same as the baseband module's spatial capability), the digital signal processing unit 2102 generates and transmits a BF feedback report 2208 which corresponds to the radio communication device's baseband spatial capability (i.e. includes channel matrix information of a dimension corresponding to the number of spatial streams supported by the digital signal processing unit 2102). For this, for example, the digital signal processing unit 2102 separates the set of antennas 2104 into subsets, each having a number of antennas equal to the radio communication device's baseband spatial capability and estimates the channel 2109 separately for each subset (as if there were no extra antennas) and determines the BF feedback information separately for the antenna subsets.

If, for example, the AP 2107 has four antennas 2108 and the radio communication device 2104 has four antennas 2104 but only a spatial capability of two (e.g. in MAC layer implemented by the digital signal processing unit), the radio communication devices calculates BF feedback information for each of two 4×2 matrices (i.e. for each of the submatrices of the full channel matrix). This means that the radio communication device determines multiple parts of BF feedback information (i.e. multiple parts of channel information) wherein each part corresponds to (and for example specifies) a sub-matrix of the full channel matrix.

In case of one single (central) baseband module (e.g. baseband processor) 2105 in the radio communication device 2100, the radio communication device 2100 may transmit the BF feedback information for the sub-matrix of the channel matrix which has the largest eigenvalues (or singular values), e.g. which has the largest eigenvalue (or singular value) among the sub-matrices or which has in average the largest eigenvalues (or singular values).

In case of more than one baseband modules 2105, where for examples each baseband module 2105 handles one of the subset of antennas 2104 (i.e. processes data exchanged via a respective one of the subsets of antennas) the radio communication device, according to one embodiment, sends a feedback report for one subset each time a BF feedback report is pulled. Each time a BF feedback report is pulled, the radio communication device 2100 may select a different subset for transmission to the access point 2107.

Alternatively, in case of more than one baseband module 2105, 2106, each baseband module 2105 may share its channel matrix or its beamforming feedback information with the master processor 2106 and the master processor 2106 may transmit the BF feedback information for the sub-matrix of the channel matrix which has the largest eigenvalues (or singular values), e.g. which has the largest eigenvalue (or singular value) among the sub-matrices or which has in average the largest eigenvalues (or singular values).

The master processor 2106 may also combine the channel information from multiple baseband modules, e.g. in a way corresponding to a maximum ratio combining of reception signals.

Figure 23:
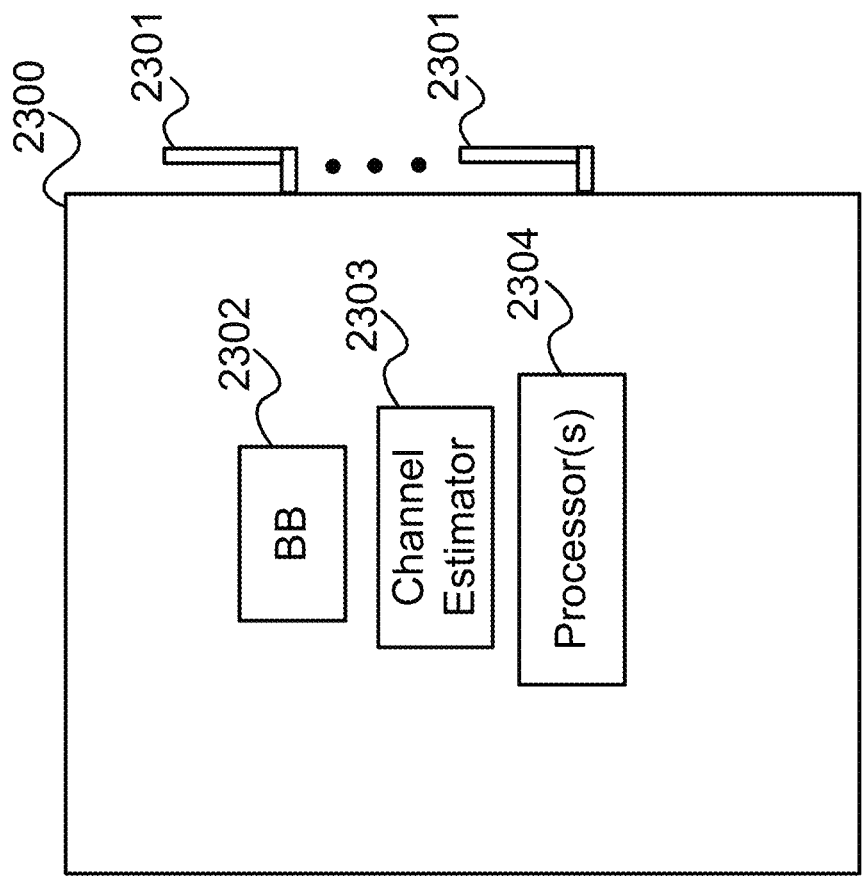
FIG. 23 shows a radio communication device according to an embodiment.

In summary, according to various embodiments, a radio communication device is provided as illustrated in FIG. 23.

FIG. 23 shows a radio communication device 2300 according to an embodiment.

The radio communication device 2300 includes a plurality of antennas 2301, and baseband circuitry 2302 configured to support a number of spatial streams that is lower than the number of antennas of the plurality of antennas 2301.

The radio communication device 2300 further includes a channel estimator 2303 configured to determine first channel information characterizing a multi-antenna radio communication between the radio communication device and another radio communication device using the plurality of antennas 2301 of the radio communication device 2300 and a plurality of antennas of the other communication device.

The radio communication device 2300 includes one or more processors 2304 configured to derive, from the first channel information, second channel information characterizing a multi-antenna radio communication between the radio communication device 2300 and the other radio communication device using a subset of the plurality of antennas of the radio communication device and the plurality of antennas of the other communication device, wherein the subset of antennas includes a number of antennas equal to or lower than the number of spatial streams supported by the baseband circuitry 2302.

The one or more processors 2304 are further configured to report the second channel information to the other radio communication device.

According to various embodiments, in other words, a radio communication device measures the full channel matrix with respect to another radio communication device but only reports a part of the determined channel information of a size that corresponds to the number of spatial streams its baseband circuitry supports. The extra antennas (e.g. additional distributed antennas) which go beyond the number of spatial streams supported by the baseband circuitry provide extra degree of freedom and flexibility in the radio communication device and the radio communication device may use them for improving link quality as a result of combining gain.

If the other radio communication device (e.g. an AP) performs beamforming, the required explicit BF feedback may follow legacy protocols.

According to various embodiments, the approach of FIG. 23 enable BF feedback reports in a radio communication device (i.e. a platform) with distributed extra antennas and multiple baseband processors.

Figure 24:
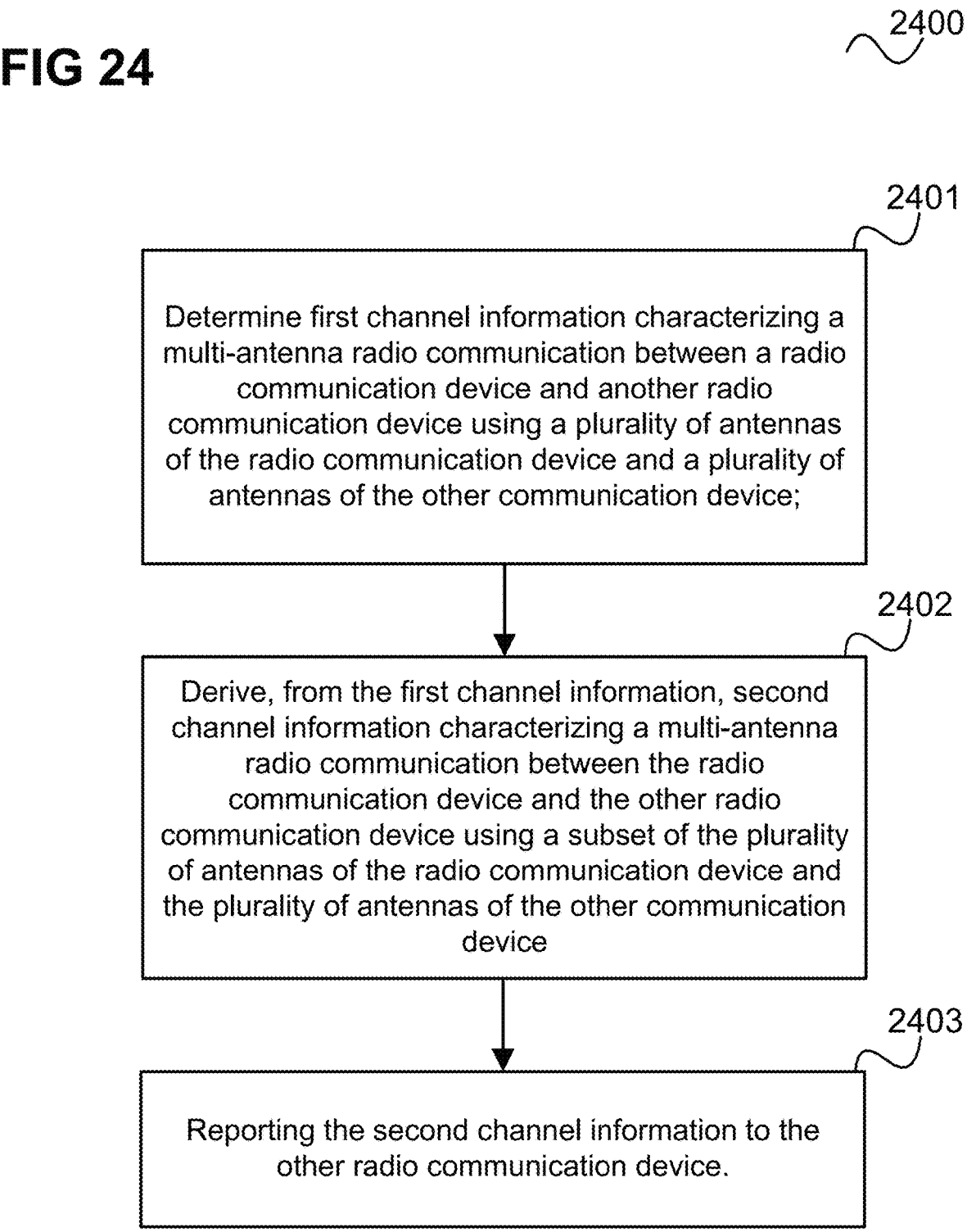
FIG. 24 shows a flow diagram illustrating a method for receiving data according to an embodiment, for example performed by a radio communication device.

According to various embodiments, a method is performed as illustrated in FIG. 24.

FIG. 24 shows a flow diagram 2400 illustrating a method for receiving data according to an embodiment, for example performed by a radio communication device.

In 2401, the radio communication device determines first channel information characterizing a multi-antenna radio communication between a radio communication device and another radio communication device using a plurality of antennas of the radio communication device and a plurality of antennas of the other communication device.

In 2402, the radio communication device derives, from the first channel information, second channel information characterizing a multi-antenna radio communication between the radio communication device and the other radio communication device using a subset of the plurality of antennas of the radio communication device and the plurality of antennas of the other communication device. The subset of antennas includes a number of antennas equal to or lower than the number of spatial streams supported by baseband circuitry of the radio communication device and the number of spatial streams supported by the baseband circuitry is lower than the number of antennas of the plurality of antennas.

In 2403, the radio communication device reports the second channel information to the other radio communication device.

According to various embodiments, a radio communication device may have more antennas, e.g. attached to different parts of its housing, than supported by its baseband circuitry.

Figure 25:
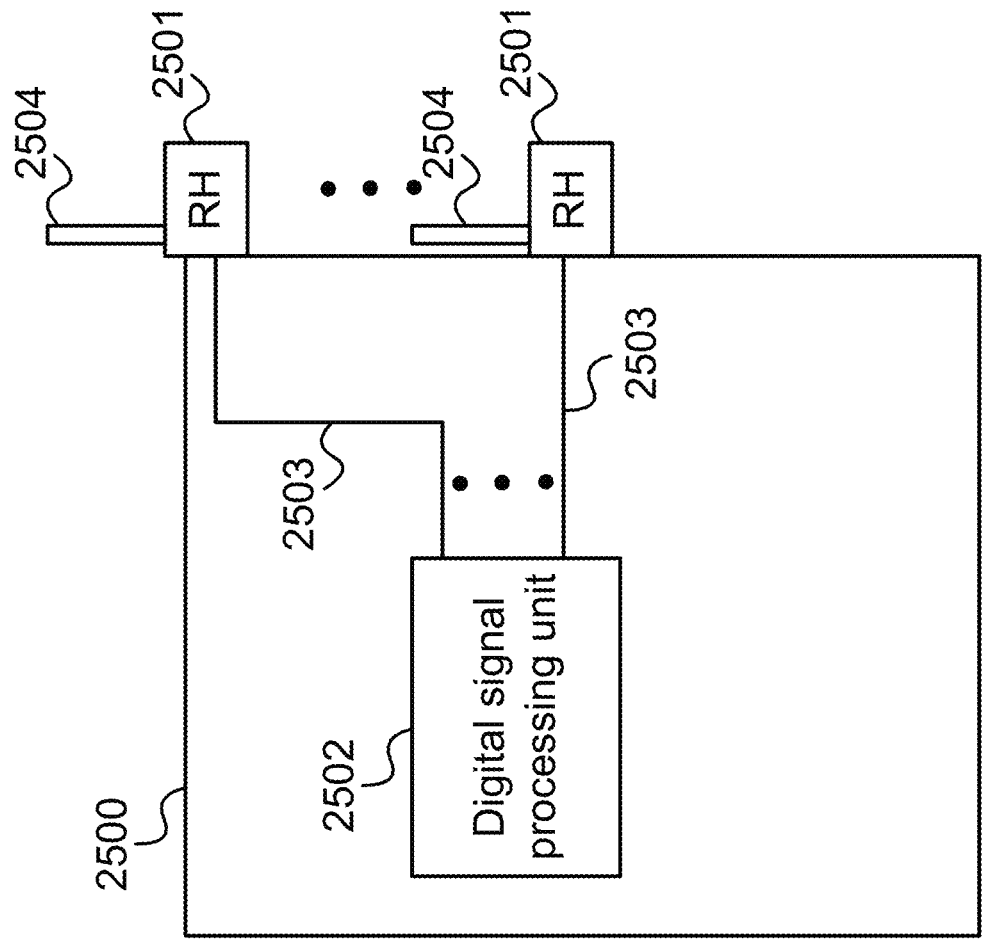
FIG. 25 shows a radio communication device according to an embodiment.

FIG. 25 shows a radio communication device 2500 according to an embodiment.

The radio communication device includes a plurality of radioheads 2501 and a digital signal processing unit 2502 (e.g. as shown in FIG. 5). The digital signal processing unit 2502 is connected to the radioheads 2501 via communication connections 2503. The communication connections 2503 may be wired connections as illustrated in FIG. 25 but may also be wireless connections.

The communication connections 2503 implement a digital communication interface between the digital signal processing unit 2502 and each of the radioheads 2501. For example, digital baseband signals are exchanged between the radioheads 2501 and the digital signal processing unit 2502 via the communication connections 2503.

Each radiohead 2501 may include at least one respective radio antenna 2504 and supports radio communication via the respective at least one radio antenna 2504. For this, each radiohead 2501 may have a RF receiver chain and/or a transmitter chain or a transceiver chain including both a receiver and a transmitter chain for each antenna 2504.

The radioheads 2501 are for example fixed to the housing of the radio communication device 2500. The radioheads 2501 may have different radio capabilities. For example, they may differ in the number of antennas 2504 they include or can use, the frequency bands they support, the number of frequency bands they support, etc.

The radioheads 2501 provide RF chains and, for example, TD (time domain) processing capabilities. The digital signal processing unit 2502 provides FD (frequency domain) processing capabilities and MAC processing capabilities.

According to various embodiments, the radio communication device 2500 has more antennas 2504 than PHY FD processing and/or MAC processing capabilities. This means that the number of spatial streams that the radio communication device 2500, i.e. the digital signal processing unit 2502, can handle (concurrently) is lower than the number of antennas 2504 and the number of RF receiver/transmitter/transceiver chains provided (in total) by the radiohead circuits 2501. Thus, for example, the number of spatial streams that the digital processing unit 2502 can handle is lower than the number of spatial streams for which the radiohead circuits 2501 may handle data, e.g. lower than the number of spatial streams for which the radiohead circuits 2501 for which the radiohead circuits 2501 can receive radio reception data and generate digital reception data.

According to various embodiments, approaches are provided which allow benefitting from extra antennas (i.e. antennas which go beyond the number of spatial streams supported by the radio communication device's baseband circuitry) especially if the radio communication device includes multiple baseband (BB) modules processing data received or to be transmitted via the antennas.

For example, the digital signal processing unit 2502 may switch antennas 2504 to be used in a communication with another communication device to achieve antenna diversity by selecting the antennas 2504 to be used based on radio link quality (e.g. QoS (quality-of-service)) measurements for radio links provided by the antennas. For example, each radiohead 2501 may measure the radio link quality to the other radio communication device for each of the radiohead's antennas 2504. The radio link qualities may for example be a signal-to-noise ratio (SNR) or an RSSI (received signal strength indicator). This is applicable for both reception and transmission from/to the other communication device. The digital signal processing unit 2502 may each time (e.g. periodically) select the antennas with the best link quality for baseband processing.

The digital signal processing unit 2502 may perform the selection of antennas and switching between antennas on the fly, e.g. during PPDU (Physical Protocol Data Unit) based on SNR estimation on (e.g. legacy) preambles.

For example, the radioheads 2501 may generate PPDU (Physical Protocol Data Unit) specific SNR (or RSSI) estimates and a selection unit (e.g. implemented by the digital signal processing unit 2502) may select those antennas via which PPDUs were received which have the highest SNR (or RSSI) estimates.

The digital signal processing unit 2502 may perform the selection of antennas and switching between antennas after association (e.g. with another radio communication device such as an access point) or at wake up of the radio communication device 2500.

The radio communication device 2500 may be configured to perform baseband processing including channel estimation, explicit BF feedback, as well as synchronization only performed for the selected antennas.

According to various embodiments, the digital signal processing unit 2502 selects a number of antennas equal to the spatial capability (e.g. in MAC layer) of the radio communication device 2500.

The radio communication device 2500 may then also send less spatial streams than the number of selected antennas. For this, it may follow legacy protocols (for example for beamforming etc.)

The digital signal processing unit 2502 may assign multiple subsets of the antennas 2504 to different frequency bands. In that case, the digital signal processing unit 2502 may perform the switching and selection per frequency band (in other words, switching is performed on both spatial and frequency domain).

For example, if the radio communication device 2500 has four antennas 2504 and supports two spatial streams the digital signal processing unit 2502 each time selects two of the four antennas. As another example, if the radio communication device 2500 has six antennas 2504 and supports four spatial streams the digital signal processing unit 2502 each time selects four of the six antennas.

Figure 26:
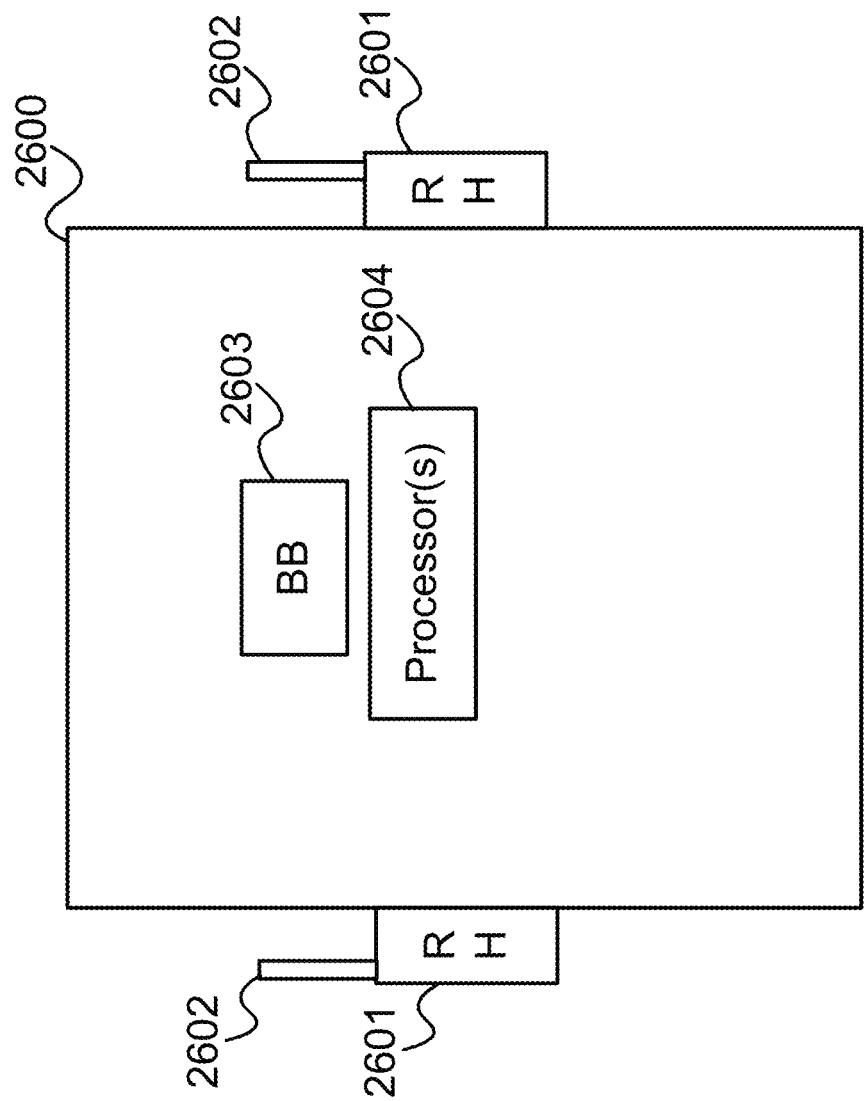
FIG. 26 shows a radio communication device according to an embodiment.

In summary, according to various embodiments, a radio communication device is provided as illustrated in FIG. 26.

FIG. 26 shows a radio communication device 2600 according to an embodiment.

The radio communication device 2600 includes a plurality of radiohead circuits 2601, wherein each radiohead circuit has at least one antenna 2602.

The radio communication device 2600 further includes baseband circuitry 2603 configured to support a number of spatial streams that is lower than the number of antennas 2602 of the plurality of radiohead circuits 2601.

Further, the radio communication device 2600 includes one or more processors 2604 configured to select one or more antennas 2602 of the plurality of radiohead circuits 2601 for communication with another radio communication device, wherein the number of selected antennas is at most equal to the number of spatial streams supported by the baseband circuitry 2603. The one or more processors 2604 are configured to select the one or more antennas to fulfil one or more predefined selection criteria with respect to a quality of a communication with the other radio communication device using the one or more selected antennas.

The one or more processors 2604 are configured to control the baseband circuitry 2603 to perform communication with the other radio communication device using the one or more selected antennas.

According to various embodiments, in other words, when the number of antennas (or the number of spatial streams that could be handled by the front-end) exceeds the capabilities of the baseband circuitry of radio communication device (in terms of the number of spatial streams it can handle), the radio communication device uses a number of antennas according to the capabilities of the baseband circuitry of the radio communication device. This may happen dynamically (even during an established communication connection) such that quality of service (e.g. in terms of signal-to interference and noise ratio) is improved by spatial diversity. For example, reliability and latency can be improved in industry use cases (e.g. for radio communication with or among robots). According to various embodiments, the approach of FIG. 26 allows maintaining power consumption and transceiver complexity especially in the case of having multiple baseband modules.

Figure 27:
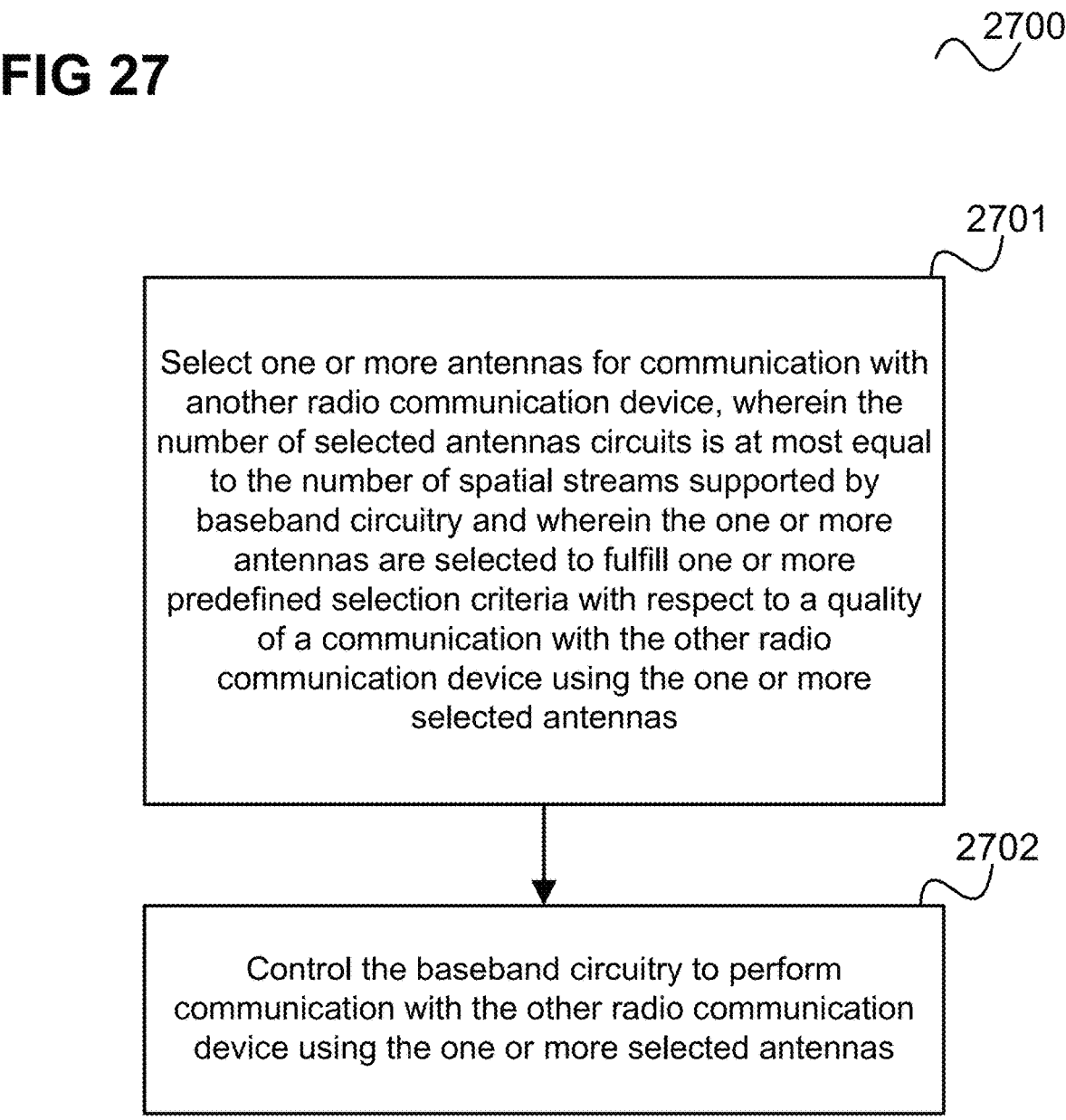
FIG. 27 shows a flow diagram illustrating a method for performing communication, e.g. performed by a radio communication device.

According to various embodiments, a method is performed as illustrated in FIG. 27.

FIG. 27 shows a flow diagram 2700 illustrating a method for performing communication, e.g. performed by a radio communication device.

In 2701, the radio communication device selects one or more antennas of a plurality of radiohead circuits of a radio communication device, wherein each radiohead circuit has at least one antenna, for communication with another radio communication device, wherein the number of selected antennas circuits is at most equal to the number of spatial streams supported by baseband circuitry, wherein the baseband circuitry supports a number of spatial streams that is lower than the number of antennas of the plurality of radiohead circuits, wherein the one or more antennas are selected to fulfil one or more predefined selection criteria with respect to a quality of a communication with the other radio communication device using the one or more selected antennas.

In 2702, the radio communication device controls the baseband circuitry to perform communication with the other radio communication device using the one or more selected antennas.

Some examples may be used in various wireless communication devices, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a hybrid device, a vehicular device, a non-vehicular device, a wireless communication station, a wireless Access Point (AP), a wireless router, a wireless modem, a video device, an audio device, an audio-video (A/V) device.

Some examples may be used for "peer to peer (PTP) communication", which may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), a Wi-Fi Aware communication, a Vehicle-to-Anything (V2X) communication, an IoT communication, or the like. Other aspects may be implemented for any other additional or alternative communication scheme and/or technology.

Some examples may be used in devices operating in accordance with existing IEEE 802.11 standards (including IEEE 802.11-2016 (IEEE 802.11-2016, IEEE Standard for Information technology—Telecommunications and information exchange between systems local and metropolitan area networks—Specific requirements Part 11: Wireless LAN Medium Access Control (MAC) and Physical Layer (PHY) Specifications, Dec. 7, 2016)), and/or future versions and/or derivatives thereof (e.g., wireless local area network stations (WLAN STAs) or WiFi stations (WiFi STAs)), including any device that contains an IEEE 802.11-conformant media access control (MAC) and physical layer (PHY) interface to the wireless medium (WM).

Some examples may be used in conjunction with a WLAN, e.g., a WiFi network. Other aspects may be used in conjunction with any other suitable wireless communication network, for example, a wireless area network, a "piconet", a WPAN, a WVAN and the like.

Some examples may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

Some examples may be used in devices operating in accordance with existing cellular specifications and/or protocols, e.g., 3rd Generation Partnership Project (3GPP) Long Term Evolution (LTE), 3GPP 5G, and/or future versions and/or derivatives thereof, units and/or devices which are part of the above networks, and the like.

Some examples may be used for one way and/or two-way radio communication systems, cellular radio-telephone communication systems, a cellular telephone, a WLAN telephone, a Personal Communication Systems (PCS) device, a device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth □, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

In the following, various aspects of the present disclosure will be illustrated:

Example 1a may include a radio communication device including a housing; a plurality of radiohead circuits attached to the housing; baseband circuitry connected to the plurality of radiohead circuits via a digital interface; and a processor configured to select a radiohead circuit of the plurality of radiohead circuits for communication with another radio communication device to fulfill a predefined selection criterion with respect to a quality of a communication with the other radio communication device using the selected radiohead circuit and to control the baseband circuitry to perform communication with the other radio communication device using the selected radiohead circuits.

Example 2a may include the radio communication device of Example 1a, wherein the communication with the other radio communication device is a reception of data from the other radio communication device, a transmission of data to the other radio communication device or both a transmission of data to and a reception of data from the other radio communication device.

Example 3a may include the radio communication device of any one of Examples 1a-2a, wherein the radio communication device includes a plurality of parts which are movable with respect to each other and at least some radiohead circuits of the plurality of radiohead circuits are located on different parts.

Example 4a may include the radio communication device of any one of Examples 1 a-3a, wherein the radio communication device is a robot and the plurality of parts includes members of the robot.

Example 5a may include the radio communication device of any one of Examples 1 a-4a, wherein the radio communication device is a computer and the plurality of parts include modular components of the computer.

Example 6a may include the radio communication device of any one of Examples 1 a-5a, including a baseband chip including the baseband circuitry located on one part of the plurality of parts.

Example 7a may include the radio communication device of Example 6a, wherein the baseband chip is configured to control the radiohead circuits.

Example 8a may include the radio communication device of any one of Examples 6a-7a, wherein the baseband chip is implemented as a system-on-chip.

Example 9a may include the radio communication device of any one of Examples 6a-8a, wherein the baseband chip is connected to each radiohead circuit of the plurality of radiohead circuits by a wired or wireless connection implementing the digital interface.

Example 10a may include the radio communication device of any one of Examples 1a-9a, wherein the communication device is a convertible, a transformer, or a robot.

Example 11a may include the radio communication device of any one of Examples 1a-10a, wherein the processor is configured to control the baseband circuitry to perform multi-antenna communication using the selected radiohead circuit.

Example 12a may include the radio communication device of any one of Examples 1a-11a, wherein the processor is configured to control the baseband circuitry to perform multiple-input-multiple-output communication using the selected radiohead circuit.

Example 13a may include the radio communication device of any one of Examples 1a-12a, wherein each of the radiohead circuits is configured to measure a quality of a radio link to the other radio communication device and the processor is configured to select the radiohead circuit based on the measured qualities.

Example 14a may include the radio communication device of Example 13a, wherein, according to the selection criterion, the processor is configured to select the radiohead circuit based on a comparison of the measured qualities.

Example 15a may include the radio communication device of any one of Examples 13a-14a, wherein, according to the selection criterion, the processor is configured to choose a radiohead circuit of the plurality of radiohead circuits over another radiohead circuit if the radiohead circuit has a better measured quality than the other radiohead circuit.

Example 16a may include the radio communication device of any one of Examples 1a-15a, wherein, according to the selection criterion, the processor is configured to select the radiohead circuit based on an optimization of the quality of the communication with the other radio communication device.

Example 17a may include the radio communication device of any one of Examples 1a-16a, wherein the processor is configured to determine whether a multi-antenna communication should be performed with the other radio communication device and to determine a number of radiohead circuits to be selected depending on whether a multi-antenna communication should be performed with the other radio communication device and to select radiohead circuits of the determined number.

Example 18a may include the radio communication device of any one of Examples 1a-17a, wherein the processor is configured to determine a number of antennas which should be used to perform the communication with the other radio communication device and to select the number of radiohead circuits according to the determined number of antennas.

Example 19a may include the radio communication device of any one of Examples 1a-18a, wherein the processor at least partially implements the baseband circuitry.

Example 20a may include the radio communication device of any one of Examples 1a-19a, wherein the processor is configured to select the radiohead circuit of the plurality of radiohead circuits according to a selection which, among a plurality of selections of radiohead circuits of the plurality of radiohead circuits, provides the highest quality of a communication with the other radio communication device.

Example 21a may include the radio communication device of any one of Examples 1a-20a, wherein the processor is configured to select the radiohead circuit and to control the baseband circuitry to perform communication with the other radio communication device using the selected radiohead circuit dynamically during an established communication session between the radio communication device and the other radio communication device.

Example 22a may include the radio communication device of any one of Examples 1a-21a, wherein the processor is configured to select the radiohead circuit and to control the baseband circuitry to perform communication with the other radio communication device using the selected radiohead circuit dynamically during an exchange of useful data between the radio communication device and the other radio communication device.

Example 23a may include a method for performing radio communication including selecting a radiohead circuit of a plurality of radiohead circuits connected to baseband circuitry via a digital interface, which are attached to a housing of a radio communication device, for communication with another radio communication device to fulfill a predefined selection criterion with respect to a quality of a communication with the other radio communication device using the selected radiohead circuit and performing communication with the other radio communication device using the selected radiohead circuit.

Example 24a may include the method of Example 23a, wherein the communication with the other radio communication device is a reception of data from the other radio communication device, a transmission of data to the other radio communication device or both a transmission of data to and a reception of data from the other radio communication device.

Example 25a may include the method of any one of Examples 23a-24a, wherein the radio communication device includes a plurality of parts which are movable with respect to each other and at least some radiohead circuits of the plurality of radiohead circuits are located on different parts.

Example 26a may include the method of any one of Examples 23a-25a, wherein the radio communication device is a robot and the plurality of parts includes members of the robot.

Example 27a may include the method of any one of Examples 23a-26a, wherein the radio communication device is a computer and the plurality of parts include modular components of the computer.

Example 28a may include the method of any one of Examples 23a-27a, including a baseband chip including the baseband circuitry located on one part of the plurality of parts.

Example 29a may include the method of Example 28a, wherein the baseband chip controls the radiohead circuits.

Example 30a may include the method of any one of Examples 28a-29a, wherein the baseband chip is implemented as a system-on-chip.

Example 31a may include the method of any one of Examples 28a-30a, wherein the baseband chip is connected to each radiohead circuit of the plurality of radiohead circuits by a wired or wireless connection implementing the digital interface.

Example 32a may include the method of any one of Examples 23a-31a, wherein the communication device is a convertible, a transformer, or a robot.

Example 33a may include the method of any one of Examples 23a-32a, including controlling the baseband circuitry to perform multi-antenna communication using the selected radiohead circuit.

Example 34a may include the method of any one of Examples 23a-33a, including controlling the baseband circuitry to perform multiple-input-multiple-output communication using the selected radiohead circuit.

Example 35a may include the method of any one of Examples 23a-34a, wherein each of the radiohead circuits measures a quality of a radio link to the other radio communication device and the method includes selecting the radiohead circuit based on the measured qualities.

Example 36a may include the method of Example 35a, wherein, according to the selection criterion, the method includes selecting the radiohead circuit based on a comparison of the measured qualities.

Example 37a may include the method of any one of Examples 35a-36a, wherein, according to the selection criterion, the method includes choosing a radiohead circuit of the plurality of radiohead circuits over another radiohead circuit if the radiohead circuit has a better measured quality than the other radiohead circuit.

Example 38a may include the method of any one of Examples 23a-37a, wherein, according to the selection criterion, the method includes selecting the radiohead circuit based on an optimization of the quality of the communication with the other radio communication device.

Example 39a may include the method of any one of Examples 23a-38a, including determining whether a multi-antenna communication should be performed with the other radio communication device and determining a number of radiohead circuits to be selected depending on whether a multi-antenna communication should be performed with the other radio communication device and to select radiohead circuits of the determined number.

Example 40a may include the method of any one of Examples 23a-39a, including determining a number of antennas which should be used to perform the communication with the other radio communication device and selecting the number of radiohead circuits according to the determined number of antennas.

Example 41a may include the method of any one of Examples 23a-40a, performed by a processor at least partially implementing the baseband circuitry.

Example 42a may include the method of any one of Examples 23a-41a, including selecting the radiohead circuit of the plurality of radiohead circuits according to a selection which, among a plurality of selections of radiohead circuits of the plurality of radiohead circuits, provides the highest quality of a communication with the other radio communication device.

Example 43a may include the method of any one of Examples 23a-42a, including selecting the radiohead circuit and controlling the baseband circuitry to perform communication with the other radio communication device using the selected radiohead circuit dynamically during an established communication session between the radio communication device and the other radio communication device.

Example 44a may include the method of any one of Examples 23a-43a, including selecting the radiohead circuit and controlling the baseband circuitry to perform communication with the other radio communication device using the selected radiohead circuit dynamically during an exchange of useful data between the radio communication device and the other radio communication device.

Example 1b may include a radio communication device including a digital interface circuit configured to provide a digital interface which allows connecting the radio communication device to another radio communication device; baseband circuitry; a processor configured to check whether the radio communication device is connected to the other ratio communication device via the digital interface; select a radiohead circuit of the other radio communication device if the other radio communication device are connected to the radio communication device via the digital interface; control the baseband circuitry to perform communication using the selected radiohead circuit.

Example 2b may include the radio communication device of Example 1b, wherein the radio communication device includes at least one radiohead circuit and the processor is configured to control the baseband circuitry to perform communication using the selected radiohead circuit of the other radio communication device and the at least one radiohead circuit of the radio communication device.

Example 3b may include the radio communication device of any one of Examples 1b-2b, wherein the communication is a reception of data from a further radio communication device, a transmission of data to the further radio communication device or both a transmission of data to and a reception of data from the further radio communication device.

Example 4b may include the radio communication device of any one of Examples 1b-3b, wherein the radio communication device includes a fastening component to attach the other radio communication device to the radio communication device.

Example 5b may include the radio communication device of any one of Examples 1b-4b, wherein the radio communication device includes an electrical connection component to electrically connect the other radio communication device to the radio communication device.

Example 6b may include the radio communication device of Example 5b, wherein the digital interface circuit is configured to provide the digital interface via the electrical connection component.

Example 7b may include the radio communication device of any one of Examples 1b-6b, wherein the radio communication device is a modular component of a computer and the other radio communication device are other modular components of the computer.

Example 8b may include the radio communication device of any one of Examples 1b-7b, wherein the radio communication device is a convertible or a transformer.

Example 9b may include the radio communication device of any one of Examples 1b-8b, including a baseband chip including the baseband circuitry.

Example 10b may include the radio communication device of Example 9b, wherein the baseband chip is connected to the digital interface component by a wired or wireless connection.

Example 11b may include the radio communication device of any one of Examples 9b-10b, wherein the baseband chip implements a system-on-chip.

Example 12b may include the radio communication device of any one of Examples 9b-11b, wherein the baseband circuitry is configured, if controlled to perform communication using the selected radiohead circuit, to communicate with the selected radiohead circuit via the digital interface.

Example 13b may include the radio communication device of any one of Examples 1b-12b, wherein the processor is configured to control the baseband circuitry to perform multi-antenna communication using the selected radiohead circuit.

Example 14b may include the radio communication device of any one of Examples 1b-13b, wherein the processor is configured to control the baseband circuitry to perform multiple-input-multiple-output communication using the selected radiohead circuit.

Example 15b may include the radio communication device of any one of Examples 1b-14b, wherein the processor is configured to receive measurements of qualities of radio links of a set of radiohead circuits of the other communication device and to select the radiohead circuit from the set of radiohead circuits based on the measured qualities.

Example 16b may include the radio communication device of Example 15b, wherein the processor is configured to select the radiohead circuit based on a comparison of the measured qualities.

Example 17b may include the radio communication device of any one of Examples 15b-16b, wherein the processor is configured to choose a radiohead circuit of the set of radiohead circuits over another radiohead circuit of the set of radiohead circuits if the radiohead circuit has a better measured quality than the other radiohead circuit.

Example 18b may include the radio communication device of any one of Examples 1b-17b, wherein the processor is configured to select the radiohead circuit based on an optimization of the quality of the communication.

Example 19b may include the radio communication device of any one of Examples 1b-18b, wherein the processor is configured to determine whether a multi-antenna communication should be performed and to select a number of radiohead circuits to be selected depending on whether a multi-antenna communication should be performed and to select radiohead circuits of the determined number.

Example 20b may include the radio communication device of any one of Examples 1b-19b, wherein the processor is configured to determine a number of antennas which should be used to perform the communication and to select the number of radiohead circuits according to the determined number of antennas.

Example 21b may include the radio communication device of any one of Examples 1b-20b, wherein the processor is configured to determine whether a multi-antenna communication should be performed and to determine a number of the radiohead circuit to be selected depending on whether a multi-antenna communication should be performed should be performed and to select radiohead circuits of the determined number.

Example 22b may include the radio communication device of any one of Examples 1b-21b, wherein the processor at least partially implements the baseband circuitry.

Example 23b may include the radio communication device of any one of Examples 1b-22b, wherein the processor is configured to select the radiohead circuit according to a selection of available radiohead circuits which, among a plurality of selections of radiohead circuits available for the digital interface circuit, provides the highest quality of the communication.

Example 24b may include the radio communication device of any one of Examples 1b-23b, wherein the processor is configured to select the radiohead circuit and to control the baseband circuitry to perform the communication with a further radio communication device using the selected radiohead circuit dynamically during an established communication session between the radio communication device and the further radio communication device.

Example 25b may include the radio communication device of any one of Examples 1b-24b, wherein the processor is configured to select the radiohead circuit and to control the baseband circuitry to perform the communication with a further radio communication device using the selected radiohead circuit dynamically during an exchange of useful data between the radio communication device and the further radio communication device.

Example 26b may include a radio communication apparatus including the radio communication device of any one of Examples 1b-25b and the other radio communication device.

Example 27b may include the radio communication apparatus of Example 26b, wherein the radio communication device and the other radio communication device each include a radiohead circuit.

Example 28b may include the radio communication apparatus of any one of Examples 26b-27b, wherein the radio communication device and the other radio communication device are detachable from each other.

Example 29b may include a method for performing radio communication including providing a digital interface which allows connecting a radio communication device of a radio communication apparatus to the other radio communication device; checking whether the radio communication device is connected to the other ratio communication device via the digital interface; selecting a radiohead circuit of the other radio communication device if the other radio communication device are connected to the radio communication device via the digital interface; performing communication using the selected radiohead circuit.

Example 30b may include the method of Example 29b, wherein the radio communication device includes at least one radiohead circuit and the method includes controlling the baseband circuitry to perform communication using the selected radiohead circuit of the other radio communication device and the at least one radiohead circuit of the radio communication device.

Example 31b may include the method of any one of Examples 29b-30b, wherein the communication is a reception of data from a further radio communication device, a transmission of data to the further radio communication device or both a transmission of data to and a reception of data from the further radio communication device.

Example 32b may include the method of any one of Examples 29b-31b, wherein the radio communication device includes a fastening component to attach the other radio communication device to the radio communication device.

Example 33b may include the method of any one of Examples 29b-32b, wherein the radio communication device includes an electrical connection component to electrically connect the other radio communication device to the radio communication device.

Example 34b may include the method of Example 33b, including providing the digital interface via the electrical connection component.

Example 35b may include the method of any one of Examples 29b-34b, wherein the radio communication device is a modular component of a computer and the other radio communication device are other modular components of the computer.

Example 36b may include the method of any one of Examples 29b-35b, wherein the radio communication device is a convertible or a transformer.

Example 37b may include the method of any one of Examples 29b-36b, including a baseband chip including the baseband circuitry.

Example 38b may include the method of Example 37b, wherein the baseband chip is connected to the digital interface component by a wired or wireless connection.

Example 39b may include the method of any one of Examples 37b-38b, wherein the baseband chip implements a system-on-chip.

Example 40b may include the method of any one of Examples 37b-39b, wherein the baseband circuitry, if controlled to perform communication using the selected radiohead circuit, communicates with the selected radiohead circuit via the digital interface.

Example 41b may include the method of any one of Examples 29b-40b, including controlling the baseband circuitry to perform multi-antenna communication using the selected radiohead circuit.

Example 42b may include the method of any one of Examples 29b-41b, including controlling the baseband circuitry to perform multiple-input-multiple-output communication using the selected radiohead circuit.

Example 43b may include the method of any one of Examples 29b-42b, including receiving measurements of qualities of radio links of a set of radiohead circuits of the other communication device and selecting the radiohead circuit from the set of radiohead circuits based on the measured qualities.

Example 44b may include the method of Example 43b, including selecting the radiohead circuit based on a comparison of the measured qualities.

Example 45b may include the method of any one of Examples 43b-44b, including choosing a radiohead circuit of the set of radiohead circuits over another radiohead circuit of the set of radiohead circuits if the radiohead circuit has a better measured quality than the other radiohead circuit.

Example 46b may include the method of any one of Examples 29b-45b, including selecting the radiohead circuit based on an optimization of the quality of the communication.

Example 47b may include the method of any one of Examples 29b-46b, including determining whether a multi-antenna communication should be performed and selecting a number of radiohead circuits to be selected depending on whether a multi-antenna communication should be performed and selecting radiohead circuits of the determined number.

Example 48b may include the method of any one of Examples 29b-47b, including determining a number of antennas which should be used to perform the communication and selecting the number of radiohead circuits according to the determined number of antennas.

Example 49b may include the method of any one of Examples 29b-48b, including determining whether a multi-antenna communication should be performed and determining a number of the radiohead circuit to be selected depending on whether a multi-antenna communication should be performed should be performed and to select radiohead circuits of the determined number.

Example 50b may include the method of any one of Examples 29b-49b, performed by a processor at least partially implementing the baseband circuitry.

Example 51b may include the method of any one of Examples 29b-50b, including selecting the radiohead circuit according to a selection of available radiohead circuits which, among a plurality of selections of radiohead circuits available for the digital interface circuit, provides the highest quality of the communication.

Example 52b may include the method of any one of Examples 29b-51b, including selecting the radiohead circuit and controlling the baseband circuitry to perform the communication with a further radio communication device using the selected radiohead circuit dynamically during an established communication session between the radio communication device and the further radio communication device.

Example 53b may include the method of any one of Examples 29b-52b, including selecting the radiohead circuit and controlling the baseband circuitry to perform the communication with a further radio communication device using the selected radiohead circuit dynamically during an exchange of useful data between the radio communication device and the further radio communication device.

Example 1c may include a radio communication device including a plurality of radiohead circuits, wherein each radiohead circuit has at least one antenna and is configured to generate reception data from a radio signal received via the at least one antenna; baseband circuitry configured to support a number of spatial streams that is lower than the number of antennas of the plurality of radiohead circuits; a processor configured to process the reception data in accordance with the number of spatial streams supported by the baseband circuitry by at least one of combining reception data generated from radio signals received via different antennas or selecting a part of the reception data generated from radio signals received via one antenna over a part of the reception data generated from radio signals received via another antenna based on a reception data quality criterion.

Example 2c may include the radio communication device of Example 1c-1c, wherein the reception data is digital reception data.

Example 3c may include the radio communication device of any one of Examples 1c-2c, wherein the radiohead circuits are configured to receive radio reception data via a radio link to another communication device and to generate the digital reception data from the received radio reception data.

Example 4c may include the radio communication device of any one of Examples 1c-3c, including a baseband module implementing the baseband circuitry and the processor.

Example 5c may include the radio communication device of any one of Examples 1c-4c, wherein the processor is configured to process the reception data in accordance with the number of spatial streams supported by the baseband circuitry by at least one of combining reception data received generated by different radiohead circuits of the plurality of radiohead circuits or selecting a part of the reception data generated by one radiohead circuit of the plurality of radiohead circuits over a part of the reception data generated by another radiohead circuit of the plurality of radiohead circuits based on the reception data quality criterion.

Example 6c may include the radio communication device of Example 5c, wherein the reception data is frequency domain data.

Example 7c may include the radio communication device of Example 6c, further including discarding a part of the reception data when another part of the reception data has been selected over the part of the reception data.

Example 8c may include the radio communication device of any one of Examples 1c-7c, wherein the baseband circuitry is configured to support a number of spatial streams that is lower than the number of spatial streams that is in total supported by the plurality of radiohead circuits.

Example 9c may include the radio communication device of any one of Examples 1c-8c, wherein the processor is configured to reduce the amount of reception data generated by the radiohead circuits by determining a quality of multiple parts of the reception data and selecting a part which fulfills the predetermined reception data quality criterion.

Example 10c may include the radio communication device of Example 9c, wherein the reception data quality criterion includes that the part of the reception data passes an error detection check.

Example 11c may include the radio communication device of any one of Examples 9c-10c, wherein the reception data quality criterion includes that the part of the reception data has a higher reception quality than the other part of the reception data.

Example 12c may include the radio communication device of Example 11c, wherein the reception quality is a received signal strength indicator or a signal-to-noise ratio.

Example 13c may include the radio communication device of any one of Examples 1c-12c, wherein the each radiohead of the plurality of radioheads is configured to measure the reception quality of the reception data it generates.

Example 14c may include the radio communication device of any one of Examples 1c-13c, wherein the processor is configured to process the reception data provided by the radiohead circuits by one or more of selection of reception data in the time domain;
  combining of reception data in the time domain;
  combining of soft values resulting from frequency domain processing;
  selection of forward error correction output blocks; and
  selection of Medium Access Control Packed Data Units.

Example 15c may include the radio communication device of any one of Examples 1c-14c, wherein the baseband circuitry is configured to process the reception data according to multiple-input-multiple-output reception.

Example 16c may include the radio communication device of any one of Examples 1c-15c, wherein the processor is configured to process the reception data based on an optimization of the quality of a communication with another radio communication device from which the radio signal is received.

Example 17c may include the radio communication device of Example 16c, wherein the processor at least partially implements the baseband circuitry.

Example 18c may include a method for receiving data including generating reception data by each radiohead circuit of a plurality of radiohead circuits, wherein each radiohead circuit has at least one antenna, from a radio signal received via the at least one antenna; processing the reception data in accordance with a number of spatial streams supported by baseband circuitry which is lower than the number of antennas of the plurality of radiohead circuits by at least one of combining reception data generated from radio signals received via different antennas or selecting a part of the reception data generated from radio signals received via one antenna over a part of the reception data generated from radio signals received via another antenna based on a reception data quality criterion.

Example 19c may include the method of Examples 18c, wherein the reception data is digital reception data.

Example 20c may include the method of any one of Examples 18c-19c, wherein the radiohead circuit receive radio reception data via a radio link to another communication device and generate the digital reception data from the received radio reception data.

Example 21c may include the method of any one of Examples 18c-20c, performed by a baseband module implementing the baseband circuitry.

Example 22c may include the method of any one of Examples 18c-21c, including processing the reception data in accordance with the number of spatial streams supported by the baseband circuitry by at least one of combining reception data received generated by different radiohead circuits of the plurality of radiohead circuits or selecting a part of the reception data generated by one radiohead circuit of the plurality of radiohead circuits over a part of the reception data generated by another radiohead circuit of the plurality of radiohead circuits based on the reception data quality criterion.

Example 23c may include the method of Example 22c, wherein the reception data is frequency domain data.

Example 24c may include the method of Example 23c, further including discarding a part of the reception data when another part of the reception data has been selected over the part of the reception data.

Example 25c may include the method of any one of Examples 18c-24c, wherein the baseband circuitry supports a number of spatial streams that is lower than the number of spatial streams that is in total supported by the plurality of radiohead circuits.

Example 26c may include the method of any one of Examples 18c-25c, including reducing the amount of reception data generated by the radiohead circuits by determining a quality of multiple parts of the reception data and selecting a part which fulfills the predetermined reception data quality criterion.

Example 27c may include the method of Example 26c, wherein the reception data quality criterion includes that the part of the reception data passes an error detection check.

Example 28c may include the method of any one of Examples 26c-27c, wherein the reception data quality criterion includes that the part of the reception data has a higher reception quality than the other part of the reception data.

Example 29c may include the method of Example 28c, wherein the reception quality is a received signal strength indicator or a signal-to-noise ratio.

Example 30c may include the method of any one of Examples 18c-29c, wherein the each radiohead of the plurality of radioheads is measures the reception quality of the reception data it generates.

Example 31c may include the method of any one of Examples 18c-30c, including processing the reception data provided by the radiohead circuits by one or more of
  selection of reception data in the time domain;
  combining of reception data in the time domain;
  combining of soft values resulting from frequency domain processing;
  selection of forward error correction output blocks; and
  selection of Medium Access Control Packed Data Units.

Example 32c may include the method of any one of Examples 18c-31c, wherein the baseband circuitry processes the reception data according to multiple-input-multiple-output reception.

Example 33c may include the method of any one of Examples 18c-32c, including processing the reception data based on an optimization of the quality of a communication with another radio communication device from which the radio signal is received.

Example 34c may include the method of Example 33c, performed by a processor at least partially implementing the baseband circuitry.

Example 1 d may include a radio communication device including a plurality of antennas; baseband circuitry configured to support a number of spatial streams that is lower than the number of antennas of the plurality of antennas; a channel estimator configured to determine first channel information characterizing a multi-antenna radio communication between the radio communication device and another radio communication device using the plurality of antennas of the radio communication device and a plurality of antennas of the other communication device; a processors configured to derive, from the first channel information, second channel information characterizing a multi-antenna radio communication between the radio communication device and the other radio communication device using a subset of the plurality of antennas of the radio communication device and the plurality of antennas of the other communication device, wherein the subset of antennas includes a number of antennas equal to or lower than the number of spatial streams supported by the baseband circuitry; and report the second channel information to the other radio communication device.

Example 2d may include the radio communication device of Example 1 d, wherein determining the first channel information includes measuring a channel matrix of a radio channel between the plurality of antennas of the radio communication device and the plurality of antennas of the other communication device.

Example 3d may include the radio communication device of Example 2d, wherein the channel matrix is the full channel matrix of multi-antenna radio communication between the radio communication device and another radio communication device using all of the plurality of antennas of the radio communication device and all of the plurality of antennas of the other communication device.

Example 4d may include the radio communication device of Example 3d, wherein determining the second channel information includes determining a sub-matrix of the full channel matrix which has a number of rows that is equal to or lower than the number of spatial streams supported by the baseband circuitry.

Example 5d may include the radio communication device of Example 4d, wherein determining the second channel information includes compressing the sub-matrix.

Example 6d may include the radio communication device of any one of Examples 1 d-5d, wherein the channel estimator is configured to determine the first channel information repeatedly over time and the processor is configured to repeatedly determine the second channel information and to report the second channel information repeatedly over time.

Example 7d may include the radio communication device of any one of Examples 1 d-6d, wherein the channel estimator is configured to periodically determine the first channel information and the processor is configured to periodically determine the second channel information and to periodically report the second channel information.

Example 8d may include the radio communication device of Example 6d, wherein the processor is configured to determine the second channel information from the latest first channel information determined by the channel estimator.

Example 9d may include the radio communication device of any one of Examples 1 d-8d, including a first baseband module including the baseband circuitry and a second baseband module including further baseband circuitry.

Example 10d may include the radio communication device of Example 9d, wherein the further baseband circuitry is configured to support a number of spatial streams that is lower than the number of antennas of the plurality of antennas;

Example 11d may include the radio communication device of any one of Examples 9d-10d, wherein a first subset of antennas of the plurality of antennas of the radio communication device is connected and assigned to the first baseband module and a second subset of antennas of the plurality of antennas of the radio communication device is connected and assigned to the second baseband module.

Example 12d may include the radio communication device of Example 11d, wherein the first baseband module is configured to process data received or to be transmitted via the first subset of antennas and the second baseband module is configured to process data received or to be transmitted via the first subset of antennas.

Example 13d may include the radio communication device of any one of Examples 11d-12d, wherein the first baseband module is configured to determine a first part of the first channel information, wherein the first part of the first channel information characterizes a multi-antenna radio communication between the radio communication device and the other radio communication device using the first subset of antennas and wherein the second baseband module is configured to determine a second part of the first channel information, wherein the second part of the first channel information characterizes a multi-antenna radio communication between the radio communication device and the other radio communication device using the second subset of antennas.

Example 14d may include the radio communication device of Example 13 d, wherein the processor is configured to determine the second channel information by combining the first part of the first channel information and the second part of the first channel information.

Example 15d may include the radio communication device of any one of Examples 13d-14d, including at least one further baseband module configured to determine at least one further part of the first channel information and the processor is configured to determine the second channel information by combining the first part of the first channel information, the second part of the first channel information and the at least one further part of the first channel information.

Example 16d may include the radio communication device of any one of Examples 13d-15d, wherein the processor is configured to determine the second channel information by selecting from the first part of the first channel information and the second part of the first channel information.

Example 17d may include the radio communication device of any one of Examples 13d-16d, including at least one further baseband module configured to determine at least one further part of the first channel information and the processor is configured to determine the second channel information by selecting from the first part of the first channel information and the second part of the first channel information and the at least one further part of the channel information.

Example 18d may include the radio communication device of any one of Examples 13d-17d, wherein the first baseband module and the second baseband module are configured to repeatedly determine the first part of the first channel information and the second part of the first channel information over time and the processor is configured to repeatedly determine the second channel information by selecting from the first part of the first channel information and the second part of the first channel information in a round-robin manner.

Example 19d may include the radio communication device of any one of Examples 13d-18d, including at least one further baseband module configured to determine at least one further part of the first channel information and the processor is configured to determine the second channel information by selecting from the first part of the first channel information and the second part of the first channel information and the at least one further part of the channel information wherein the first baseband module, the second baseband module and the at least one further baseband module are configured to repeatedly determine the first part of the first channel information, the second part of the first channel information and the at least one further part of the channel information over time and the processor is configured to repeatedly determine the second channel information by alternatingly from the first part of the first channel information, the second part of the first channel information and the at least one further part of the first channel information in a round-robin manner.

Example 20d may include the radio communication device of Example 16d, wherein the processor is configured to select a part of the first channel information over another part of the first channel information for the second channel information if the part of the first channel information specifies a sub-matrix of the channel matrix of a radio channel between the plurality of antennas of the radio communication device and the plurality of antennas of the other communication device which has larger singular values than the other part of the first channel information.

Example 21d may include the radio communication device of any one of Examples 1d-20d, wherein the multi-antenna communication between the radio communication device and the other radio communication device using the plurality of antennas of the radio communication device and a plurality of antennas of the other communication device and the multi-antenna radio communication between the radio communication device and the other radio communication device using a subset of the plurality of antennas of the radio communication device and the plurality of antennas of the other communication device are radio communication communications using a predetermined frequency band.

Example 22d may include the radio communication device of any one of Examples 1d-21d, wherein the radio communication device includes a plurality of radioheads including the plurality of antennas, wherein at least some of the antennas of the plurality of antennas are part of different radioheads of the plurality of radioheads.

Example 23d may include the radio communication device of Example 22d, wherein the baseband circuitry is configured to support a number of spatial streams that is lower than the number of spatial streams that is in total supported by the plurality of radiohead circuits.

Example 24d may include the radio communication device of any one of Examples 22d-23d, Wherein each radiohead circuit supports at least one spatial stream by means of at least one receiver chain.

Example 25d may include the radio communication device of any one of Examples 1d-24d, wherein the channel estimator is configured to determine the first channel information and the processor is configured to report the second channel information in response to a beamforming feedback request from the other radio communication device.

Example 26d may include a method for reporting channel information including determining first channel information characterizing a multi-antenna radio communication between a radio communication device and another radio communication device using a plurality of antennas of the radio communication device and a plurality of antennas of the other communication device; deriving, from the first channel information, second channel information characterizing a multi-antenna radio communication between the radio communication device and the other radio communication device using a subset of the plurality of antennas of the radio communication device and the plurality of antennas of the other communication device, wherein the subset of antennas includes a number of antennas equal to or lower than the number of spatial streams supported by baseband circuitry of the radio communication device, wherein the number of spatial streams supported by the baseband circuitry is lower than the number of antennas of the plurality of antennas; and reporting the second channel information to the other radio communication device.

Example 27d may include the method of Example 26d, wherein determining the first channel information includes measuring a channel matrix of a radio channel between the plurality of antennas of the radio communication device and the plurality of antennas of the other communication device.

Example 28d may include the method of Example 27d, wherein the channel matrix is the full channel matrix of multi-antenna radio communication between the radio communication device and another radio communication device using all of the plurality of antennas of the radio communication device and all of the plurality of antennas of the other communication device.

Example 29d may include the method of Example 28d, wherein determining the second channel information includes determining a sub-matrix of the full channel matrix which has a number of rows that is equal to or lower than the number of spatial streams supported by the baseband circuitry.

Example 30d may include the method of Example 29d, wherein determining the second channel information includes compressing the sub-matrix.

Example 31d may include the method of any one of Examples 26d-30d, including determining the first channel information repeatedly over time and repeatedly determining the second channel information and reporting the second channel information repeatedly over time.

Example 32d may include the method of any one of Examples 26d-31d, including periodically determining the first channel information and periodically determining the second channel information and periodically reporting the second channel information.

Example 33d may include the method of Example 31d, including determining the second channel information from the latest first channel information determined.

Example 34d may include the method of any one of Examples 26d-33d, wherein the radio communication device includes a first baseband module including the baseband circuitry and a second baseband module including further baseband circuitry.

Example 35d may include the method of Example 34d, wherein the further baseband circuitry supports a number of spatial streams that is lower than the number of antennas of the plurality of antennas;

Example 36d may include the method of any one of Examples 34d-35d, wherein a first subset of antennas of the plurality of antennas of the radio communication device is connected and assigned to the first baseband module and a second subset of antennas of the plurality of antennas of the radio communication device is connected and assigned to the second baseband module.

Example 37d may include the method of Example 36d, wherein the first baseband module processes data received or to be transmitted via the first subset of antennas and the second baseband module processes data received or to be transmitted via the first subset of antennas.

Example 38d may include the method of any one of Examples 36d-37d, wherein the first baseband module determines a first part of the first channel information, wherein the first part of the first channel information characterizes a multi-antenna radio communication between the radio communication device and the other radio communication device using the first subset of antennas and wherein the second baseband module determines a second part of the first channel information, wherein the second part of the first channel information characterizes a multi-antenna radio communication between the radio communication device and the other radio communication device using the second subset of antennas.

Example 39d may include the method of Example 38d, including determining the second channel information by combining the first part of the first channel information and the second part of the first channel information.

Example 40d may include the method of any one of Examples 38d-39d, including, by at least one further baseband module, determining at least one further part of the first channel information and including determining the second channel information by combining the first part of the first channel information, the second part of the first channel information and the at least one further part of the first channel information.

Example 41d may include the method of any one of Examples 38d-40d, including determining the second channel information by selecting from the first part of the first channel information and the second part of the first channel information.

Example 42d may include the method of any one of Examples 38d-41d, including, by at least one further baseband module, determining at least one further part of the first channel information and including determining the second channel information by selecting from the first part of the first channel information and the second part of the first channel information and the at least one further part of the channel information.

Example 43d may include the method of any one of Examples 38d-42d, wherein the first baseband module and the second baseband module repeatedly determine the first part of the first channel information and the second part of the first channel information over time and the method includes repeatedly determining the second channel information by selecting from the first part of the first channel information and the second part of the first channel information in a round-robin manner.

Example 44d may include the method of any one of Examples 38d-43d, including, by at least one further baseband module, determining at least one further part of the first channel information and the method further includes determining the second channel information by selecting from the first part of the first channel information and the second part of the first channel information and the at least one further part of the channel information wherein the first baseband module, the second baseband module and the at least one further baseband module repeatedly determine the first part of the first channel information, the second part of the first channel information and the at least one further part of the channel information over time and the method includes repeatedly determining the second channel information by alternatingly from the first part of the first channel information, the second part of the first channel information and the at least one further part of the first channel information in a round-robin manner.

Example 45d may include the method of Example 41d, including selecting a part of the first channel information over another part of the first channel information for the second channel information if the part of the first channel information specifies a sub-matrix of the channel matrix of a radio channel between the plurality of antennas of the radio communication device and the plurality of antennas of the other communication device which has larger singular values than the other part of the first channel information.

Example 46d may include the method of any one of Examples 26d-45d, wherein the multi-antenna communication between the radio communication device and the other radio communication device using the plurality of antennas of the radio communication device and a plurality of antennas of the other communication device and the multi-antenna radio communication between the radio communication device and the other radio communication device using a subset of the plurality of antennas of the radio communication device and the plurality of antennas of the other communication device are radio communication communications using a predetermined frequency band.

Example 47d may include the method of any one of Examples 26d-46d, wherein the radio communication device includes a plurality of radioheads including the plurality of antennas, wherein at least some of the antennas of the plurality of antennas are part of different radioheads of the plurality of radioheads.

Example 48d may include the method of Example 47d, wherein the baseband circuitry supports a number of spatial streams that is lower than the number of spatial streams that is in total supported by the plurality of radiohead circuits.

Example 49d may include the method of any one of Examples 47d-48d, wherein each radiohead circuit supports at least one spatial stream by means of at least one receiver chain.

Example 50d may include the method of any one of Examples 26d-49d, including determining the first channel information and the method includes reporting the second channel information in response to a beamforming feedback request from the other radio communication device.

Example 1e may include a radio communication device including a plurality of radiohead circuits, wherein each radiohead circuit has at least one antenna;
Baseband circuitry configured to support a number of spatial streams that is lower than the number of antennas of the plurality of radiohead circuits; a processor configured to select an antenna of the plurality of radiohead circuits for communication with another radio communication device, wherein the number of selected antennas is at most equal to the number of spatial streams supported by the baseband circuitry, wherein the processor is configured to select the antenna to fulfill a predefined selection criterion with respect to a quality of a communication with the other radio communication device using the selected antenna; and to control the baseband circuitry to perform communication with the other radio communication device using the selected antenna.

Example 2e may include the radio communication device of Example 1 e, wherein the communication with the other radio communication device is a reception of data from the other radio communication device, a transmission of data to the other radio communication device or both a transmission of data to and a reception of data from the other radio communication device.

Example 3e may include the radio communication device of any one of Examples 1 e-2e, including a baseband chip including the baseband circuitry.

Example 4e may include the radio communication device of Example 3e, wherein the baseband chip is configured to control the radiohead circuits.

Example 5e may include the radio communication device of Example 4e, wherein the baseband chip implements a system-on-chip.

Example 6e may include the radio communication device of any one of Examples 4e-5e, wherein the baseband chip is connected to each radiohead circuit of the plurality of radiohead circuits by a wired or wireless connection implementing a digital interface.

Example 7e may include the radio communication device of any one of Examples 1 e-6e, wherein the processor is configured to control the baseband circuitry to perform multi-antenna communication using the selected antenna.

Example 8e may include the radio communication device of any one of Examples 1 e-7e, wherein the processor is configured to control the baseband circuitry to perform multiple-input-multiple-output communication using the selected antenna.

Example 9e may include the radio communication device of any one of Examples 1 e-8e, wherein each of the radiohead circuits is configured to measure, for its at least one antenna, a quality of a radio link to the other radio communication device and the processor is configured to select the antenna based on the measured qualities.

Example 10e may include the radio communication device of Example 9e, wherein, according to the selection criterion, the processor is configured to select the antenna based on a comparison of the measured qualities.

Example 11 e may include the radio communication device of any one of Examples 9e-10e, wherein, according to the selection criterion, the processor is configured to choose an antenna over another antenna if the antenna has a better measured quality than the other antenna.

Example 12e may include the radio communication device of any one of Examples 1e-11e, wherein, according to the selection criterion, the processor is configured to select the antenna based on an optimization of the quality of the communication with the other radio communication device.

Example 13e may include the radio communication device of any one of Examples 1e-12e, wherein the processor is configured to determine whether a multi-antenna communication should be performed with the other radio communication device and to determine a number of antennas to be selected depending on whether a multi-antenna communication should be performed with the other radio communication device and to select antennas of the determined number.

Example 14e may include the radio communication device of any one of Examples 1e-13e, wherein the processor at least partially implements the baseband circuitry.

Example 15e may include the radio communication device of any one of Examples 1e-14e, wherein the processor is configured to select the antenna according to a selection which, among a plurality of selections of a number of antennas which is at most equal to the number of spatial streams supported by the baseband circuitry, provides the highest quality of a communication with the other radio communication device.

Example 16e may include the radio communication device of any one of Examples 1e-15e, wherein the processor is configured to select the antenna and to control the baseband circuitry to perform communication with the other radio communication device using the selected antenna dynamically during an established communication session between the radio communication device and the other radio communication device.

Example 17e may include the radio communication device of any one of Examples 1e-16e, wherein the processor is configured to select the antenna and to control the baseband circuitry to perform communication with the other radio communication device using the selected antenna dynamically during an exchange of useful data between the radio communication device and the other radio communication device.

Example 18e may include the radio communication device of any one of Examples 1e-17e, wherein the processor is configured to select an antenna for each of a plurality of frequency bands and to control the baseband circuitry to perform communication with the other radio communication device using the selected antenna in the frequency band.

Example 19e may include the radio communication device of Example 18e, wherein for each frequency band the selected antenna forms a set of selected antennas and the sets of selected antennas of different frequency bands of the plurality of frequency bands are disjoint.

Example 20e may include a method for performing radio communication including:

selecting an antenna of a plurality of radiohead circuits of a radio communication device, wherein each radiohead circuit has at least one antenna, for communication with another radio communication device, wherein the number of selected antennas circuits is at most equal to the number of spatial streams supported by baseband circuitry and wherein the baseband circuitry supports a number of spatial streams that is lower than the number of antennas of the plurality of radiohead circuits, wherein the antenna are selected to fulfill a predefined selection criterion with respect to a quality of a communication with the other radio communication device using the selected antenna; and controlling the baseband circuitry to perform communication with the other radio communication device using the selected antenna.

Example 21e may include the method of Example 20e, wherein the communication with the other radio communication device is a reception of data from the other radio communication device, a transmission of data to the other radio communication device or both a transmission of data to and a reception of data from the other radio communication device.

Example 22e may include the method of any one of Examples 20e-21e, wherein a baseband chip includes the baseband circuitry.

Example 23e may include the method of Example 22e, wherein the baseband chip controls the radiohead circuits.

Example 24e may include the method of Example 23e, wherein the baseband chip implements a system-on-chip.

Example 25e may include the method of any one of Examples 23e-24e, wherein the baseband chip is connected to each radiohead circuit of the plurality of radiohead circuits by a wired or wireless connection implementing a digital interface.

Example 26e may include the method of any one of Examples 20e-25e, including controlling the baseband circuitry to perform multi-antenna communication using the selected antenna.

Example 27e may include the method of any one of Examples 20e-26e, including controlling the baseband circuitry to perform multiple-input-multiple-output communication using the selected antenna.

Example 28e may include the method of any one of Examples 20e-27e, wherein each of the radiohead circuits measures, for its at least one antenna, a quality of a radio link to the other radio communication device and the method includes selecting the antenna based on the measured qualities.

Example 29e may include the method of Example 28e, wherein, according to the selection criterion, the method includes selecting the antenna based on a comparison of the measured qualities.

Example 30e may include the method of any one of Examples 28e-29e, wherein, according to the selection criterion, the method includes choosing an antenna over another antenna if the antenna has a better measured quality than the other antenna.

Example 31e may include the method of any one of Examples 20e-30e, wherein, according to the selection criterion, the method includes selecting the antenna based on an optimization of the quality of the communication with the other radio communication device.

Example 32e may include the method of any one of Examples 20e-31e, including determining whether a multi-antenna communication should be performed with the other radio communication device and determining a number of antennas to be selected depending on whether a multi-antenna communication should be performed with the other radio communication device and to select antennas of the determined number.

Example 33e may include the method of any one of Examples 20e-32e, performed by a processor at least partially implementing the baseband circuitry.

Example 34e may include the method of any one of Examples 20e-33e, including selecting the antenna according to a selection which, among a plurality of selections of a number of antennas which is at most equal to the number of spatial streams supported by the baseband circuitry, provides the highest quality of a communication with the other radio communication device.

Example 35e may include the method of any one of Examples 20e-34e, including selecting the antenna and controlling the baseband circuitry to perform communication with the other radio communication device using the selected antenna dynamically during an established communication session between the radio communication device and the other radio communication device.

Example 36e may include the method of any one of Examples 20e-35e, including selecting the antenna and controlling the baseband circuitry to perform communication with the other radio communication device using the selected antenna dynamically during an exchange of useful data between the radio communication device and the other radio communication device.

Example 37e may include the method of any one of Examples 20e-36e, including selecting an antenna for each of a plurality of frequency bands and controlling the baseband circuitry to perform communication with the other radio communication device using the selected antenna in the frequency band.

Example 38e may include the method of Example 37e, wherein for each frequency band the selected antenna forms a set of selected antennas and the sets of selected antennas of different frequency bands of the plurality of frequency bands are disjoint.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "wireless communication device", as used herein, includes, for example, a device capable of wireless communication, a communication device capable of wireless communication, a communication station capable of wireless communication, a portable or non-portable device capable of wireless communication, or the like. In some aspects, a wireless device may be or may include a peripheral that is integrated with a computer, or a peripheral that is attached to a computer.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

The term "circuitry" as used herein, may refer to, be part of, or include hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor" or "processor circuitry" as used herein may refer to, be part of, or include circuitry capable of sequentially and automatically carrying out a sequence of arithmetic or logical operations, or recording, storing, and/or transferring digital data. The term "processor" or "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface" as used herein may refer to, be part of, or include circuitry that enables the exchange of information between two or more components or devices. The term "interface circuitry" may refer to one or more hardware interfaces, for example, buses, I/O interfaces, peripheral component interfaces, network interface cards, and/or the like.

The term "logic" as used herein may refer to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

The terms "coupled," "communicatively coupled," along with derivatives thereof as used herein, may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "antenna" as used herein may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

The term "channel" as used herein may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

The term "calibration" as used herein may describe a process in which a device or a component of a device (e.g., a radiohead circuit, a transceiver chain, a component of a transceiver chain, and the like) is calibrated. Illustratively, the term calibration may describe a process in which one or more deviations of a behavior of a device or of one of its components from an expected or desired (e.g., target) behavior are corrected. Further illustratively, the term calibration may describe a process in which the operation of a device or of one of its components is aligned with a predefined or desired (e.g., target) operation of the device or of the component. By way of example, a calibration may describe a process in which nonlinearities are eliminated and/or in which mismatches are eliminated. In some aspects, a calibration may be understood as the process through which transmission (TX) and/or reception (RX) parameters and/or circuitry may be tuned to optimize TX power and signal integrity (e.g., EVM) and RX signal quality (e.g., RSSI, or signal-to-interference-plus-noise-ratio SINR).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A radio communication device comprising:
   a housing;
   a plurality of radiohead circuits attached to the housing;
   baseband circuitry connected to the plurality of radiohead circuits via a digital interface; and
   a processor configured
      to select a radiohead circuit of the plurality of radiohead circuits for communication with another radio communication device to fulfill a predefined selection criterion with respect to a quality of a communication with the other radio communication device using the selected radiohead circuit;
      to determine whether a multi-antenna communication should be performed with the other radio communication device;
      to determine a number of additional radiohead circuits to be selected from among the plurality of radio head circuits in addition to the radiohead circuit depending on whether the multi-antenna communication should be performed with the other radio communication device;
      to select the additional radiohead circuits of the determined number for the multi-antenna communication; and
      to control the baseband circuitry to perform the multi-antenna communication with the other radio communication device using the selected radiohead circuit and additional radiohead circuits.

2. The radio communication device of claim 1, wherein the multi-antenna communication with the other radio communication device is a reception of data from the other radio communication device, a transmission of data to the other radio communication device or both a transmission of data to and a reception of data from the other radio communication device.

3. The radio communication device of claim 1, wherein the radio communication device comprises a plurality of parts which are movable with respect to each other and at least some radiohead circuits of the plurality of radiohead circuits are located on different parts.

4. The radio communication device of claim 1, wherein the radio communication device is a robot and the plurality of parts comprises members of the robot.

5. The radio communication device of claim 1, wherein the radio communication device is a computer and the plurality of parts comprise modular components of the computer.

6. The radio communication device of claim 1, comprising a baseband chip comprising the baseband circuitry located on one part of the plurality of parts.

7. The radio communication device of claim 6, wherein the baseband chip is configured to control the radiohead circuits.

8. The radio communication device of claim 6, wherein the baseband chip is implemented as a system-on-chip.

9. The radio communication device of claim 6, wherein the baseband chip is connected to each radiohead circuit of the plurality of radiohead circuits by a wired or wireless connection implementing the digital interface.

10. The radio communication device of claim 1, wherein the communication device is a convertible, a transformer, or a robot.

11. The radio communication device of claim 1, wherein the processor is configured to control the baseband circuitry to perform multiple-input-multiple-output communication using the selected radiohead circuit.

12. The radio communication device of claim 1, wherein each of the radiohead circuits is configured to measure a quality of a radio link to the other radio communication device and the processor is configured to select the radiohead circuit based on the measured qualities.

13. The radio communication device of claim 12, wherein, according to the selection criterion, the processor is configured to select the radiohead circuit based on a comparison of the measured qualities.

14. The radio communication device of claim 12, wherein, according to the selection criterion, the processor is configured to choose the radiohead circuit over an other radiohead circuit of the plurality of radiohead circuits if the radiohead circuit has a better measured quality than the other radiohead circuit.

15. The radio communication device of claim 1, wherein, according to the selection criterion, the processor is configured to select the radiohead circuit based on an optimization of a quality of the communication with the other radio communication device.

16. The radio communication device of claim 1, wherein the processor is configured to determine a number of antennas which should be used to perform the multi-antenna communication and to select the number of additional radiohead circuits according to the determined number of antennas.

17. The radio communication device of claim 1, wherein the processor at least partially implements the baseband circuitry.

18. The radio communication device of claim 1, wherein the processor is configured to select the radiohead circuit of the plurality of radiohead circuits according to a selection which, among a plurality of selections of radiohead circuits of the plurality of radiohead circuits, provides a highest quality of the communication with the other radio communication device.

* * * * *